(12) United States Patent
Van Os et al.

(10) Patent No.: US 12,438,840 B1
(45) Date of Patent: Oct. 7, 2025

(54) USER INTERFACES FOR MESSAGE SUMMARIES

(71) Applicant: Apple Inc., Cupertino, CA (US)

(72) Inventors: Marcel Van Os, Santa Cruz, CA (US); Bryn Bowman, Lafayette, CA (US); Grant R. Paul, San Francisco, CA (US); Eric L. Wilson, Granite Bay, CA (US); Marcos A. Weskamp, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/030,720

(22) Filed: Jan. 17, 2025

Related U.S. Application Data

(60) Provisional application No. 63/670,672, filed on Jul. 12, 2024, provisional application No. 63/657,061, filed on Jun. 6, 2024, provisional application No. 63/646,847, filed on May 13, 2024, provisional application No. 63/631,275, filed on Apr. 8, 2024.

(51) Int. Cl.
  *H04L 51/216* (2022.01)
  *G06F 40/30* (2020.01)

(52) U.S. Cl.
  CPC ............ *H04L 51/216* (2022.05); *G06F 40/30* (2020.01)

(58) Field of Classification Search
  CPC ..... H04L 51/216; H04L 51/21; H04L 51/234; G06F 40/30
  USPC ................................................ 709/204–207
  See application file for complete search history.

(56) References Cited

U.S. PATENT DOCUMENTS

| | | | |
|---|---|---|---|
| 5,894,305 A * | 4/1999 | Needham .................. | H04L 9/40 715/733 |
| 9,235,864 B1 * | 1/2016 | Maeng .................... | G06Q 50/01 |
| 10,319,040 B1 * | 6/2019 | Ahdritz ............. | G06Q 30/0222 |
| 10,587,539 B2 * | 3/2020 | Mahood .................. | H04L 51/04 |
| 11,080,796 B2 * | 8/2021 | Bhagwan .............. | G06Q 50/01 |
| 11,558,334 B2 * | 1/2023 | Gupta .................... | H04L 51/216 |
| 11,657,076 B2 * | 5/2023 | Radhakrishnan ....... | G06F 16/35 707/737 |
| 11,954,138 B2 * | 4/2024 | Ganhotra .............. | G06F 16/345 |
| 2013/0006973 A1 * | 1/2013 | Caldwell .............. | G06F 16/345 707/723 |
| 2018/0131662 A1 * | 5/2018 | Turski ..................... | H04L 51/52 |
| 2019/0087391 A1 * | 3/2019 | Cranshaw ............. | G06F 40/151 |
| 2019/0087491 A1 * | 3/2019 | Bax ...................... | G06Q 10/107 |
| 2019/0386949 A1 * | 12/2019 | Vennam ................ | H04L 65/403 |
| 2021/0311973 A1 * | 10/2021 | Radhakrishnan ....... | G06F 40/30 |
| 2021/0342785 A1 * | 11/2021 | Mann .................... | G06F 40/186 |
| 2022/0052974 A1 * | 2/2022 | Gupta ................... | G06Q 10/10 |
| 2023/0370410 A1 * | 11/2023 | Griesbach ............ | H04L 51/216 |

FOREIGN PATENT DOCUMENTS

WO  2022/266967 A1  12/2022

OTHER PUBLICATIONS

Invitation to Pay Additional Fees and Partial International Search Report received for PCT Patent Application No. PCT/US2025/022723, mailed on Jul. 25, 2025, 11 pages.

* cited by examiner

*Primary Examiner* — Sargon N Nano
(74) *Attorney, Agent, or Firm* — DLA Piper LLP (US)

(57) ABSTRACT

The present disclosure generally relates to selectively displaying a summary for a message, displaying a summary for related messages, and displaying a message summary affordance.

36 Claims, 55 Drawing Sheets

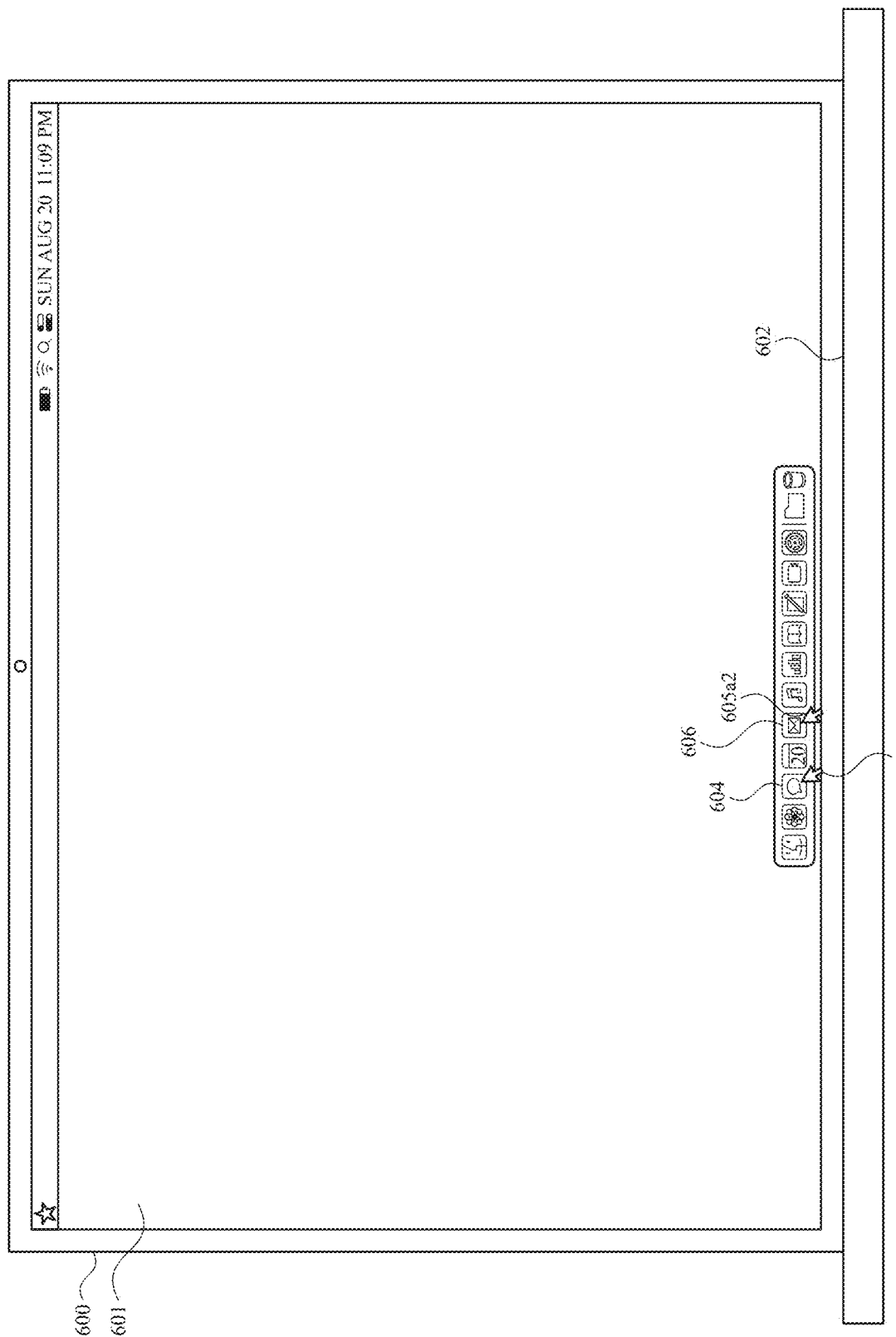

FIG. 6Q

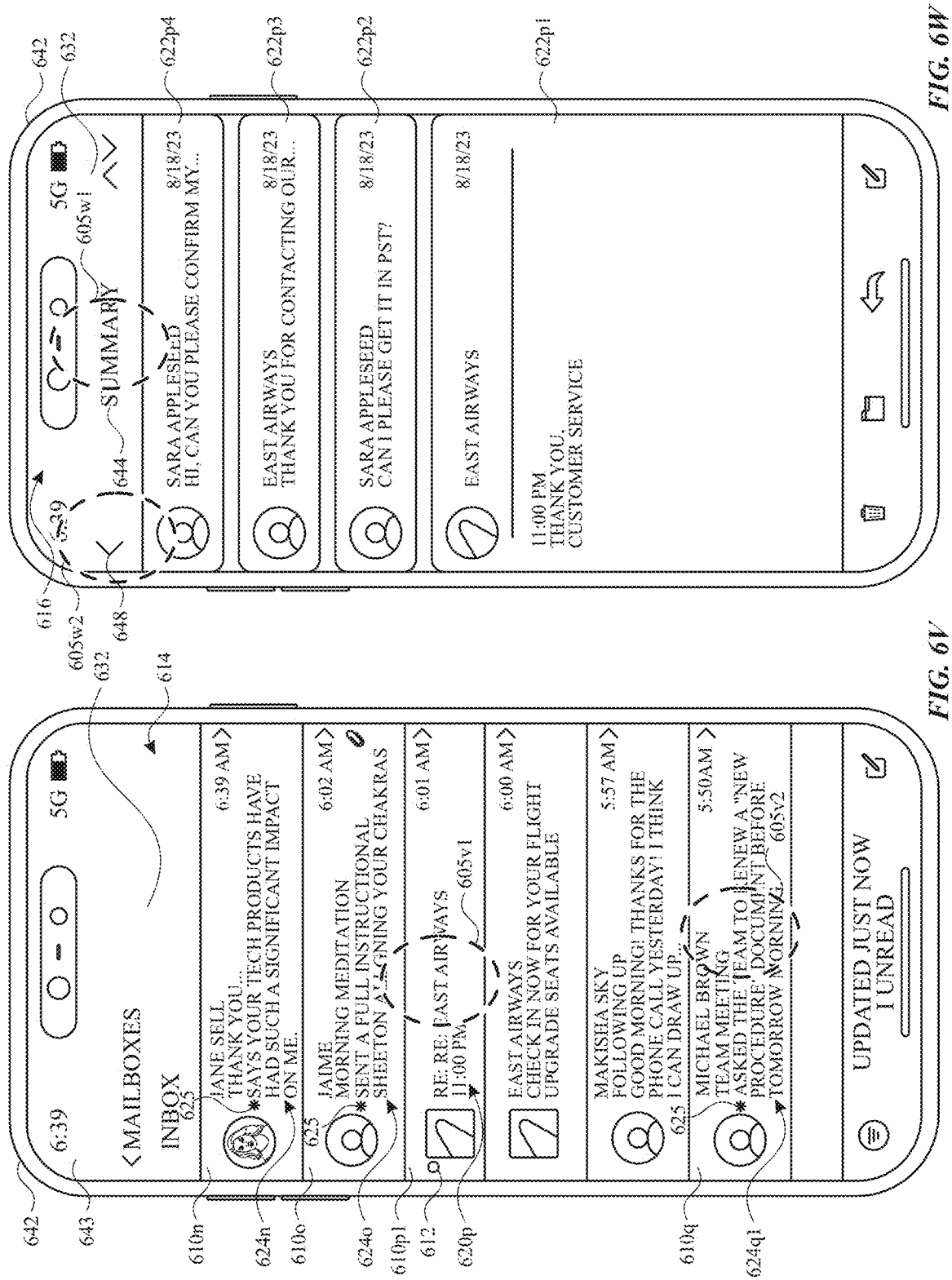

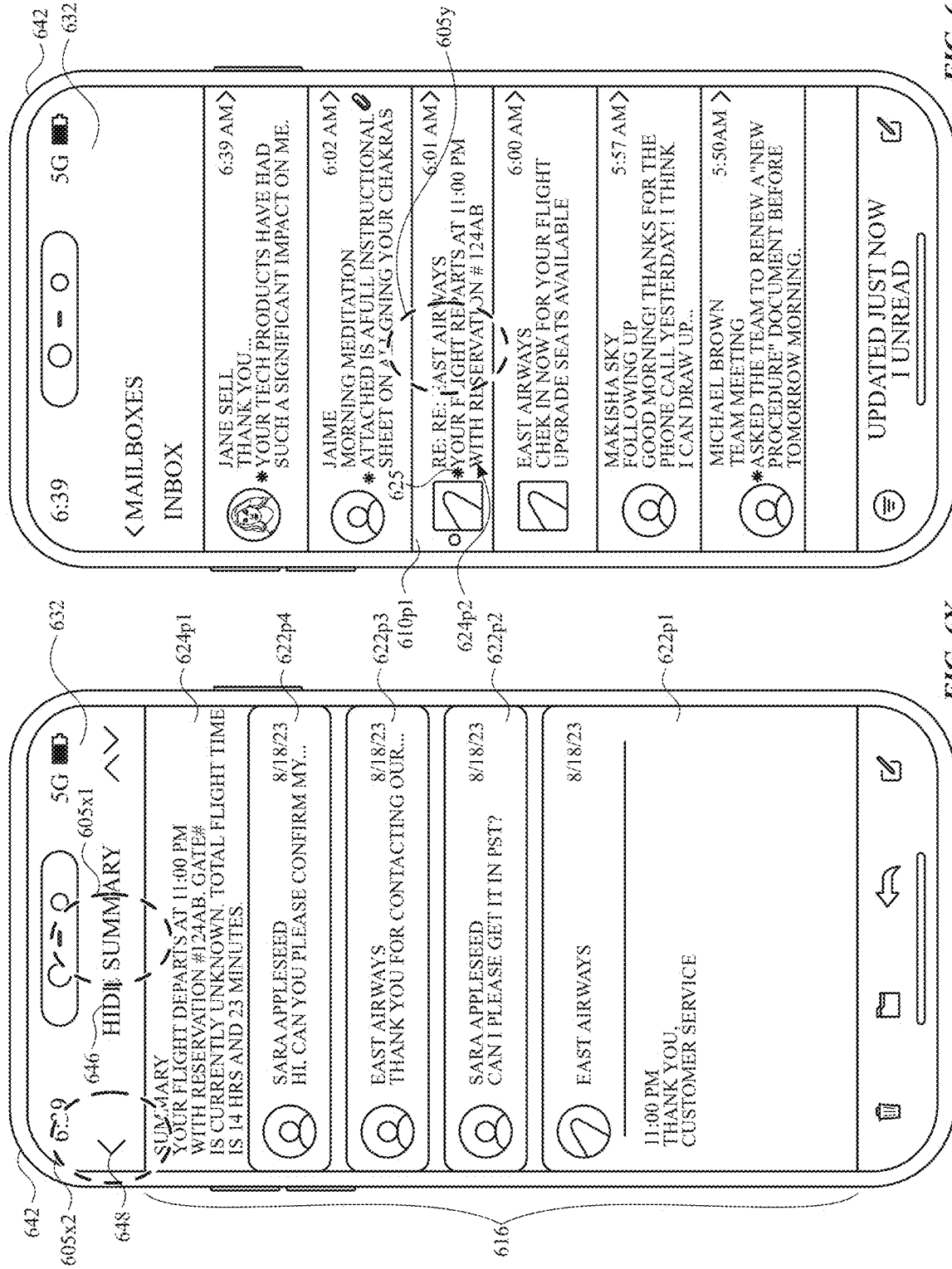

FIG. 6Z

Phone display showing:
- 6:40, 5G
- SUMMARY (644), 605z
- MICHAEL BROWN 5:50 AM
- TO: SARA APPLESEED
- 622q: GOOD MORNING,
  WE HAVE A PRETTY GOOD PROCESS LINED UP AFTER OUR MANY TEAM DISCUSSIONS STARTING MONDAY. WE WILL BE READY TO GO WITH OUR NEW PROCEDURE. PLEASE REVIEW THE "NEW PROCEDURE" DOCUMENT IN OUR GROUP FILE BEFORE TOMORROW MORNING. I'VE SENT AN INVITE FOR OUR ENTIRE TEAM SO THAT I CAN ANSWER ANY QUESTIONS AND BRAINSTORM MORE IDEAS.

BEST,
  MICHAEL
- 616
- 632, 642

FIG. 6AA

Phone display showing:
- 6:40, 5G
- HIDE SUMMARY (646), 624q2
- SUMMARY
  ASKED THE TEAM TO REVIEW A "NEW PROCEDURE" DOCUMENT BEFORE TOMORROW MORNING. SAID THE NEW PROCEDURE STARTS ON MONDAY. SENT AN INVITE TO THE TEAM.
- MICHAEL BROWN 5:50 AM
- TO: SARA APPLESEED
- GOOD MORNING,
  WE HAVE A PRETTY GOOD PROCESS LINED UP AFTER OUR MANY TEAM DISCUSSIONS STARTING MONDAY. WE WILL BE READY TO GO WITH OUR NEW PROCEDURE. PLEASE REVIEW THE "NEW PROCEDURE" DOCUMENT IN OUR GROUP FILE BEFORE TOMORROW MORNING. I'VE SENT AN INVITE FOR OUR ENTIRE TEAM SO THAT I CAN ANSWER ANY QUESTIONS AND BRAINSTORM MORE IDEAS.

BEST,
  MICHAEL
- 616, 648, 632, 642

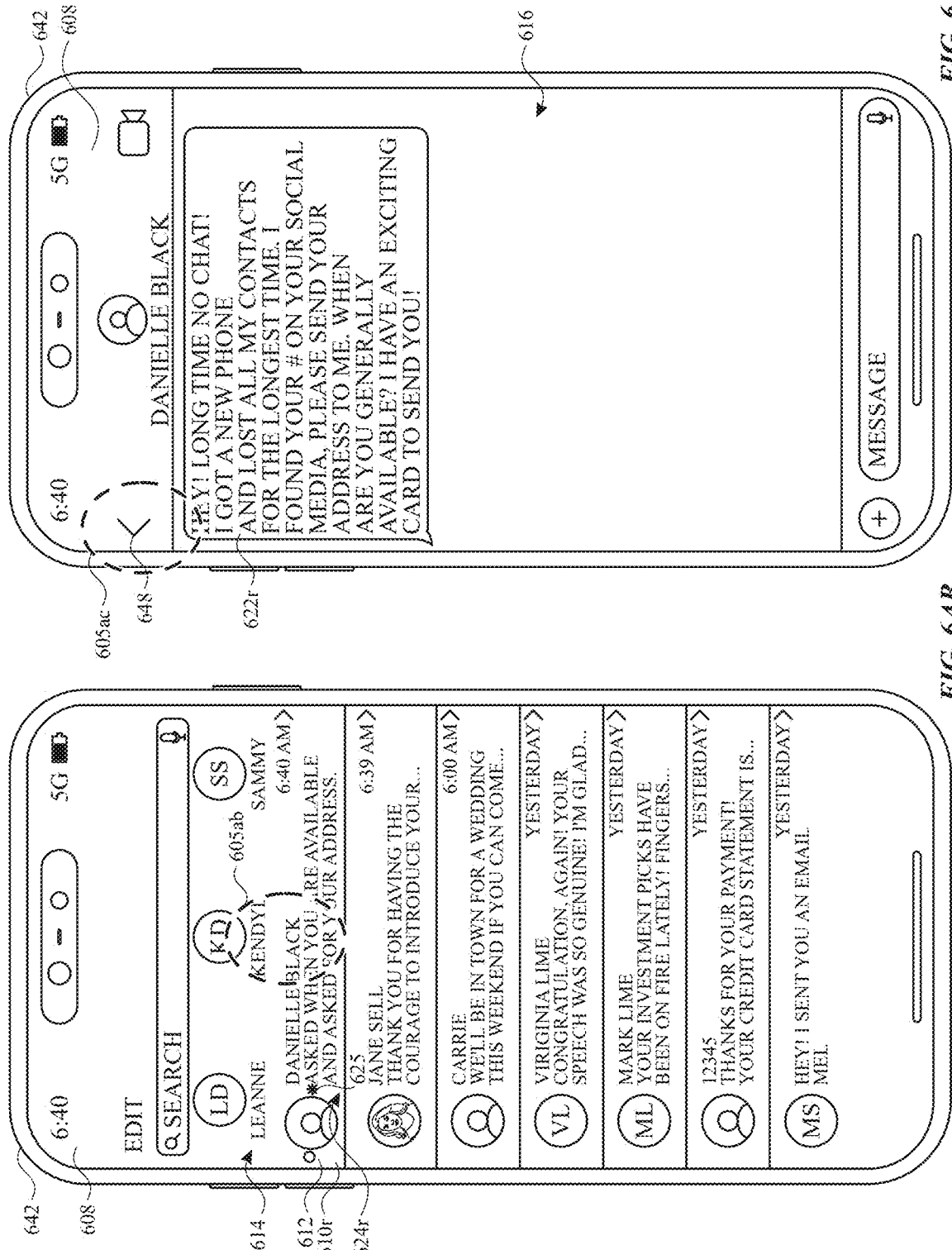

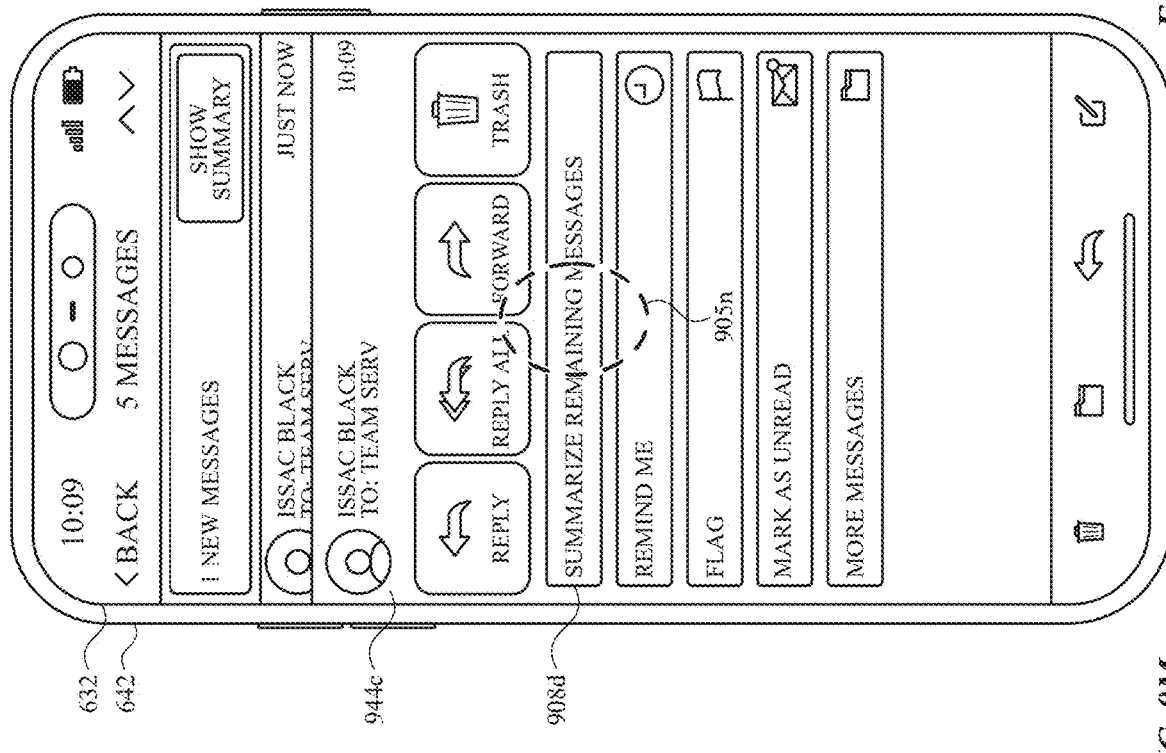
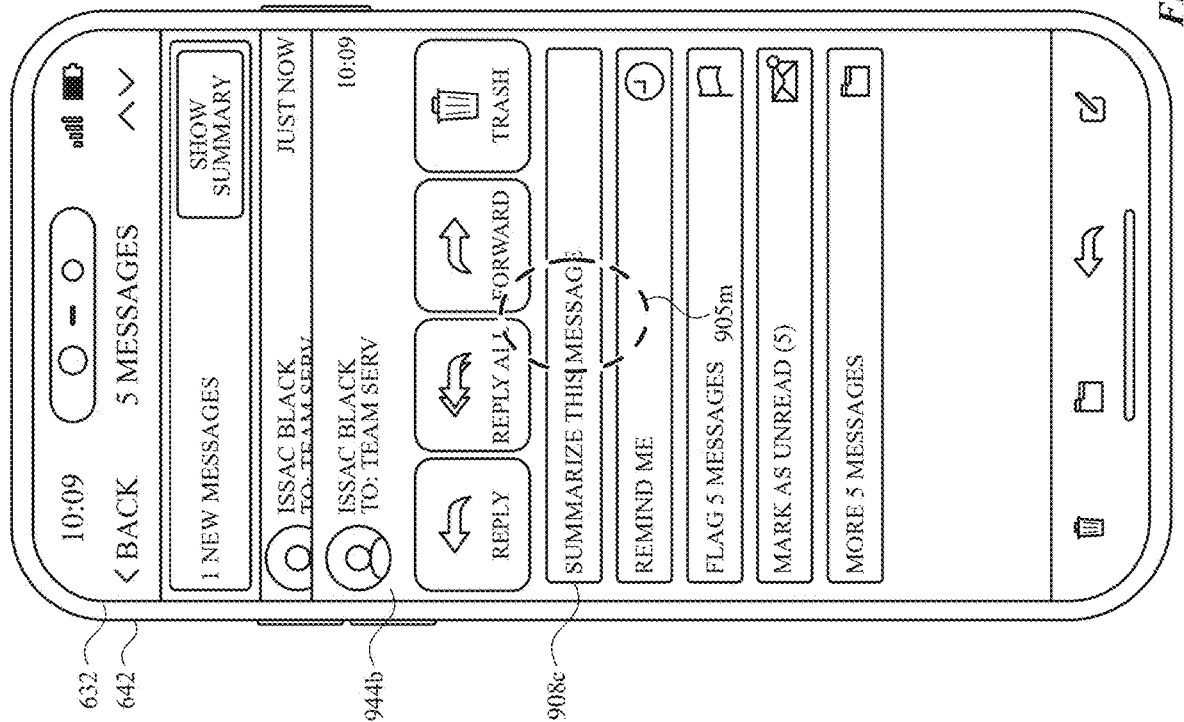
FIG. 9M
FIG. 9N

USER INTERFACES FOR MESSAGE SUMMARIES

CROSS-REFERENCE TO RELATED APPLICATIONS

This application claims priority to U.S. Provisional Patent Application No. 63/670,672, entitled "USER INTERFACES FOR MESSAGE SUMMARIES," filed on Jul. 12, 2024, to U.S. Provisional Patent Application No. 63/657,061, entitled "USER INTERFACES FOR MESSAGE SUMMARIES," filed on Jun. 6, 2024, to U.S. Provisional Patent Application No. 63/646,847, entitled "USER INTERFACES FOR MESSAGE SUMMARIES", filed on May 13, 2024, and to U.S. Provisional Patent Application No. 63/631,275, entitled "USER INTERFACES FOR MESSAGE SUMMARIES", filed on Apr. 8, 2024. The entire contents of each of these applications are hereby incorporated by reference in their entireties for all purposes.

FIELD

The present disclosure relates generally to computer user interfaces, and more specifically to techniques for displaying message summaries.

BACKGROUND

Computer systems display messages (e.g., text messages and/or emails) including written content that are sent or received between users and/or computer systems.

BRIEF SUMMARY

Some techniques for displaying message summaries using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying message summaries. Such methods and interfaces optionally complement or replace other methods for displaying message summaries. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method comprises: displaying, via the display generation component, a first user interface, including: in accordance with a determination that a first set of criteria is satisfied, displaying a summary that is based on content of a first message; while displaying the summary that is based on the content of the first message, detecting, via the one or more input devices, a request to display the first message; in response to detecting the request to display the first message, displaying, via the display generation component, the first message; and after displaying the first message, displaying, via the display generation component, the first user interface, including displaying at least a portion of the content of the first message without displaying the summary.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a first user interface, including: in accordance with a determination that a first set of criteria is satisfied, displaying a summary that is based on content of a first message; while displaying the summary that is based on the content of the first message, detecting, via the one or more input devices, a request to display the first message; in response to detecting the request to display the first message, displaying, via the display generation component, the first message; and after displaying the first message, displaying, via the display generation component, the first user interface, including displaying at least a portion of the content of the first message without displaying the summary.

In accordance with some embodiments, a transitory computer-readable storage medium is described. The transitory computer-readable storage medium stores one or more programs configured to be executed by one or more processors of a computer system that is configured to communicate with a display generation component and one or more input devices, the one or more programs including instructions for: displaying, via the display generation component, a first user interface, including: in accordance with a determination that a first set of criteria is satisfied, displaying a summary that is based on content of a first message; while displaying the summary that is based on the content of the first message, detecting, via the one or more input devices, a request to display the first message; in response to detecting the request to display the first message, displaying, via the display generation component, the first message; and after displaying the first message, displaying, via the display generation component, the first user interface, including displaying at least a portion of the content of the first message without displaying the summary.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: displaying, via the display generation component, a first user interface, including: in accordance with a determination that a first set of criteria is satisfied, displaying a summary that is based on content of a first message; while displaying the summary that is based on the content of the first message, detecting, via the one or more input devices, a request to display the first message; in response to detecting the request to display the first message, displaying, via the display generation component, the first message; and after displaying the first message, displaying, via the display generation component, the first user interface, including displaying at least a portion of the content of the first message without displaying the summary.

In accordance with some embodiments, a computer system that is configured to communicate with a display generation component and one or more input devices is described. The computer system comprises: means for displaying, via the display generation component, a first user interface, including: in accordance with a determination that a first set of criteria is satisfied, displaying a summary that is based on content of a first message; means for, while displaying the summary that is based on the content of the first message, detecting, via the one or more input devices, a request to display the first message; means for, in response to detecting the request to display the first message, displaying, via the display generation component, the first message; and means for, after displaying the first message, displaying, via the display generation component, the first user interface, including displaying at least a portion of the content of the first message without displaying the summary.

In accordance with some embodiments, a computer program product is described. The computer program product comprises one or more programs configured to be executed by one or more processors of a computer system that is that is in communication with a display generation component and one or more input devices. The one or more programs include instructions for: displaying, via the display generation component, a first user interface, including: in accordance with a determination that a first set of criteria is satisfied, displaying a summary that is based on content of a first message; while displaying the summary that is based on the content of the first message, detecting, via the one or more input devices, a request to display the first message; in response to detecting the request to display the first message, displaying, via the display generation component, the first message; and after displaying the first message, displaying, via the display generation component, the first user interface, including displaying at least a portion of the content of the first message without displaying the summary.

In accordance with some embodiments, a method performed at a computer system that is in communication with a display generation component and one or more input devices is described. The method comprises: receiving a first message including first content and a second message, different from the first message, including second content; displaying, via the display generation component, a first summary that is based on the first content of the first message and the second content of the second message; after displaying the first summary, receiving a third message that is associated with the first message and the second message, wherein the third message includes third content; and after receiving the third message and in accordance with a determination that a first set of criteria is satisfied, displaying, via the display generation component, a second summary that is different from the first summary, wherein the second summary is based on the third content of the third message.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving a first message including first content and a second message, different from the first message, including second content; displaying, via the display generation component, a first summary that is based on the first content of the first message and the second content of the second message; after displaying the first summary, receiving a third message that is associated with the first message and the second message, wherein the third message includes third content; and after receiving the third message and in accordance with a determination that a first set of criteria is satisfied, displaying, via the display generation component, a second summary that is different from the first summary, wherein the second summary is based on the third content of the third message.

In accordance with some embodiments, a transitory computer-readable storage medium is described. The transitory computer-readable storage medium stores one or more programs configured to be executed by one or more processors of a computer system that is configured to communicate with a display generation component and one or more input devices, the one or more programs including instructions for: receiving a first message including first content and a second message, different from the first message, including second content; displaying, via the display generation component, a first summary that is based on the first content of the first message and the second content of the second message; after displaying the first summary, receiving a third message that is associated with the first message and the second message, wherein the third message includes third content; and after receiving the third message and in accordance with a determination that a first set of criteria is satisfied, displaying, via the display generation component, a second summary that is different from the first summary, wherein the second summary is based on the third content of the third message.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: receiving a first message including first content and a second message, different from the first message, including second content; displaying, via the display generation component, a first summary that is based on the first content of the first message and the second content of the second message; after displaying the first summary, receiving a third message that is associated with the first message and the second message, wherein the third message includes third content; and after receiving the third message and in accordance with a determination that a first set of criteria is satisfied, displaying, via the display generation component, a second summary that is different from the first summary, wherein the second summary is based on the third content of the third message.

In accordance with some embodiments, a computer system that is configured to communicate with a display generation component and one or more input devices is described. The computer system comprises: means for receiving a first message including first content and a second message, different from the first message, including second content; means for displaying, via the display generation component, a first summary that is based on the first content of the first message and the second content of the second message; means for, after displaying the first summary, receiving a third message that is associated with the first message and the second message, wherein the third message includes third content; and means for, after receiving the third message and in accordance with a determination that a first set of criteria is satisfied, displaying, via the display generation component, a second summary that is different from the first summary, wherein the second summary is based on the third content of the third message.

In accordance with some embodiments, a computer program product is described. The computer program product comprises one or more programs configured to be executed by one or more processors of a computer system that is that is in communication with a display generation component and one or more input devices. The one or more programs include instructions for: receiving a first message including first content and a second message, different from the first message, including second content; displaying, via the display generation component, a first summary that is based on the first content of the first message and the second content of the second message; after displaying the first summary, receiving a third message that is associated with the first message and the second message, wherein the third message includes third content; and after receiving the third message and in accordance with a determination that a first set of criteria is satisfied, displaying, via the display generation component, a second summary that is different from the first summary, wherein the second summary is based on the third content of the third message.

In accordance with some embodiments, a method performed at a computer system that is in communication with a display generation component and one or more input devices is described. The method comprises: detecting, via the one or more input devices, a request to display one or more messages of a first message thread; and in response to detecting the request to display the one or more messages of the first message thread, displaying, via the display generation component, a user interface that includes the one or more messages of the first message thread, including: in accordance with a determination that a first message is unread, displaying a first summary element at a first location in the first message thread, wherein the first summary element, when selected, causes the computer system to display a summary of a first set of one or more messages of the first message thread; and in accordance with a determination that the first message is not unread, displaying the first summary element at a second location in the first message thread, wherein the second location is different from the first location.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a request to display one or more messages of a first message thread; and in response to detecting the request to display the one or more messages of the first message thread, displaying, via the display generation component, a user interface that includes the one or more messages of the first message thread, including: in accordance with a determination that a first message is unread, displaying a first summary element at a first location in the first message thread, wherein the first summary element, when selected, causes the computer system to display a summary of a first set of one or more messages of the first message thread; and in accordance with a determination that the first message is not unread, displaying the first summary element at a second location in the first message thread, wherein the second location is different from the first location.

In accordance with some embodiments, a transitory computer-readable storage medium is described. The transitory computer-readable storage medium stores one or more programs configured to be executed by one or more processors of a computer system that is configured to communicate with a display generation component and one or more input devices, the one or more programs including instructions for: detecting, via the one or more input devices, a request to display one or more messages of a first message thread; and in response to detecting the request to display the one or more messages of the first message thread, displaying, via the display generation component, a user interface that includes the one or more messages of the first message thread, including: in accordance with a determination that a first message is unread, displaying a first summary element at a first location in the first message thread, wherein the first summary element, when selected, causes the computer system to display a summary of a first set of one or more messages of the first message thread; and in accordance with a determination that the first message is not unread, displaying the first summary element at a second location in the first message thread, wherein the second location is different from the first location.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: detecting, via the one or more input devices, a request to display one or more messages of a first message thread; and in response to detecting the request to display the one or more messages of the first message thread, displaying, via the display generation component, a user interface that includes the one or more messages of the first message thread, including: in accordance with a determination that a first message is unread, displaying a first summary element at a first location in the first message thread, wherein the first summary element, when selected, causes the computer system to display a summary of a first set of one or more messages of the first message thread; and in accordance with a determination that the first message is not unread, displaying the first summary element at a second location in the first message thread, wherein the second location is different from the first location.

In accordance with some embodiments, a computer system that is configured to communicate with a display generation component and one or more input devices is described. The computer system comprises: means for detecting, via the one or more input devices, a request to display one or more messages of a first message thread; and means for, in response to detecting the request to display the one or more messages of the first message thread, displaying, via the display generation component, a user interface that includes the one or more messages of the first message thread, including: in accordance with a determination that a first message is unread, displaying a first summary element at a first location in the first message thread, wherein the first summary element, when selected, causes the computer system to display a summary of a first set of one or more messages of the first message thread; and in accordance with a determination that the first message is not unread, displaying the first summary element at a second location in the first message thread, wherein the second location is different from the first location.

In accordance with some embodiments, a computer program product is described. The computer program product comprises one or more programs configured to be executed by one or more processors of a computer system that is that is in communication with a display generation component and one or more input devices. The one or more programs include instructions for: detecting, via the one or more input devices, a request to display one or more messages of a first message thread; and in response to detecting the request to display the one or more messages of the first message thread, displaying, via the display generation component, a user interface that includes the one or more messages of the first message thread, including: in accordance with a determination that a first message is unread, displaying a first summary element at a first location in the first message thread, wherein the first summary element, when selected, causes the computer system to display a summary of a first set of one or more messages of the first message thread; and in accordance with a determination that the first message is not unread, displaying the first summary element at a second location in the first message thread, wherein the second location is different from the first location.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying message summaries, thereby increasing the effectiveness, efficiency, and user satisfaction with such devices. Such methods and interfaces may complement or replace other methods for displaying message summaries.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying message summaries. Electronic devices display communication user interfaces that include multiple messages. There is a need for electronic devices to display a summary for the messages based on different conditions being met and, in some instances, forgo display of a summary for a particular message. Such techniques can reduce the cognitive burden on a user who views messages, thereby enhancing productivity. Further, such techniques can reduce processor and battery power otherwise wasted on redundant user inputs.

Figure 7:
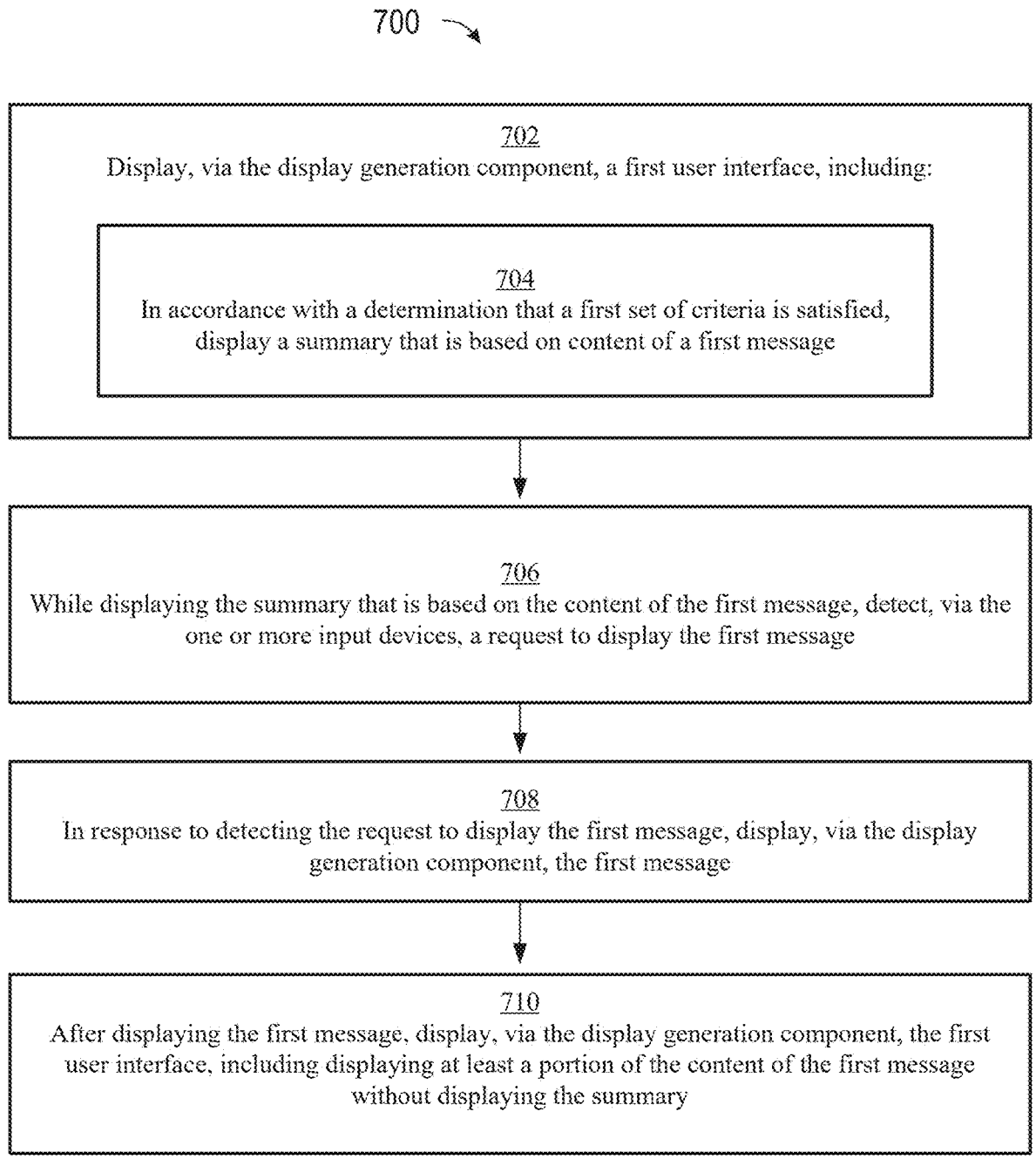
FIG. 7 is a flow diagram illustrating a method for displaying a summary for a message in accordance with some embodiments.
Figure 8:
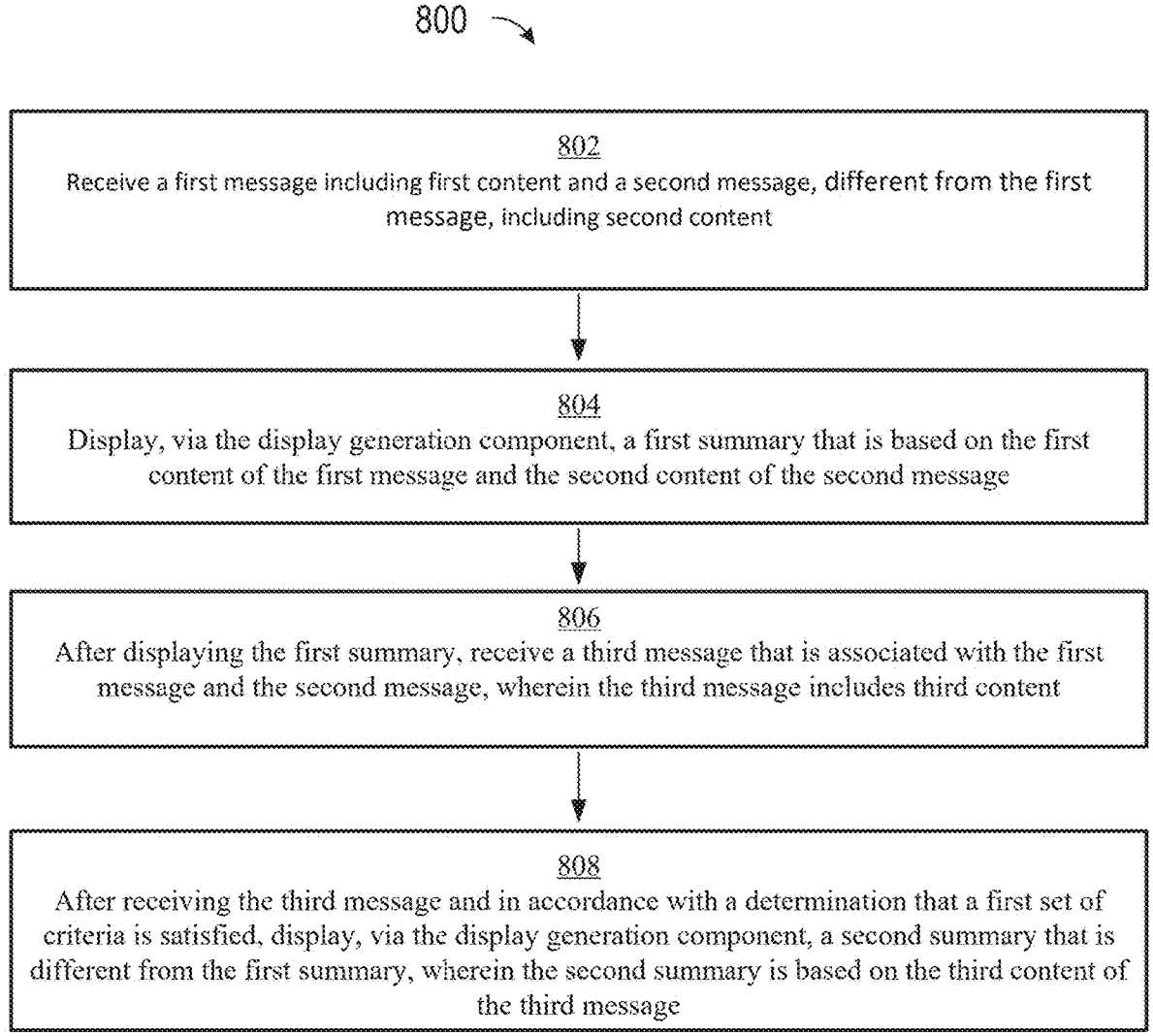
FIG. 8 is a flow diagram illustrating a method for displaying a summary for related messages in accordance with some embodiments.
Figure 9A:
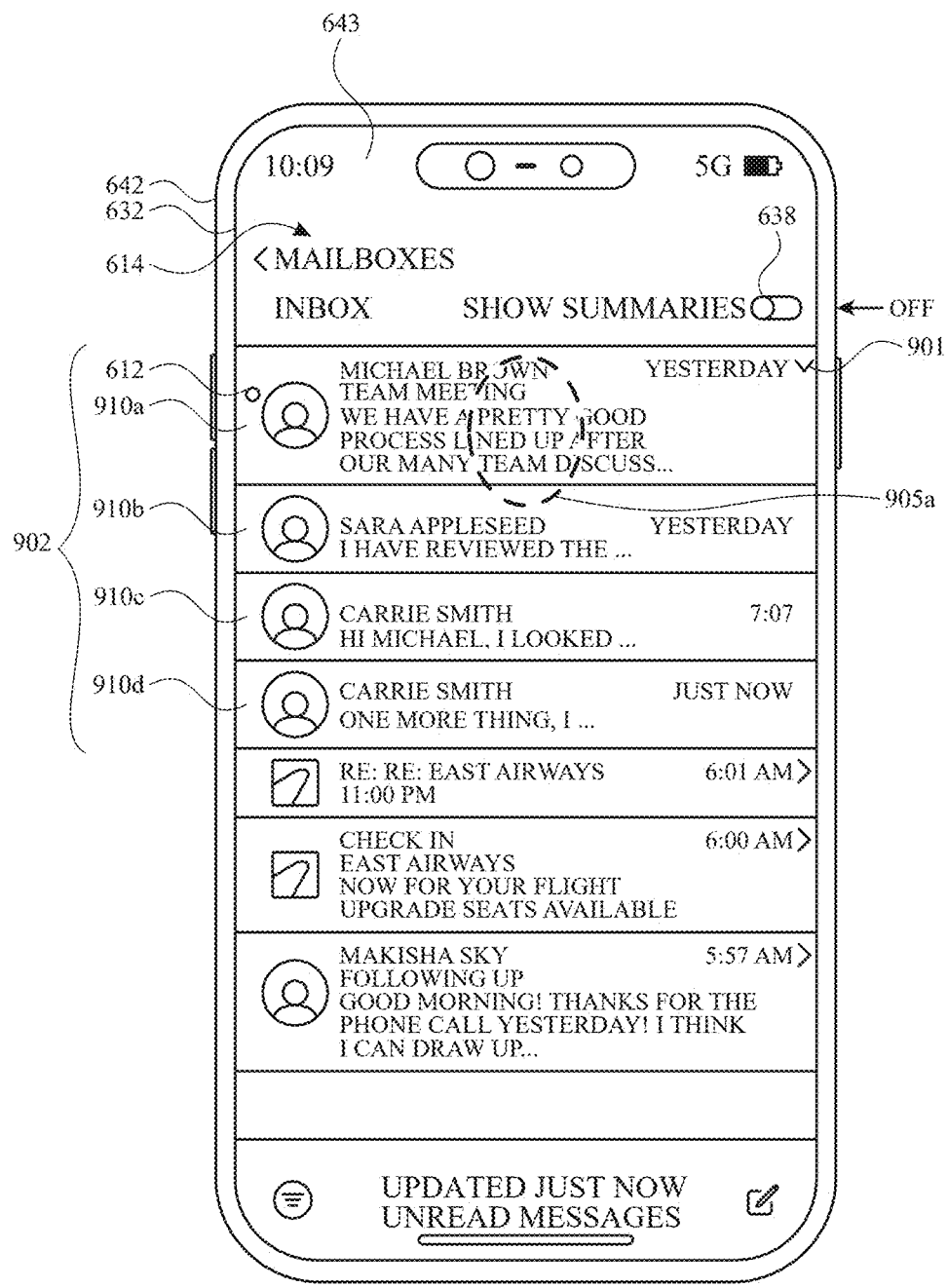
FIGS. 9A-9P illustrate user interfaces for displaying a message summary affordance, in accordance with some embodiments.
Figure 9P:
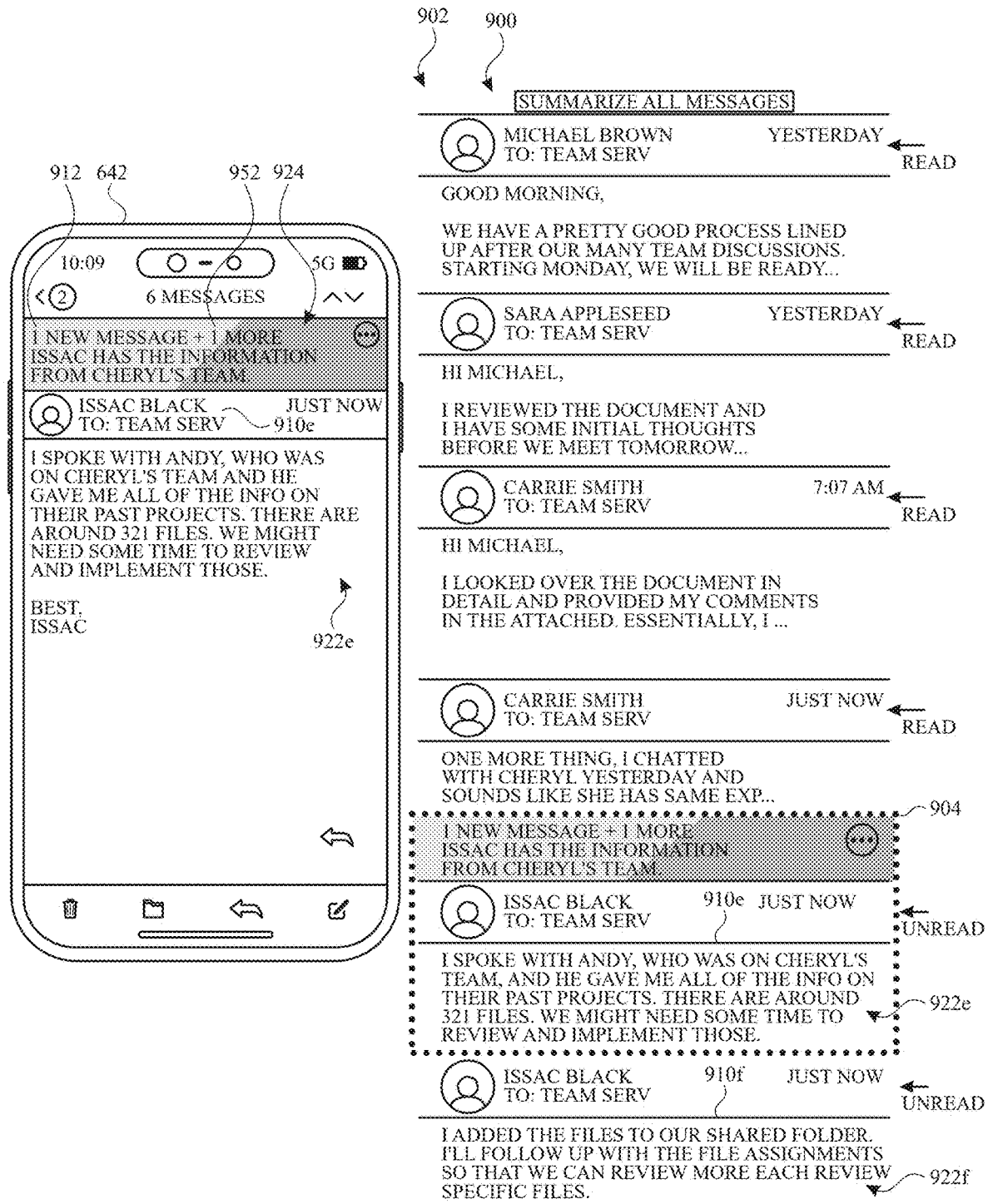
Figure 10:
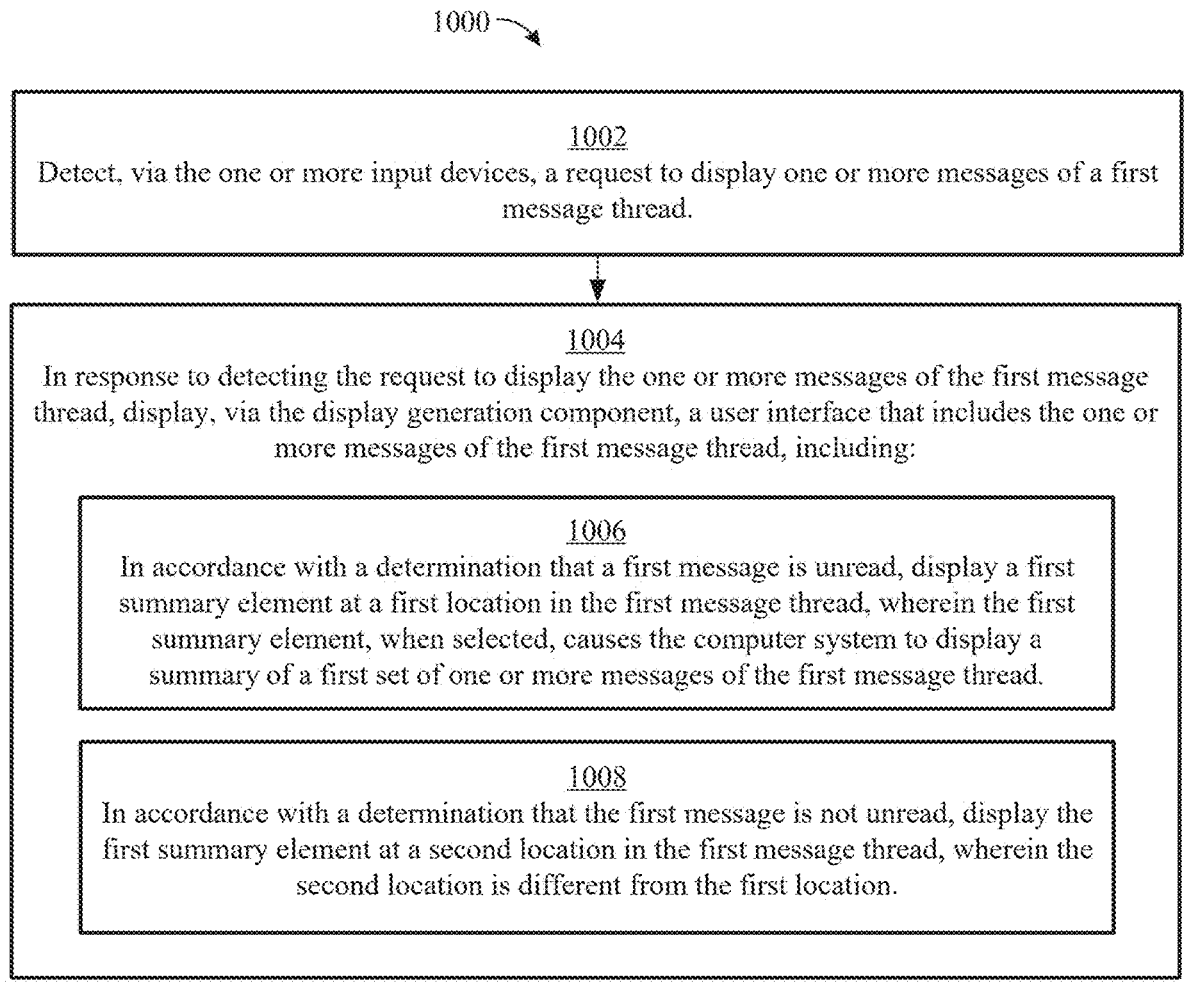
FIG. 10 is a flow diagram illustrating a method for displaying a message summary affordance in accordance with some embodiments.

Below, FIGS. 1A-1B, 2, 3A-3G, 4A-4B, and 5A-5B provide a description of devices for performing the techniques for displaying message summaries. FIGS. 6A-6AD illustrate user interfaces for managing event notifications in accordance with some embodiments. FIG. 7 is a flow diagram illustrating methods of displaying a summary for a message in accordance with some embodiments. FIG. 8 is a flow diagram illustrating methods of displaying a summary for related messages in accordance with some embodiments. The user interfaces in FIGS. 6A-6AD are used to illustrate the processes described below, including the processes in FIGS. 7-8. FIGS. 9A-9P illustrate user interfaces for displaying a message summary affordance, in accordance with some embodiments. FIG. 10 is a flow diagram illustrating a method for displaying a message summary affordance in accordance with some embodiments.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, reduce the amount of time that a user needs to spend in viewing a message, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen and/or touchpads), are, optionally, used. It should also be understood that, in some embodiments, the device is not a portable communications device, but is a desktop computer with a touch-sensitive surface (e.g., a touch screen and/or a touchpad). In some embodiments, the electronic device is a computer system that is in communication (e.g., via wireless communication, via wired communication) with a display generation component (e.g., a display device such as a head-mounted display (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
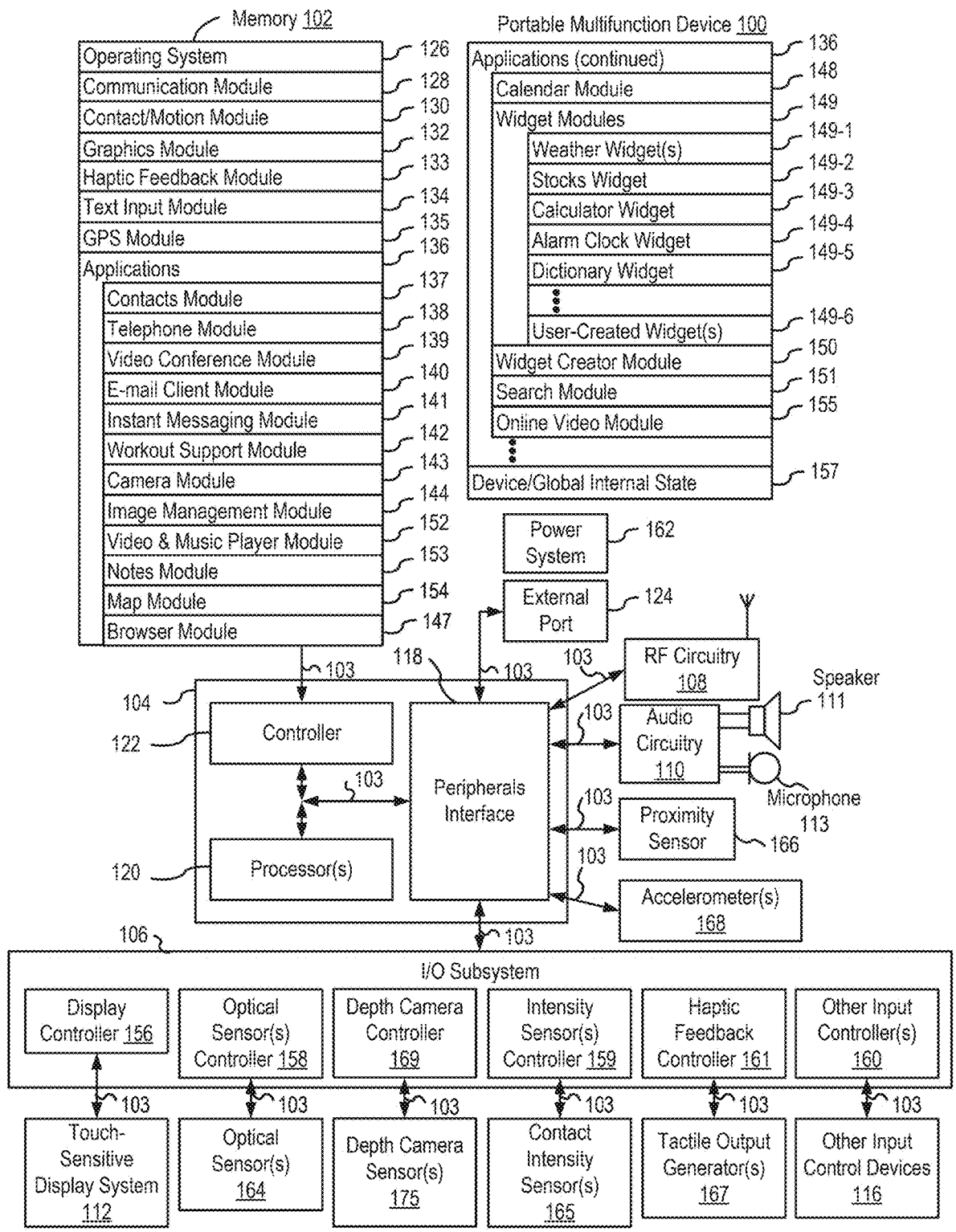
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio.

The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display system 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device so that the touch screen is enabled for use as a viewfinder for still and/or video image acquisition. In some embodiments, an optical sensor is located on the front of the device so that the user's image is, optionally, obtained for video conferencing while the user views the other video conference participants on the touch screen. In some embodiments, the position of optical sensor 164 can be changed by the user (e.g., by rotating the lens and the sensor in the device housing) so that a single optical sensor 164 is used along with the touch screen for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
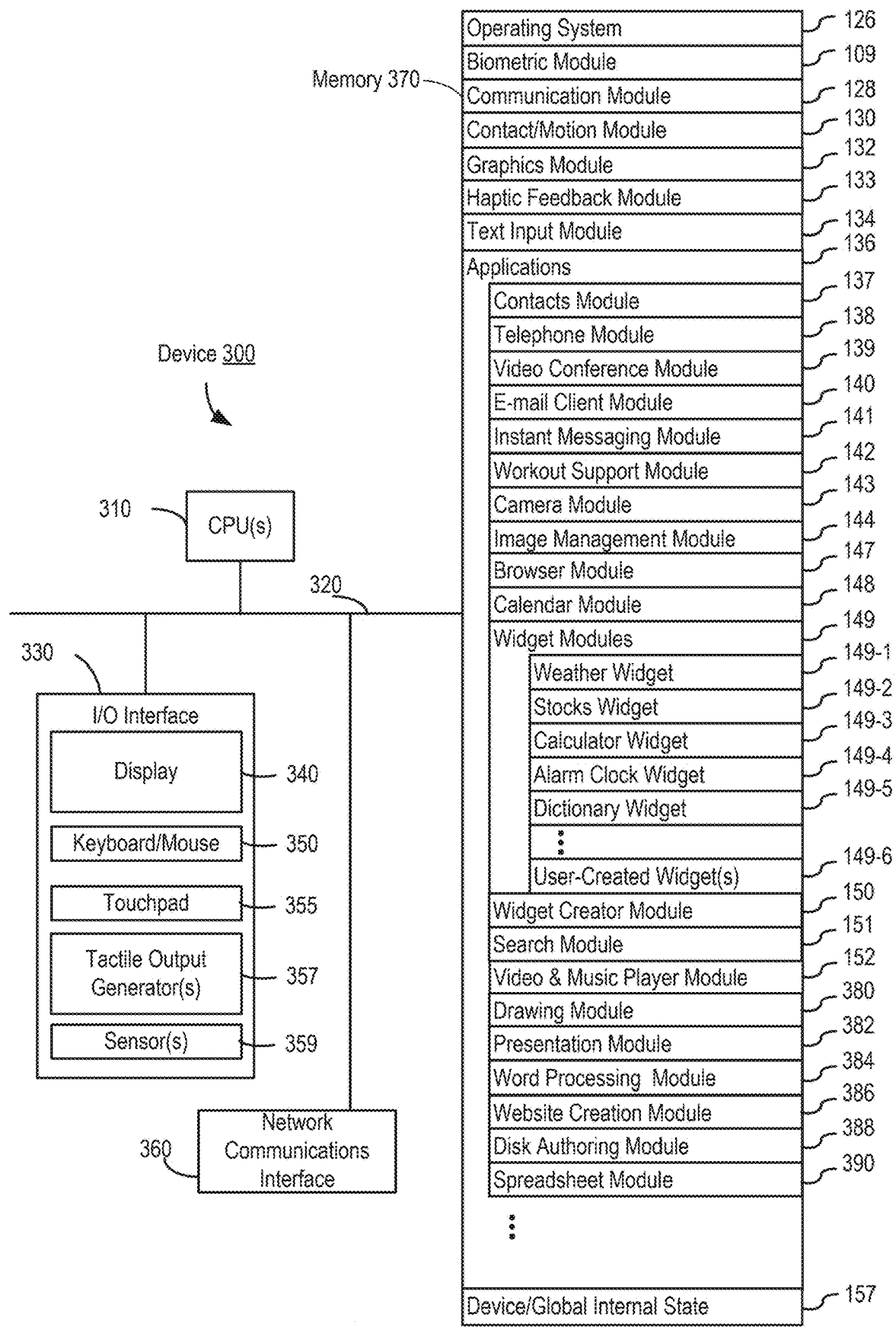
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
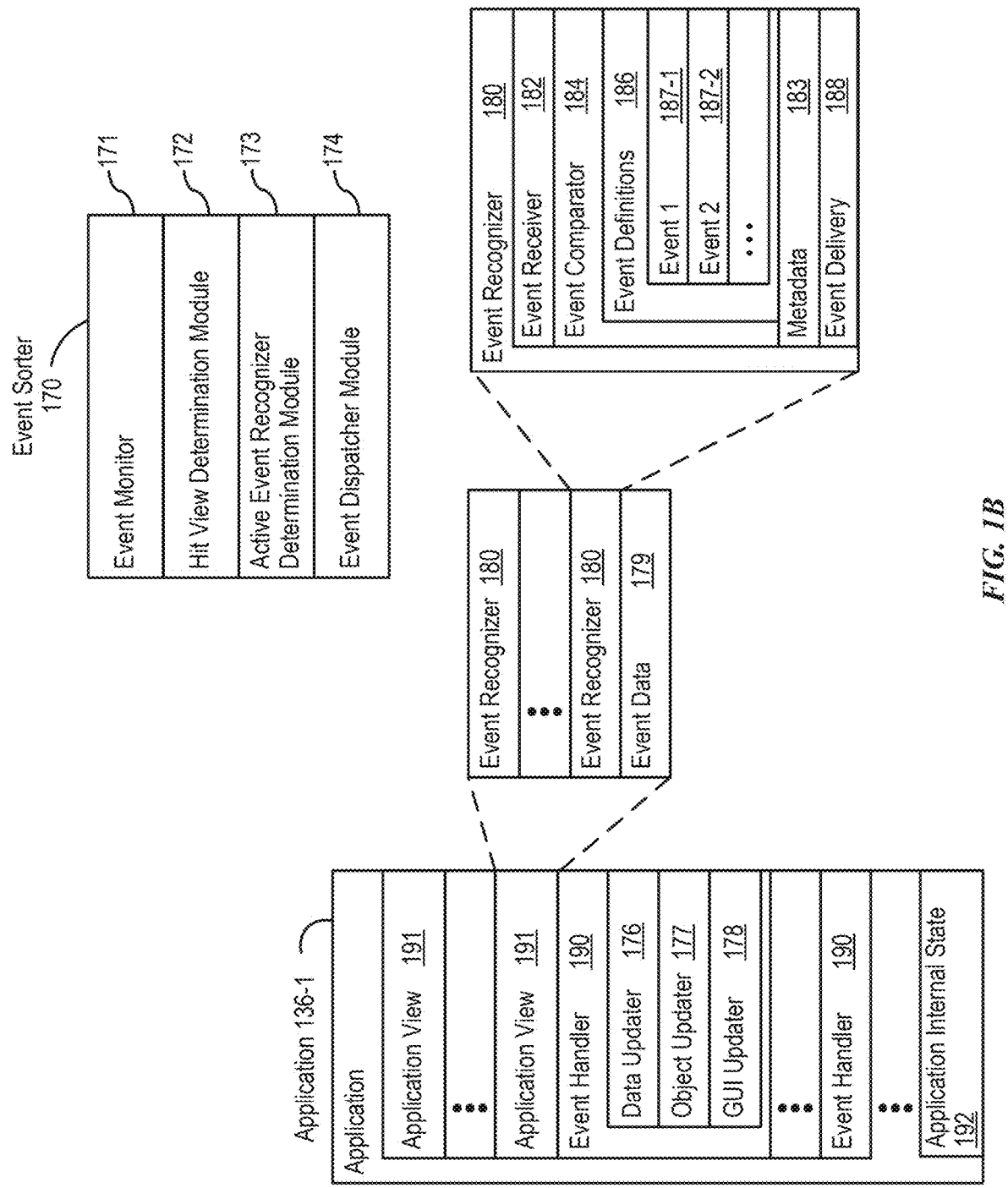
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
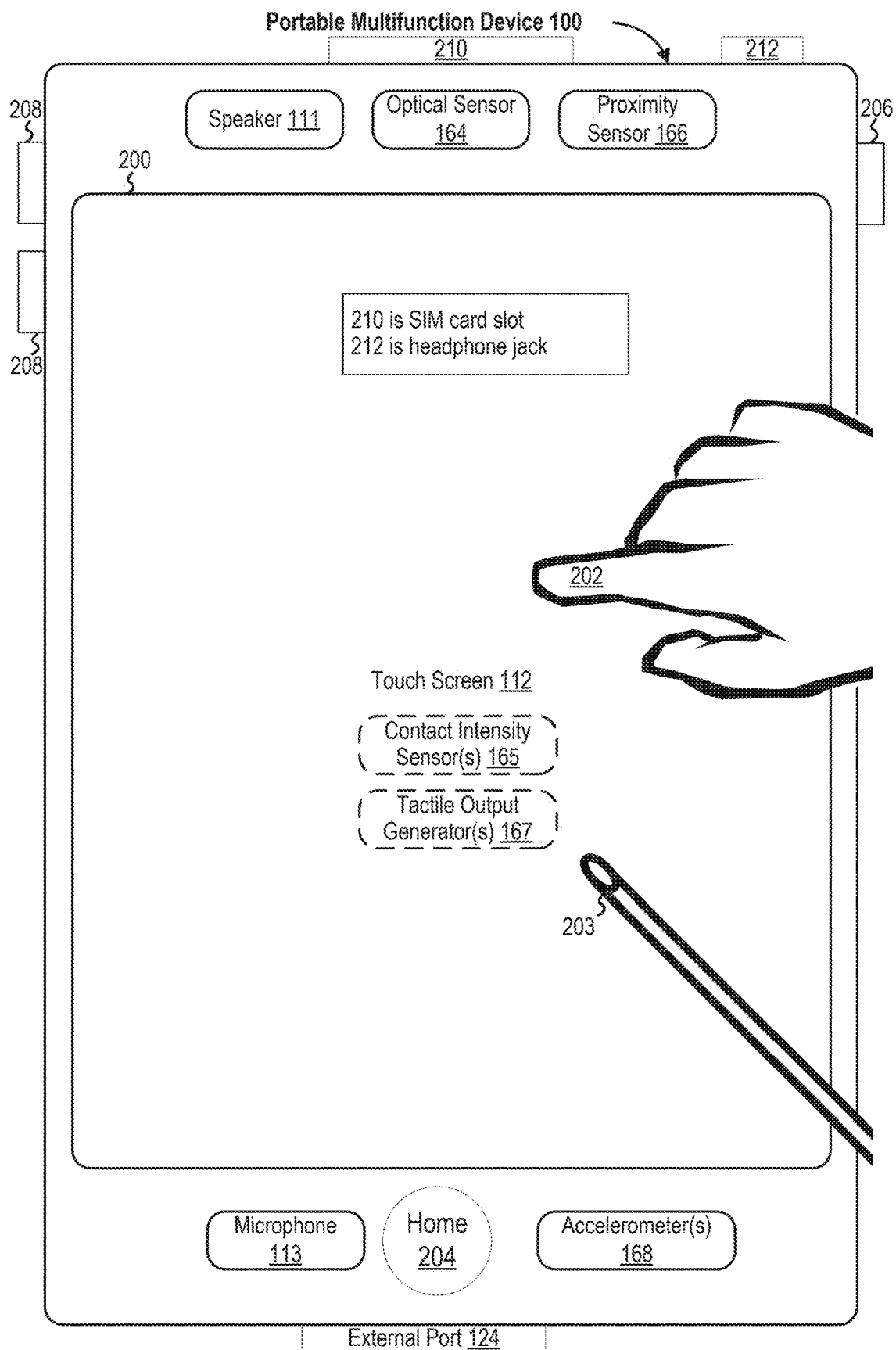
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
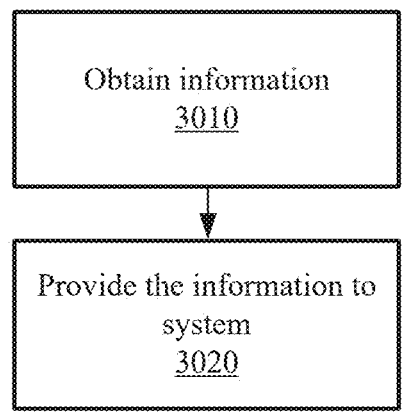
FIGS. 3B-3G illustrate the use of Application Programming Interfaces (APIs) to perform operations.
Figure 3C:
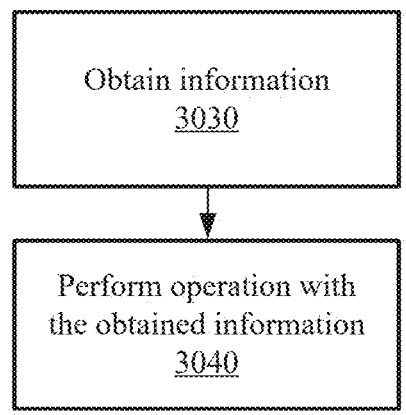

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
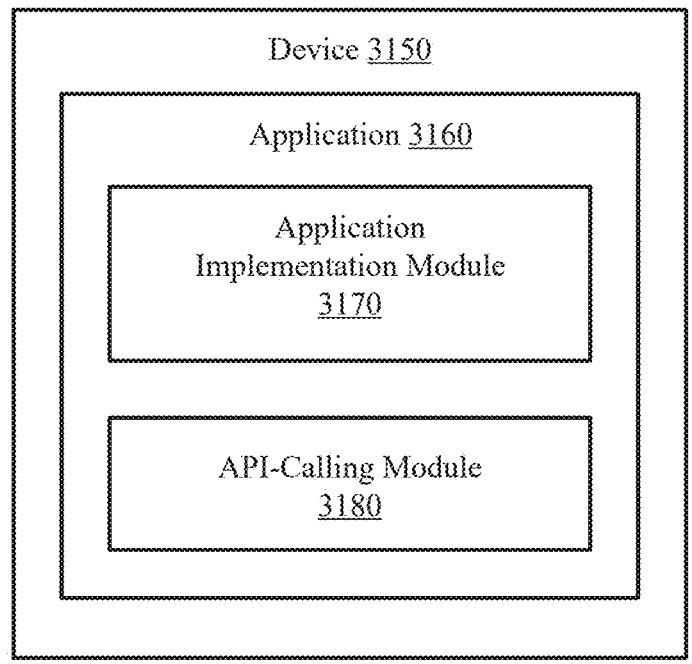
Figure 3E:
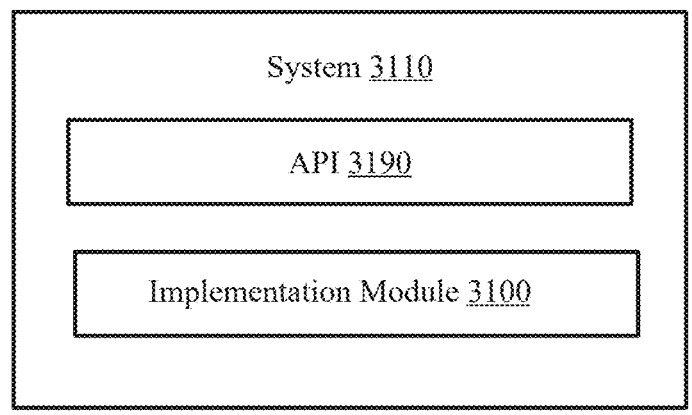
Figure 3F:
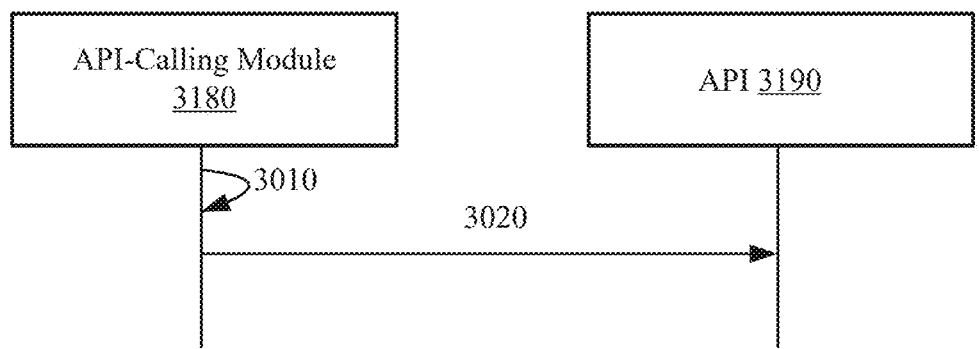

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
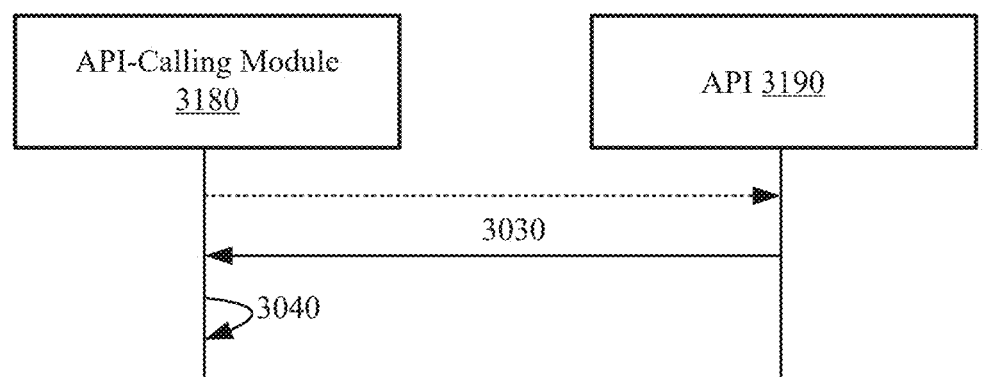

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 700, 800, and/or 1000 (FIGS. 7, 8, and/or 10) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
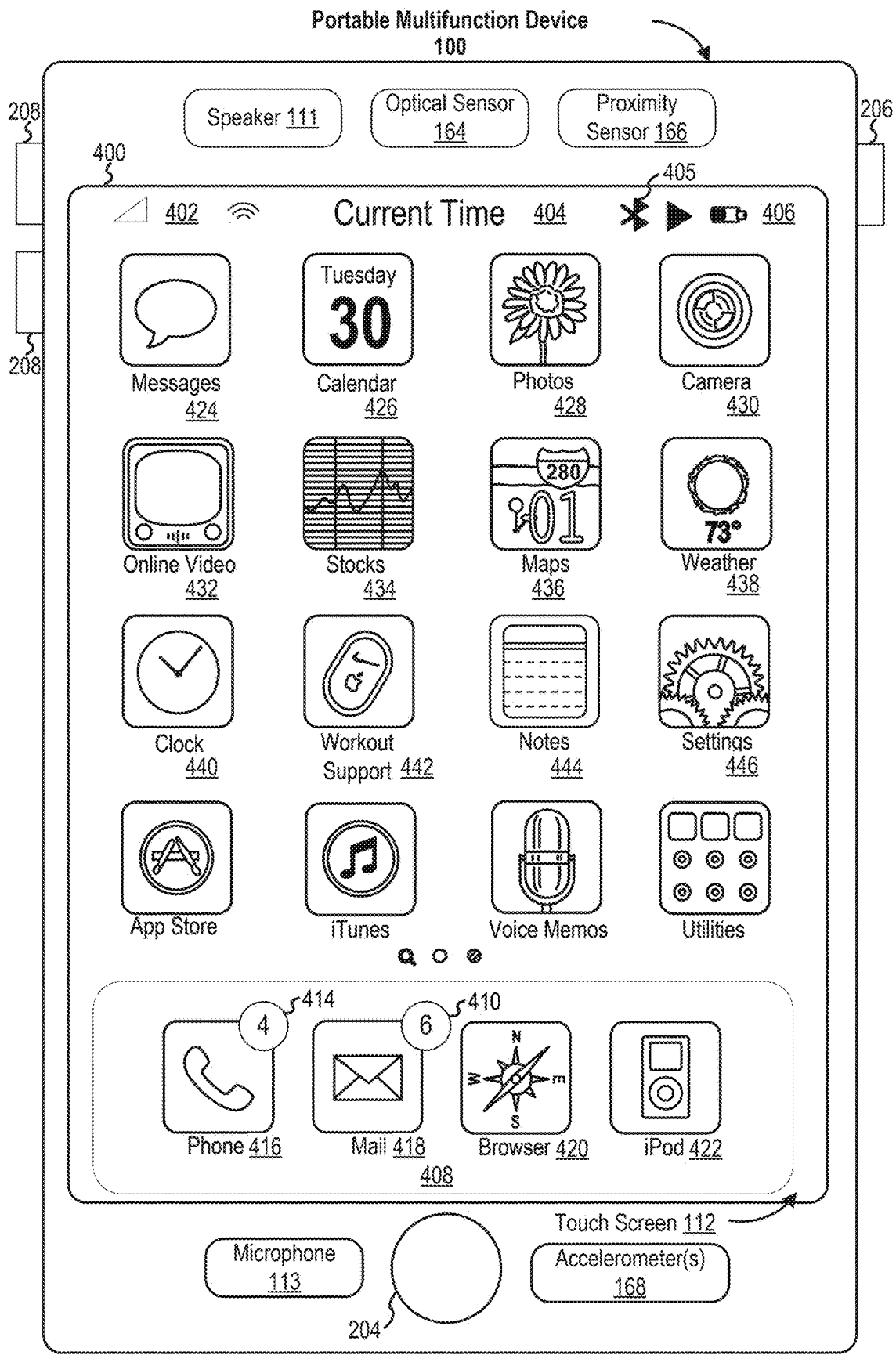
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
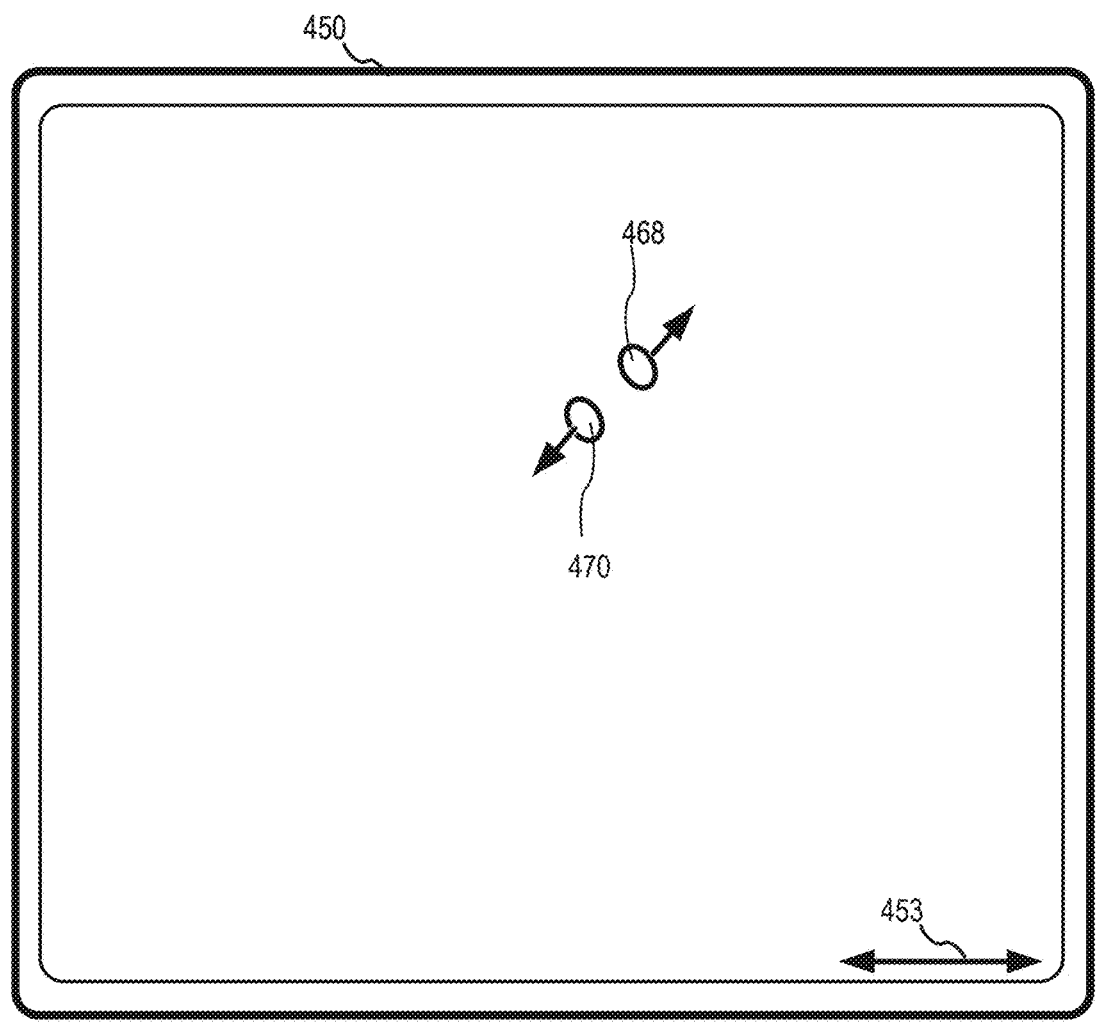
FIG. 4B illustrates an exemplary user interface for a multifunction device with a touch-sensitive surface that is separate from the display in accordance with some embodiments.
Figure 4B:
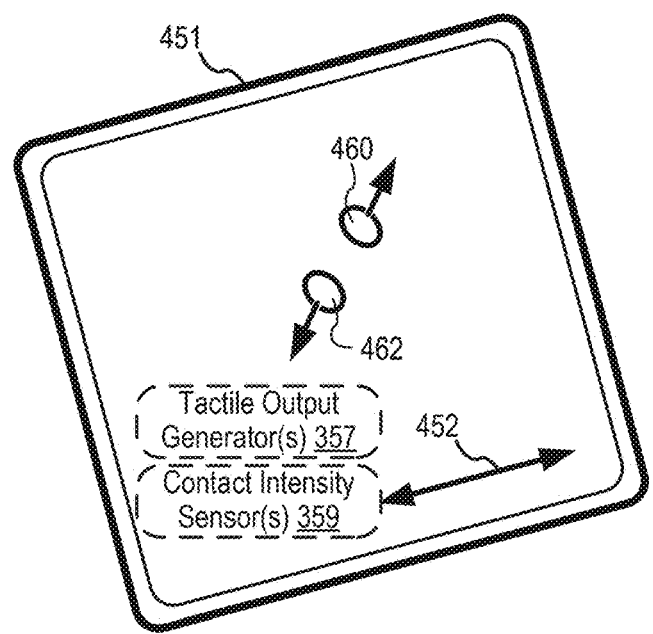

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
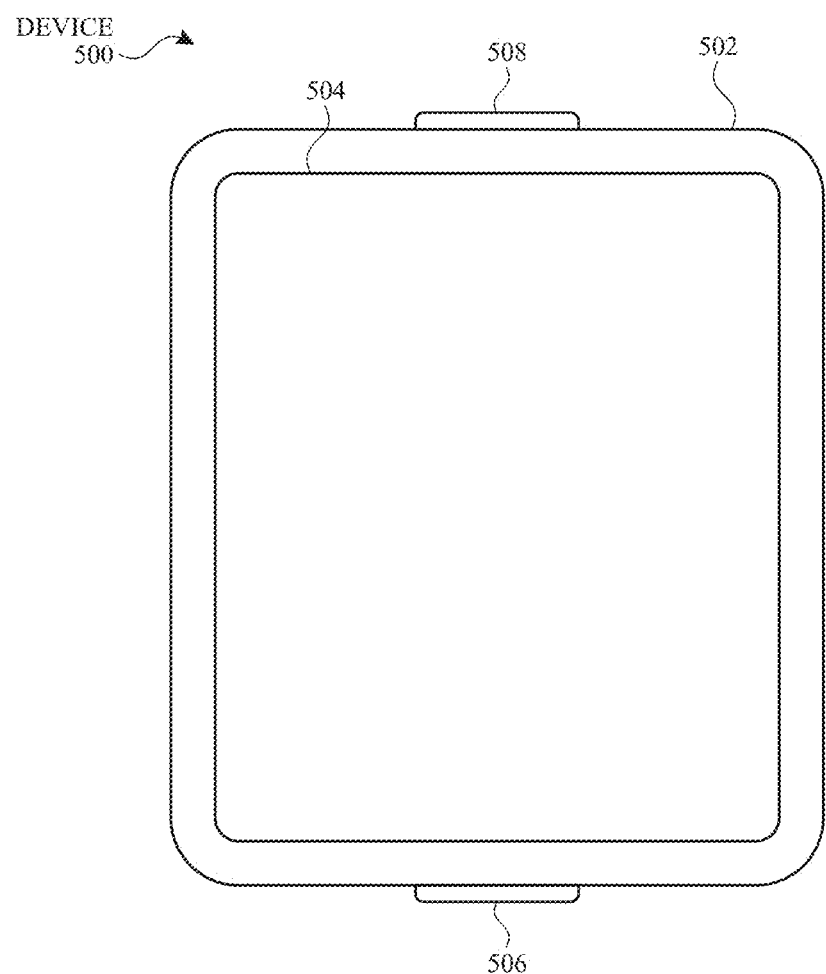
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
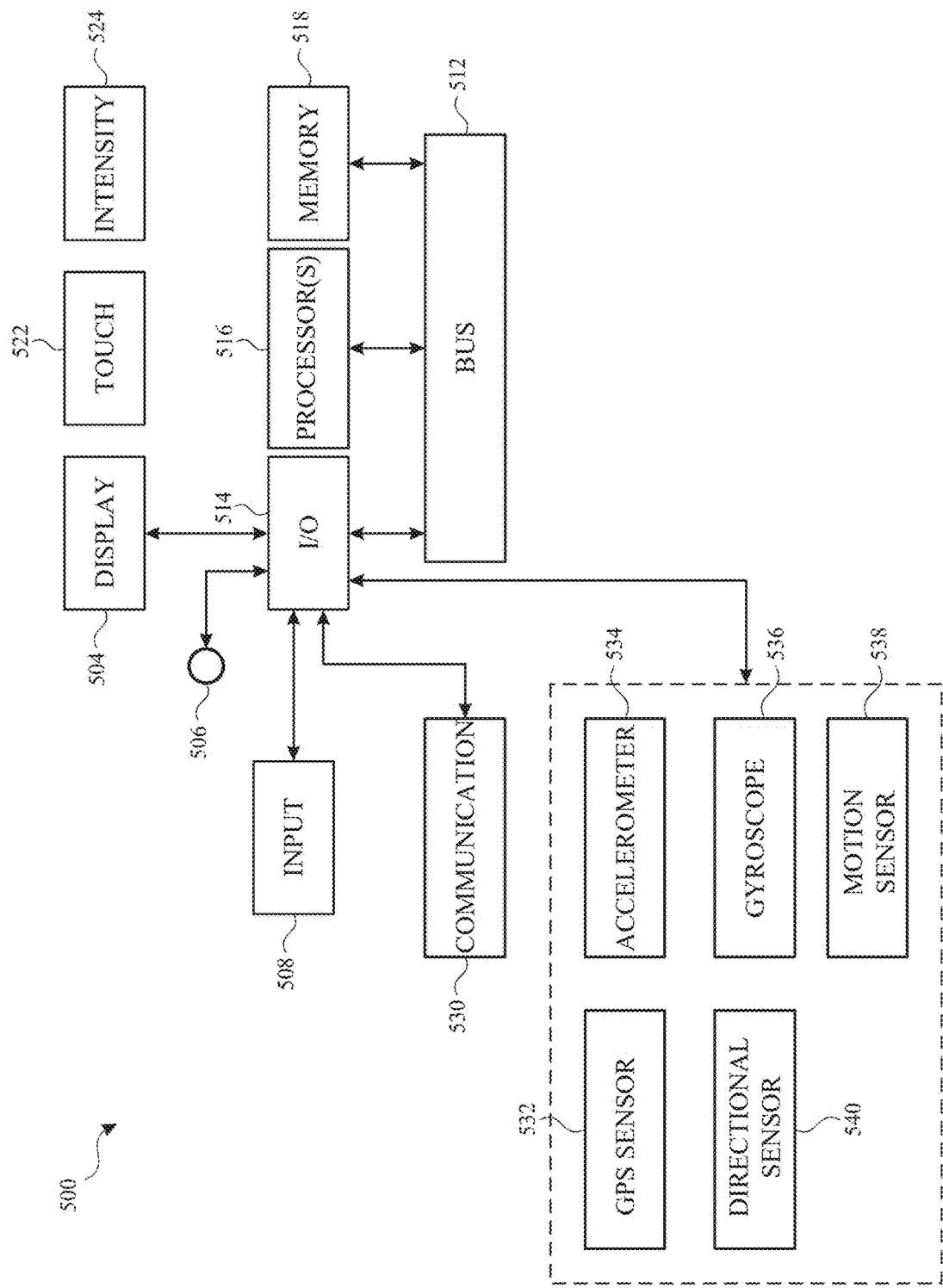
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to touch screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 800 (FIGS. 7 and 8). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen (e.g., touch-sensitive display system 112 in FIG. 1A or touch screen 112 in FIG. 4A) that enables direct interaction with user interface elements on the touch screen, a detected contact on the touch screen acts as a "focus selector" so that when an input (e.g., a press input by the contact) is detected on the touch screen at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

As described herein, content is automatically generated by one or more computers in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes is referred to as generative content (e.g., generative images, generative graphics, generative video, generative audio, and/or generative text). Generative content is typically generated by an AI process based on a prompt that is provided to the AI process. An AI process typically uses one or more AI models to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content. Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

Attention is now directed towards embodiments of user interfaces ("UI") and associated processes that are implemented on an electronic device, such as portable multifunction device 100, device 300, or device 500.

FIGS. 6A-6AD illustrate user interfaces for displaying message summaries, in accordance with some embodiments. The user interfaces in these figures are used to illustrate the processes described below, including the processes in FIGS. 7 and 8.

Figure 6B:
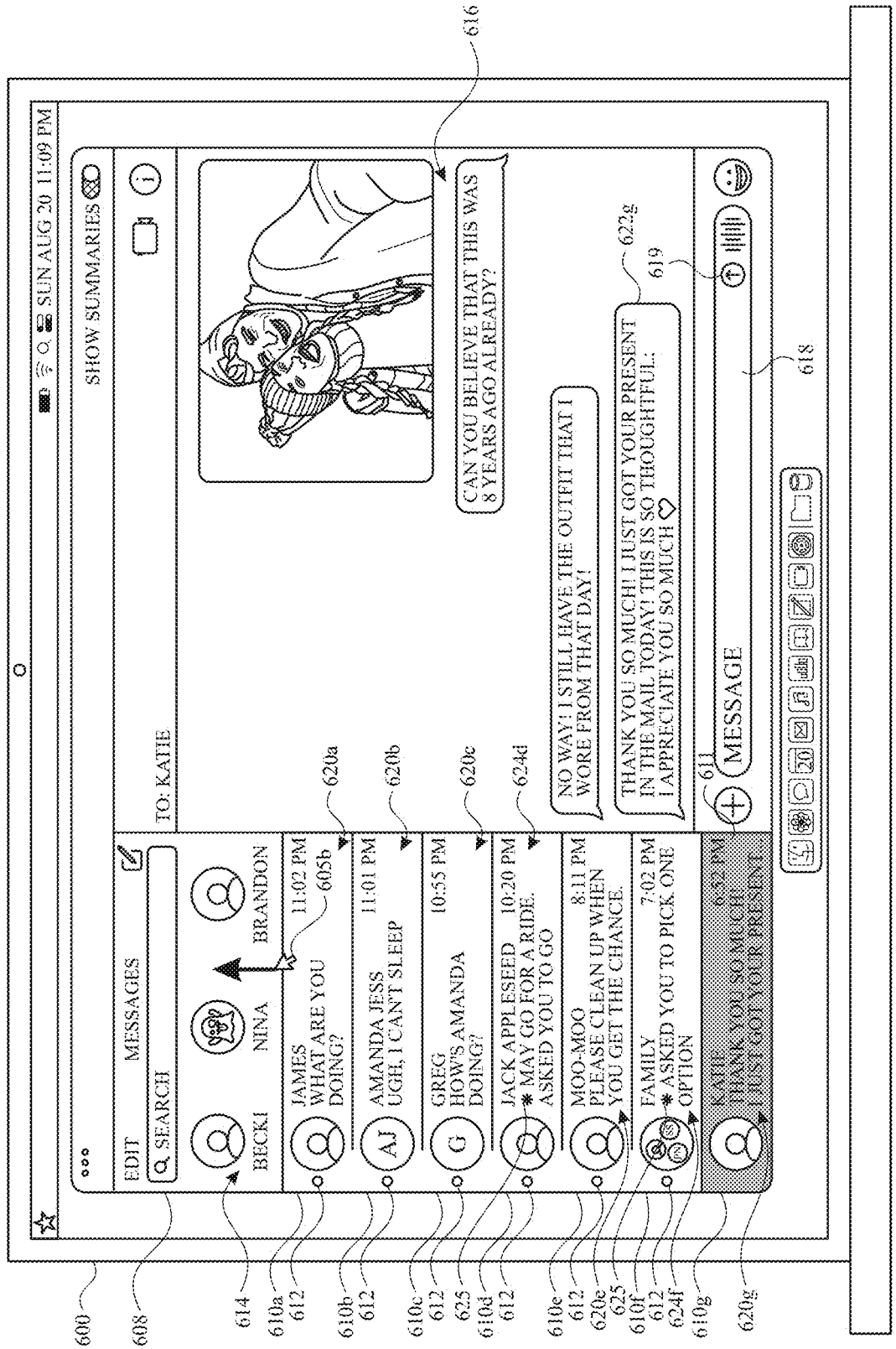
FIGS. 6A-6AD illustrate user interfaces for displaying message summaries in accordance with some embodiments.
Figure 6C:
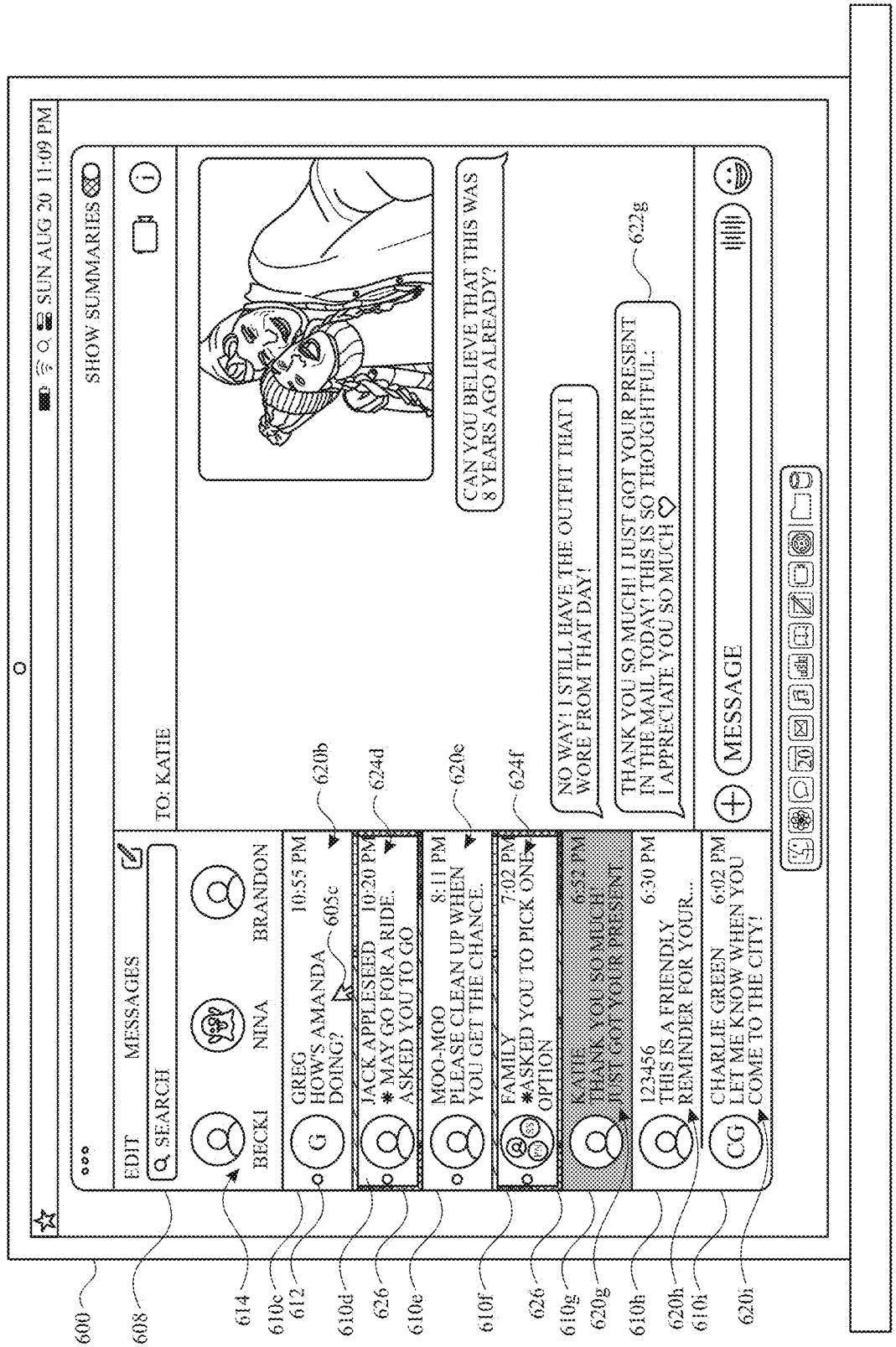
Figure 6D:
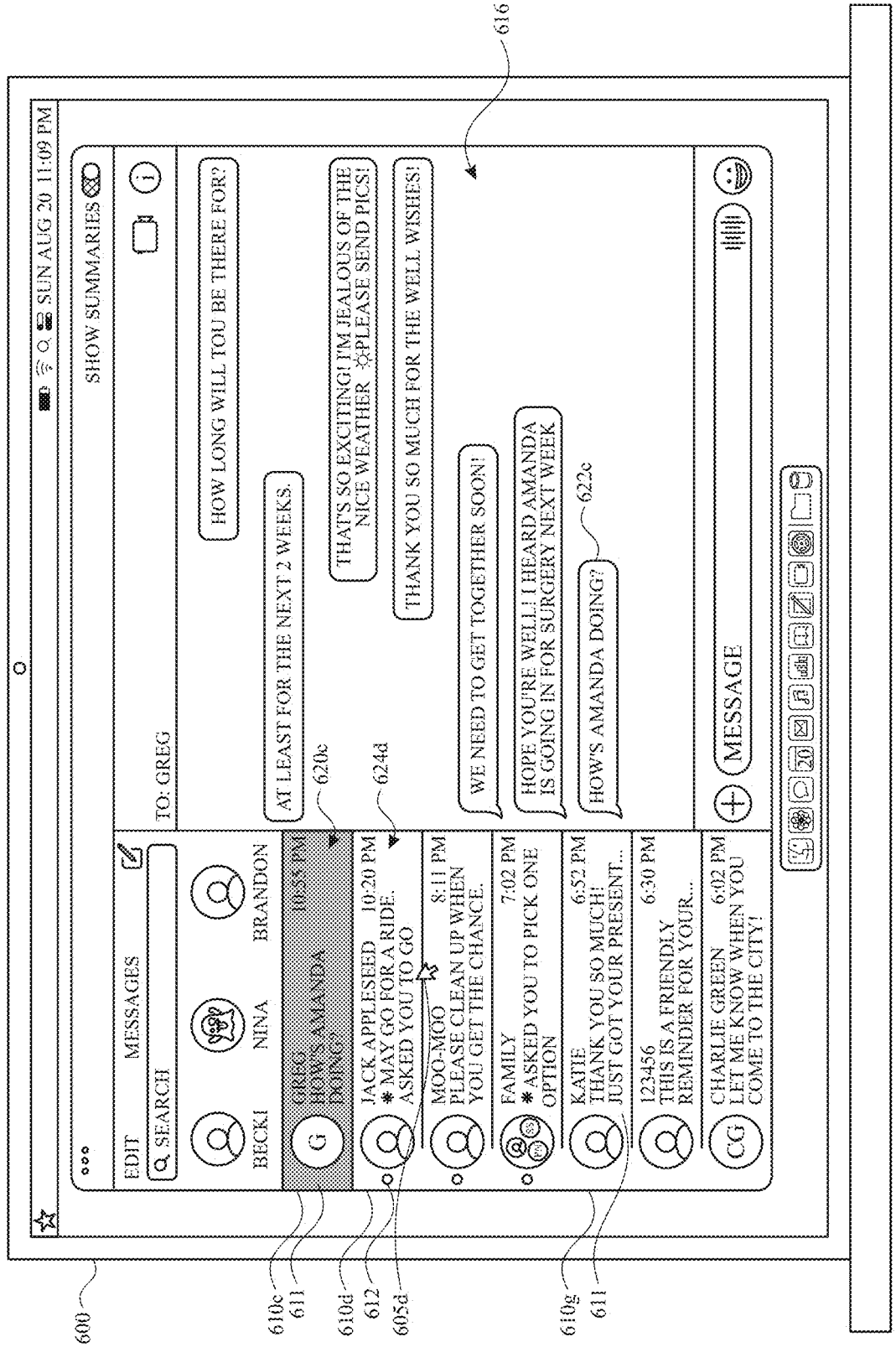
Figure 6E:
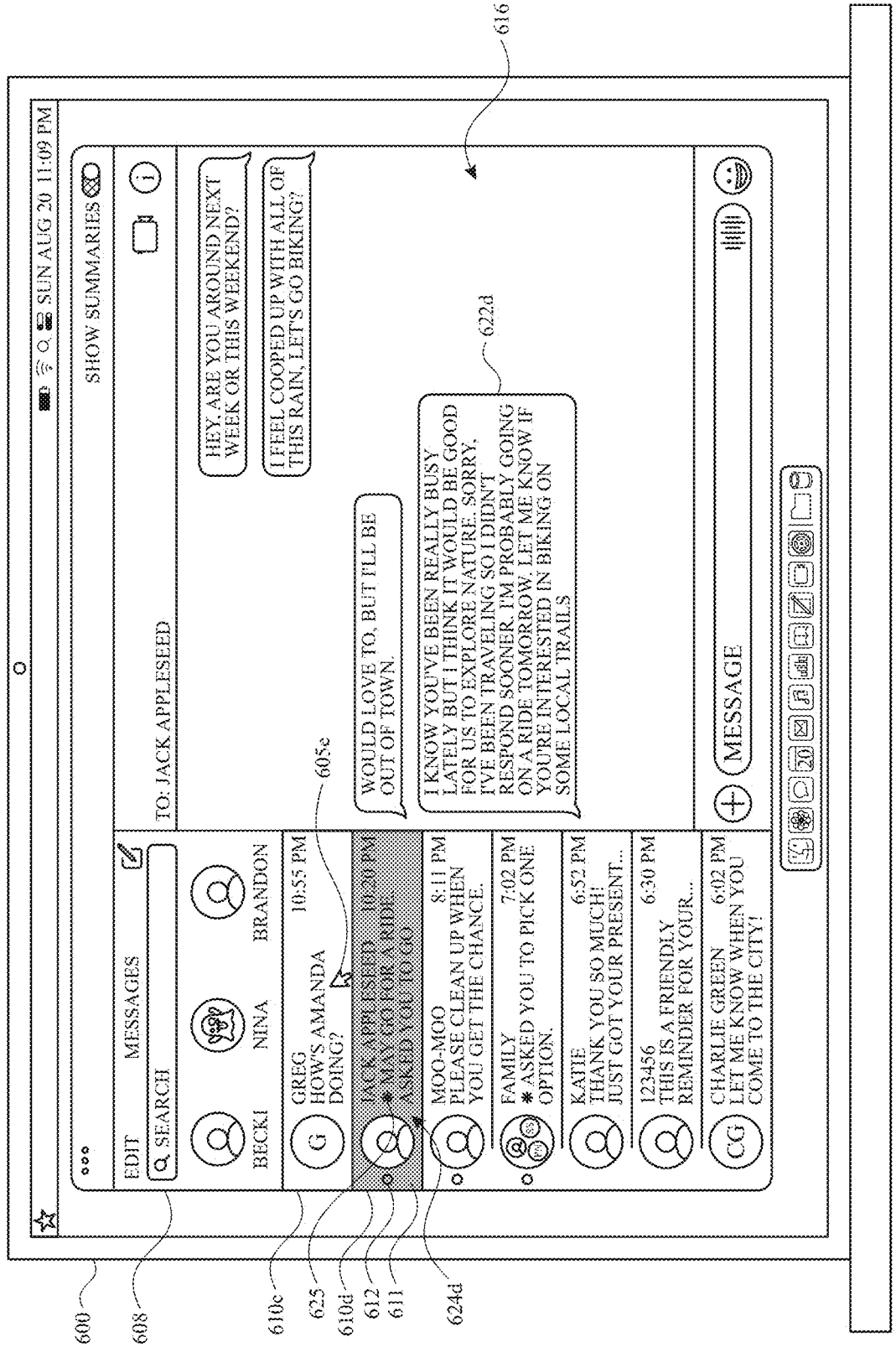
Figure 6F:
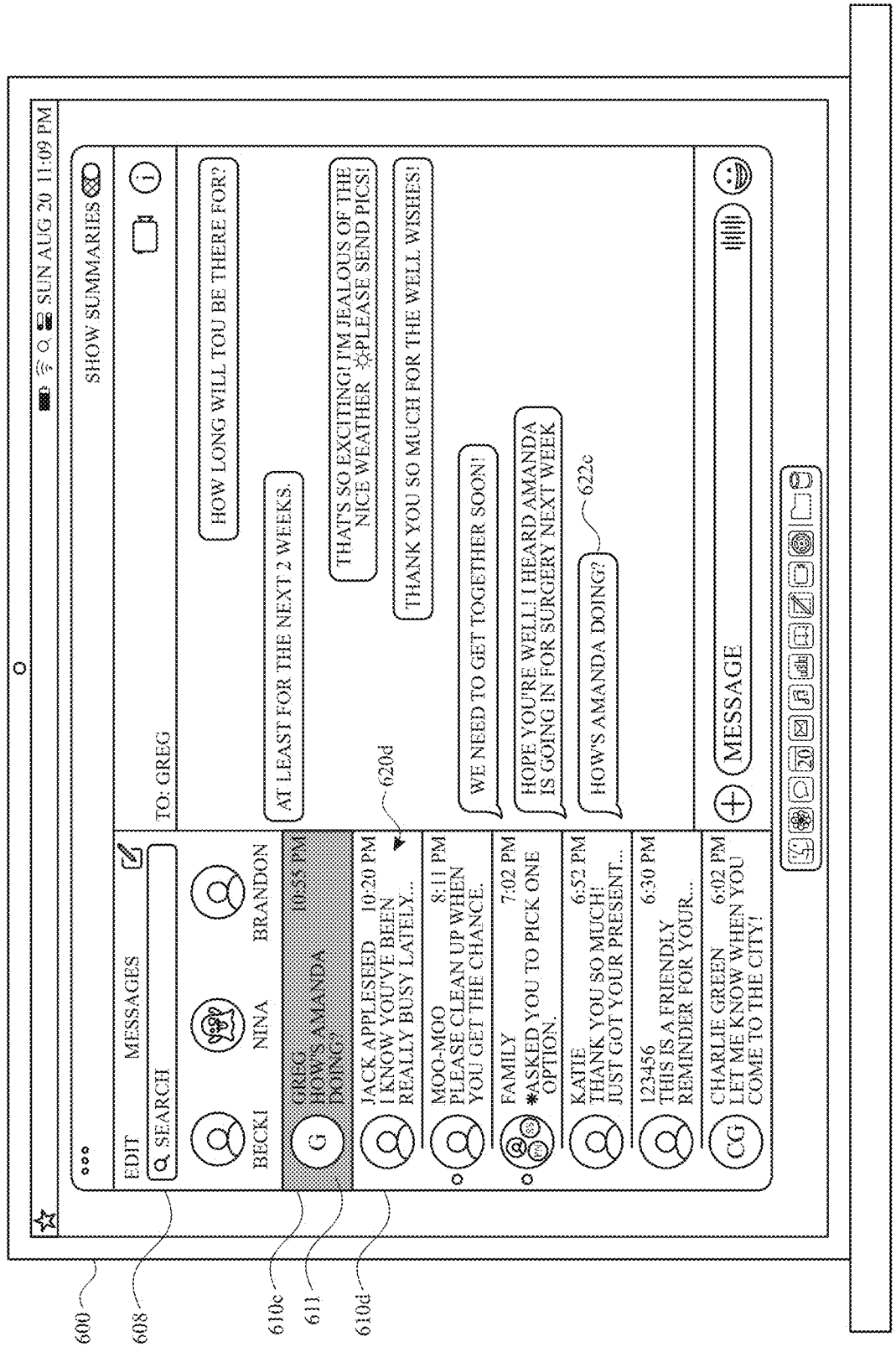
Figure 6G:
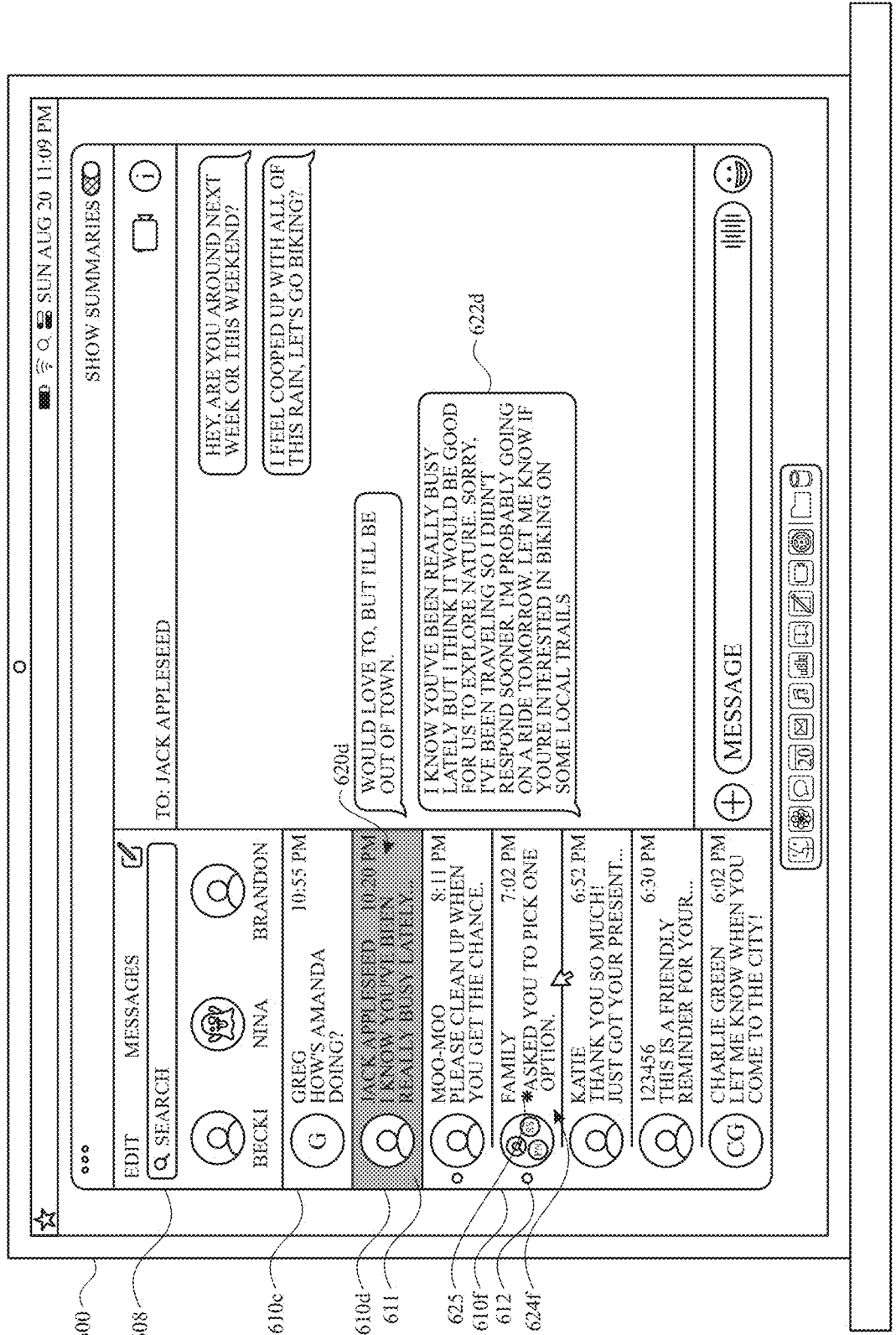
Figure 6H:
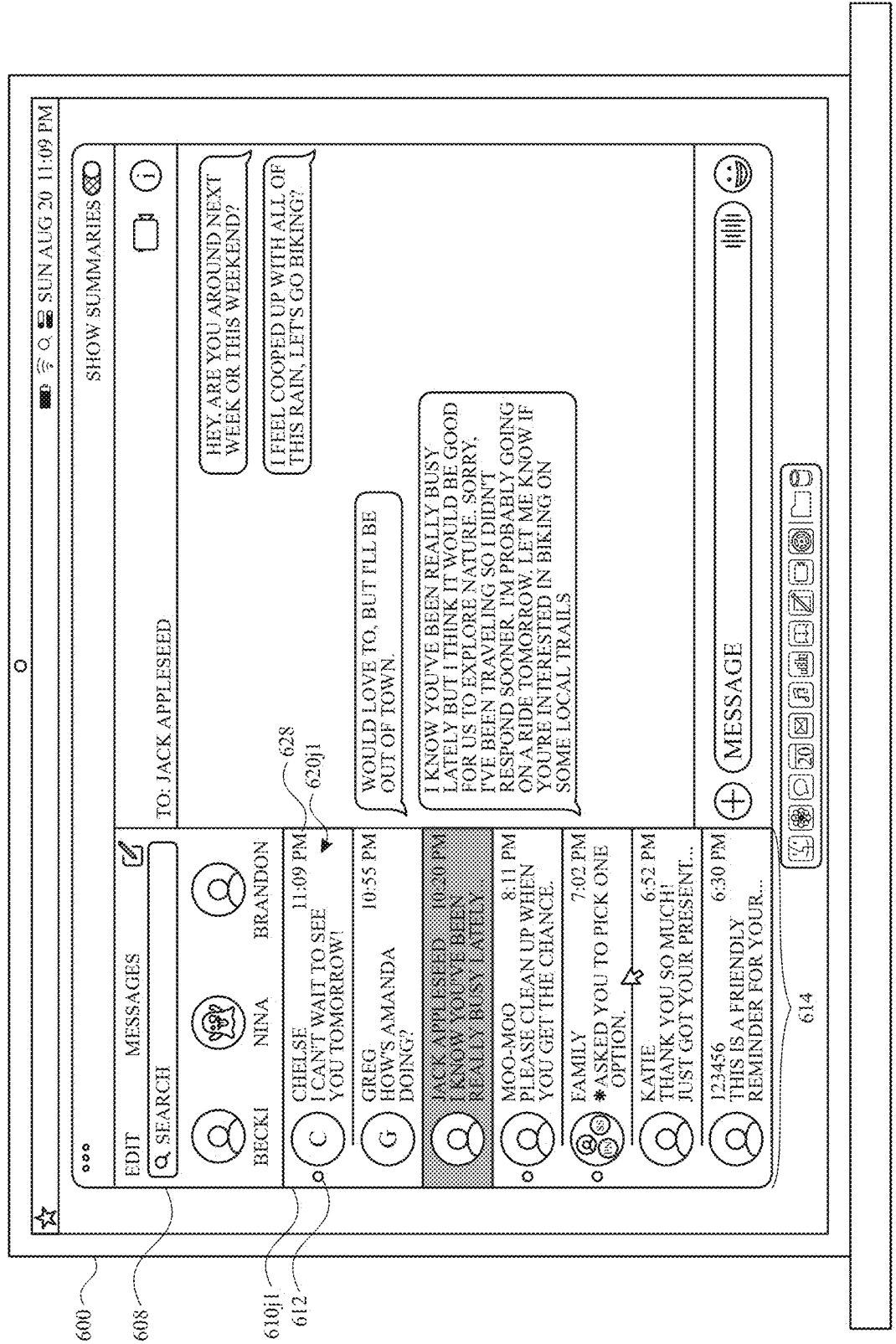
Figure 6I:
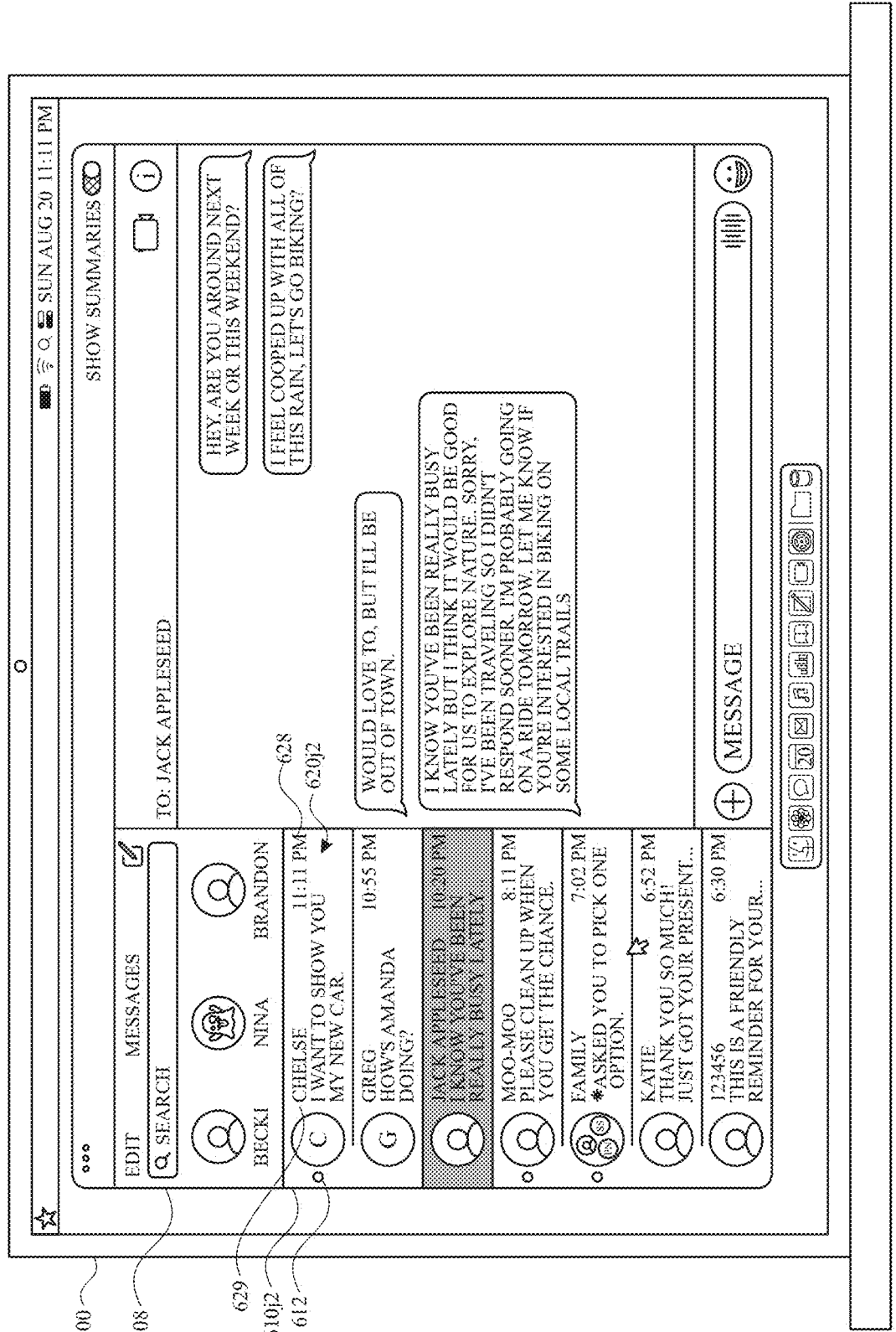
Figure 6J:
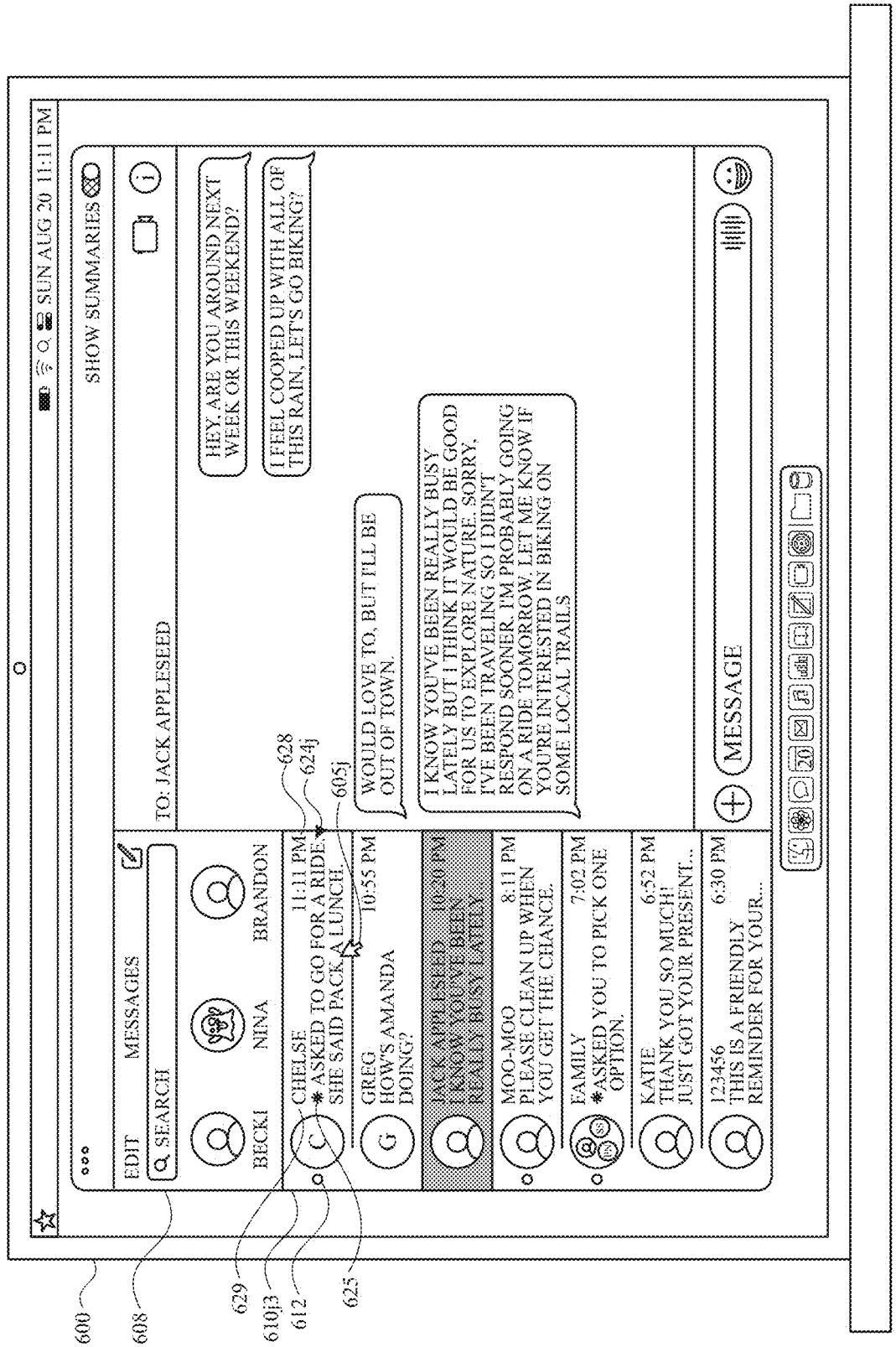
Figure 6K:
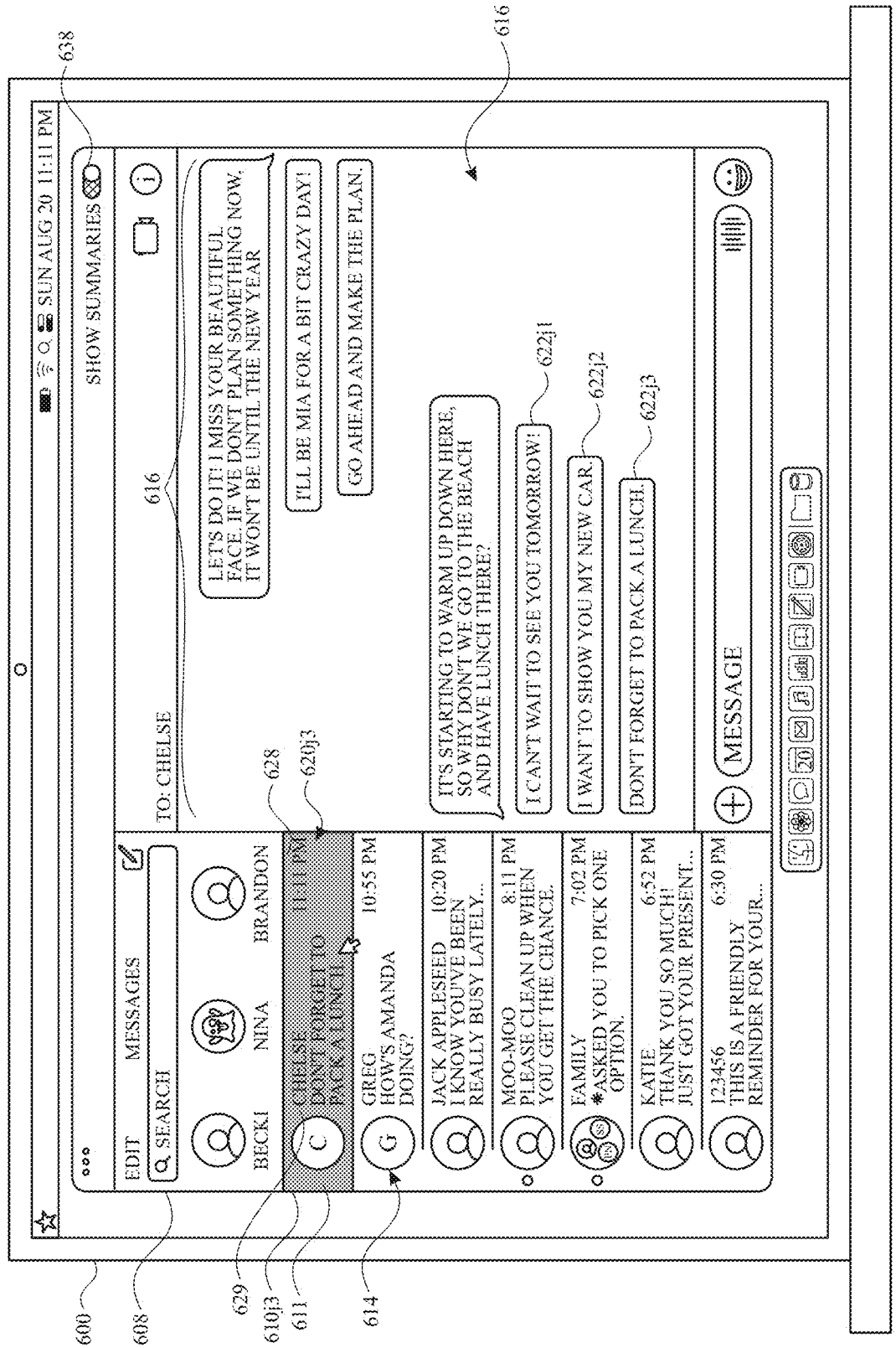
Figure 6L:
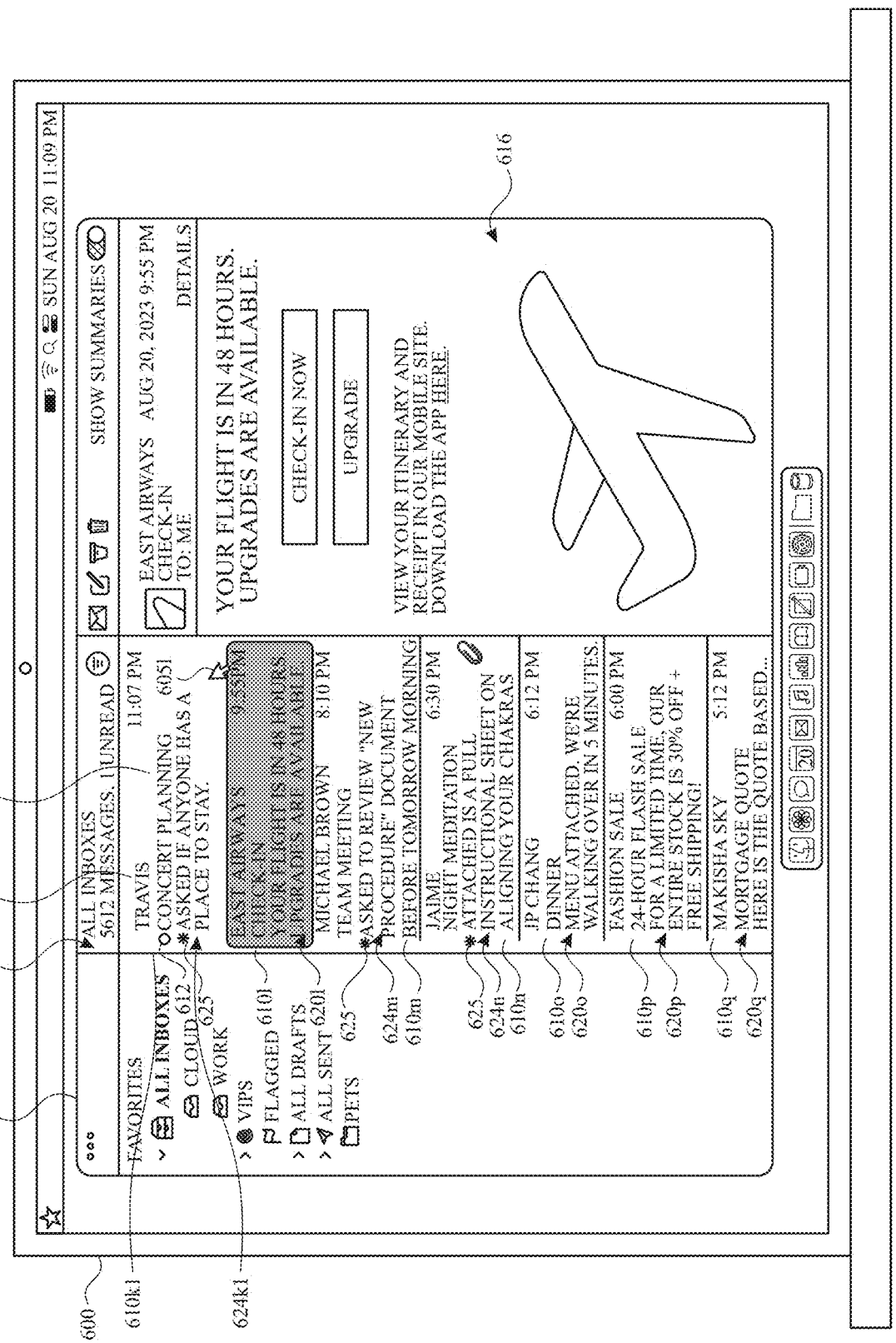
Figure 6M:
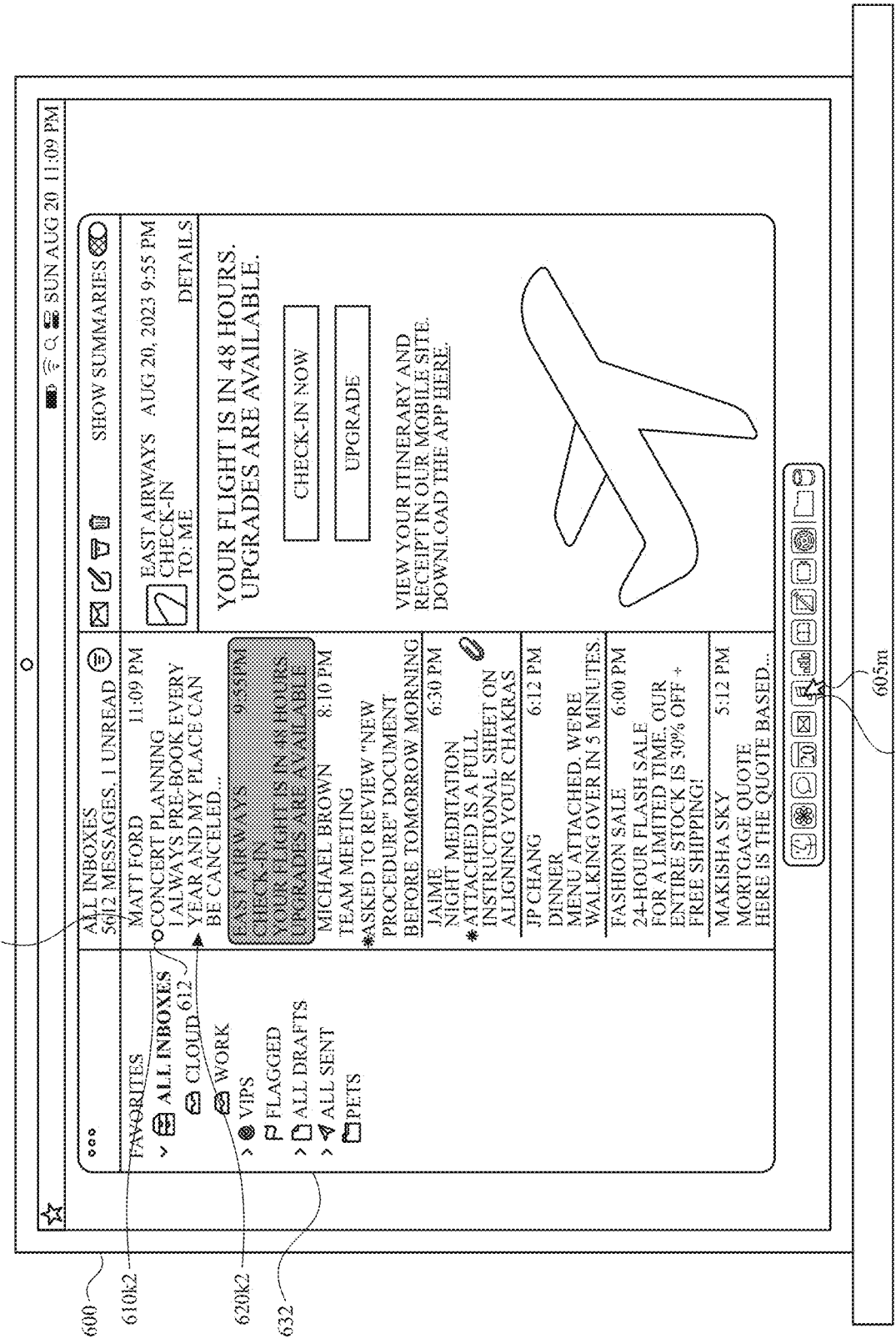
Figure 6N:
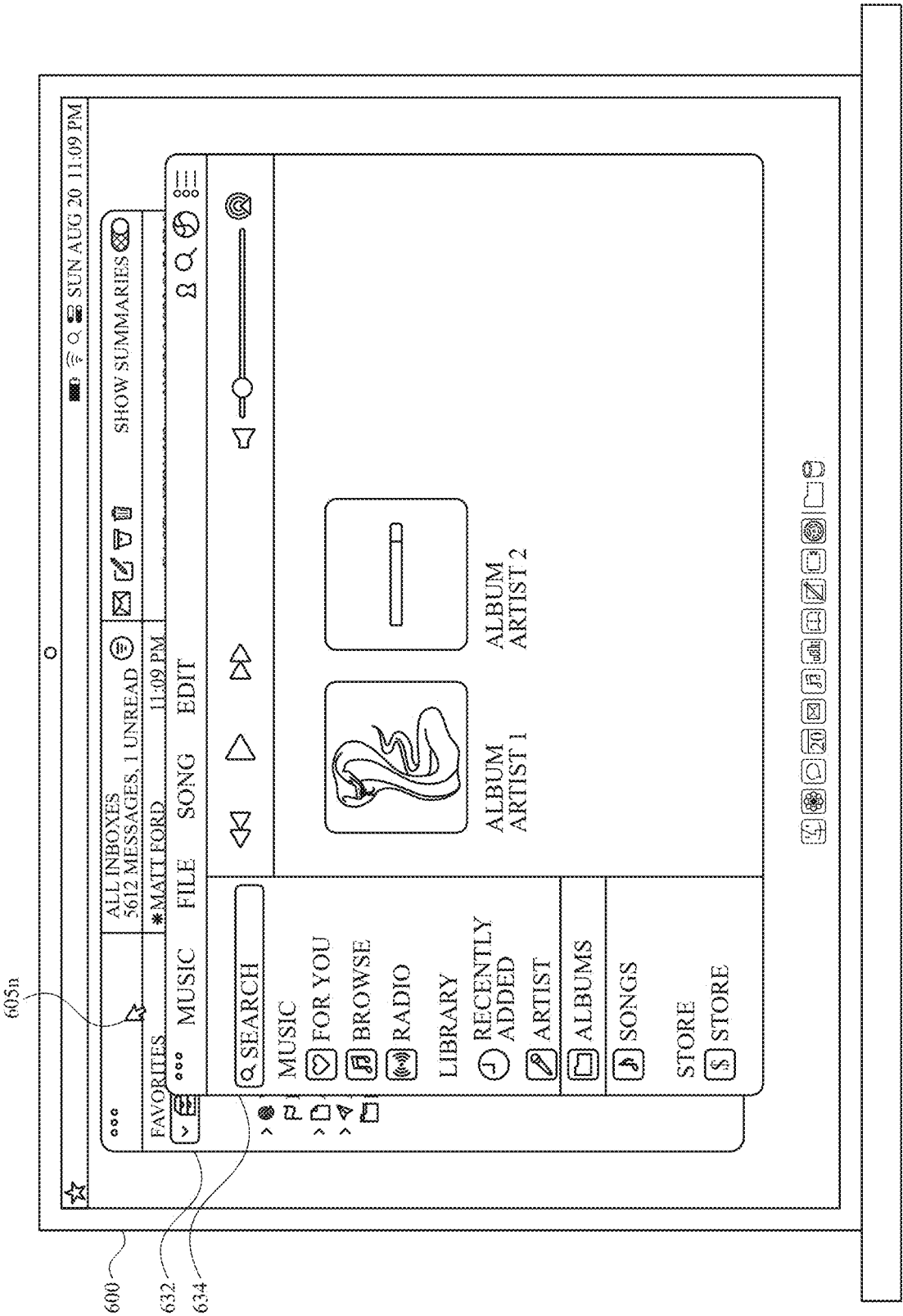
Figure 6O:
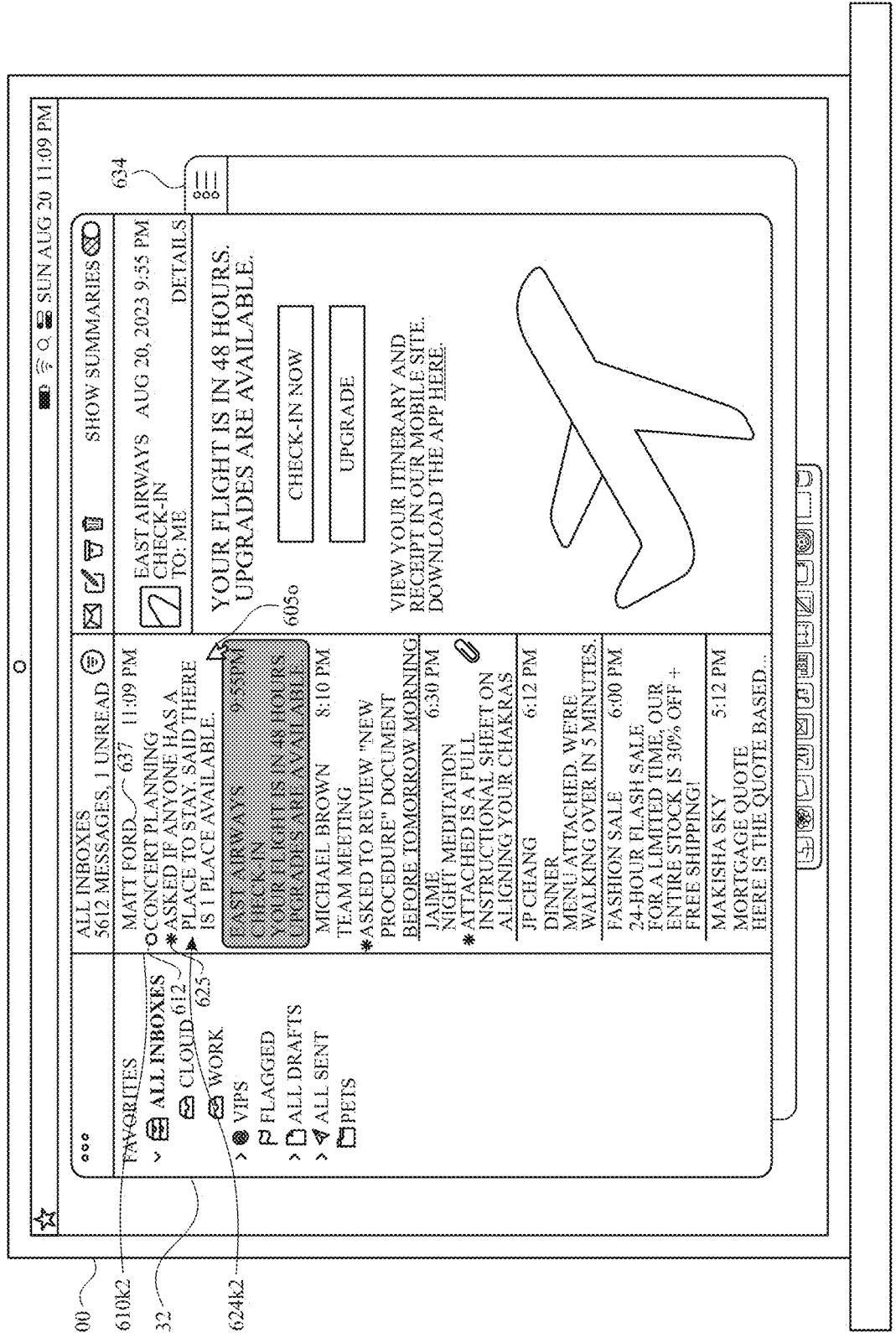
Figure 6P:
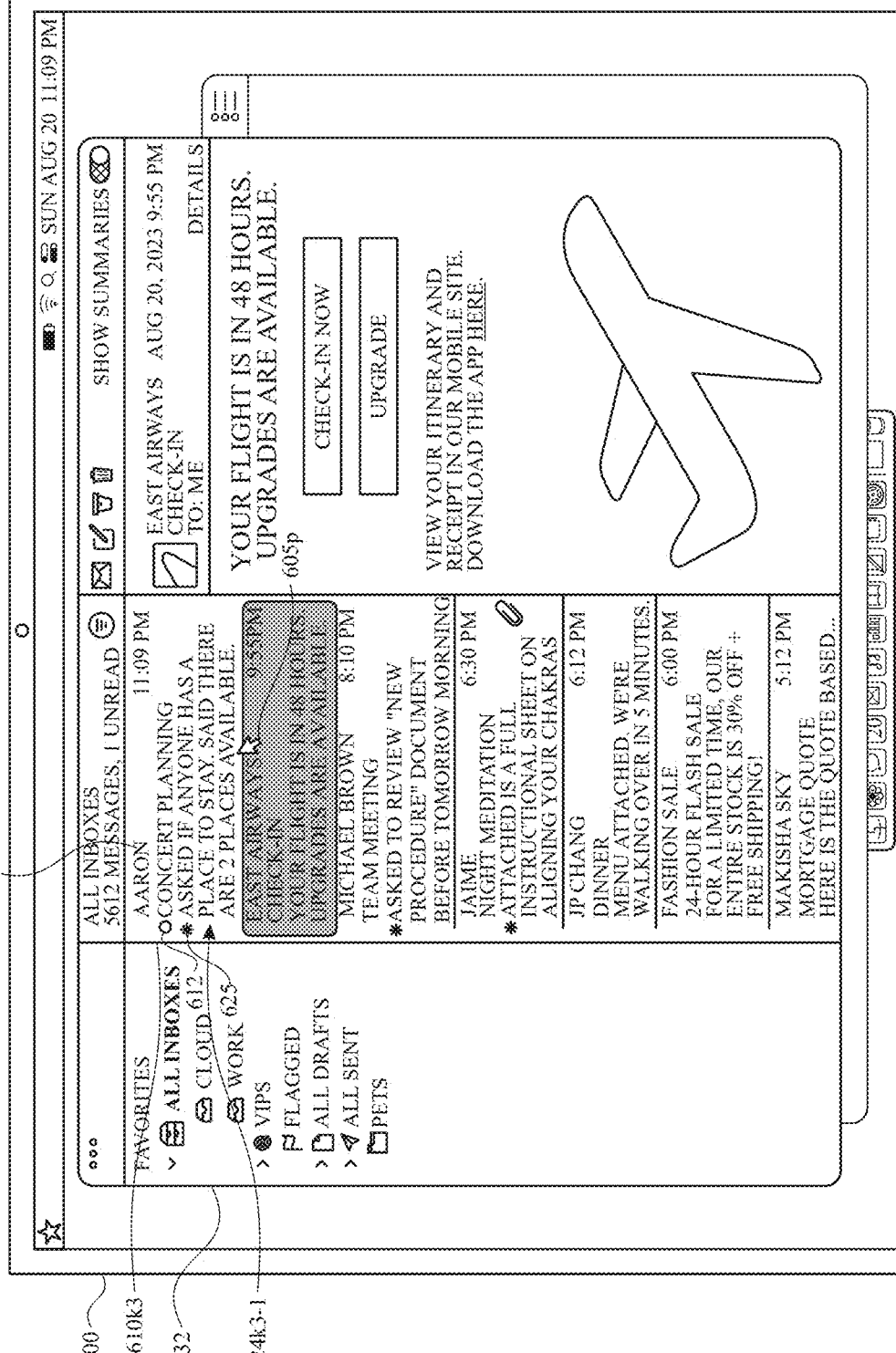
Figure 6Q:
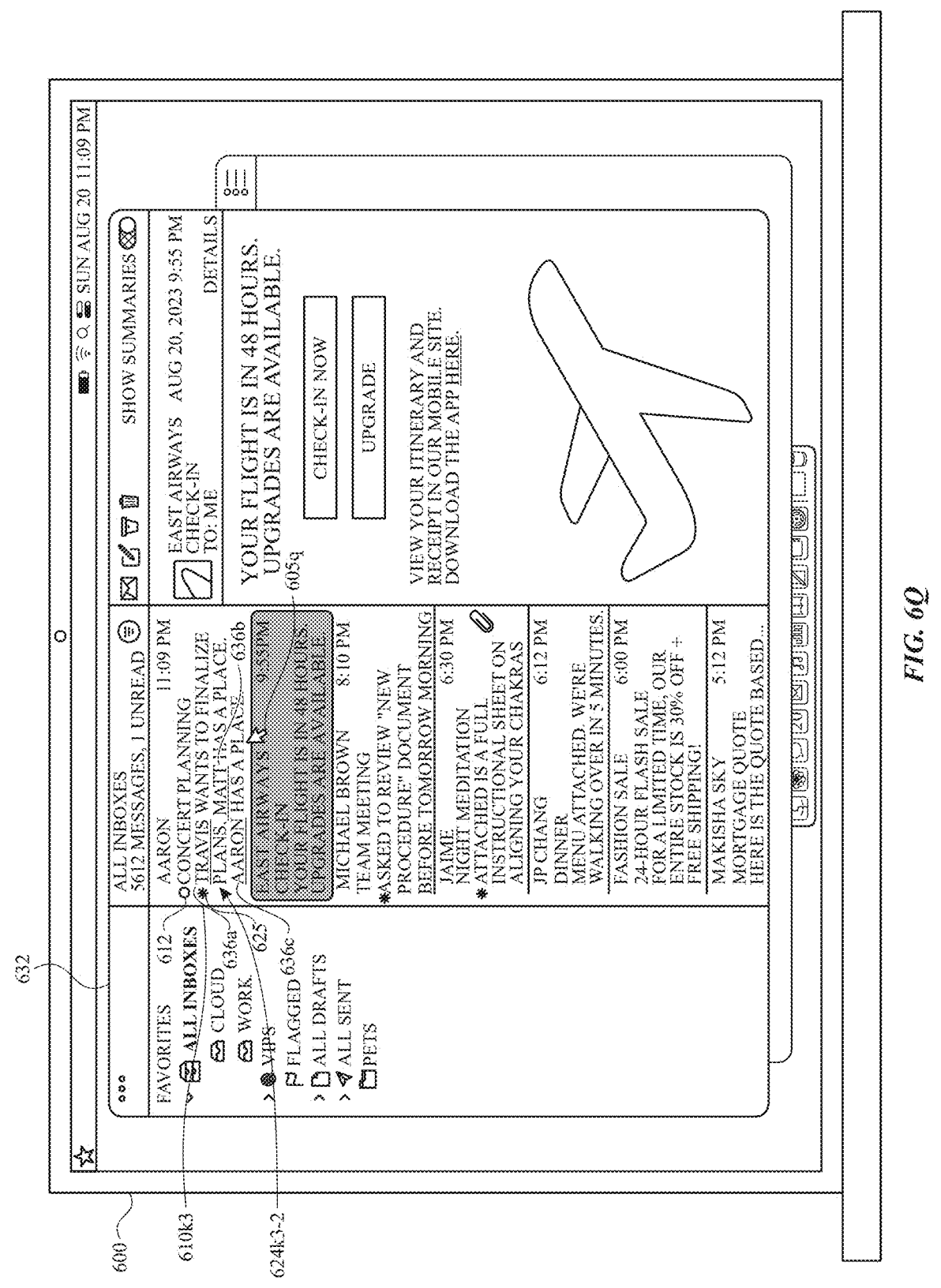
Figure 6R:
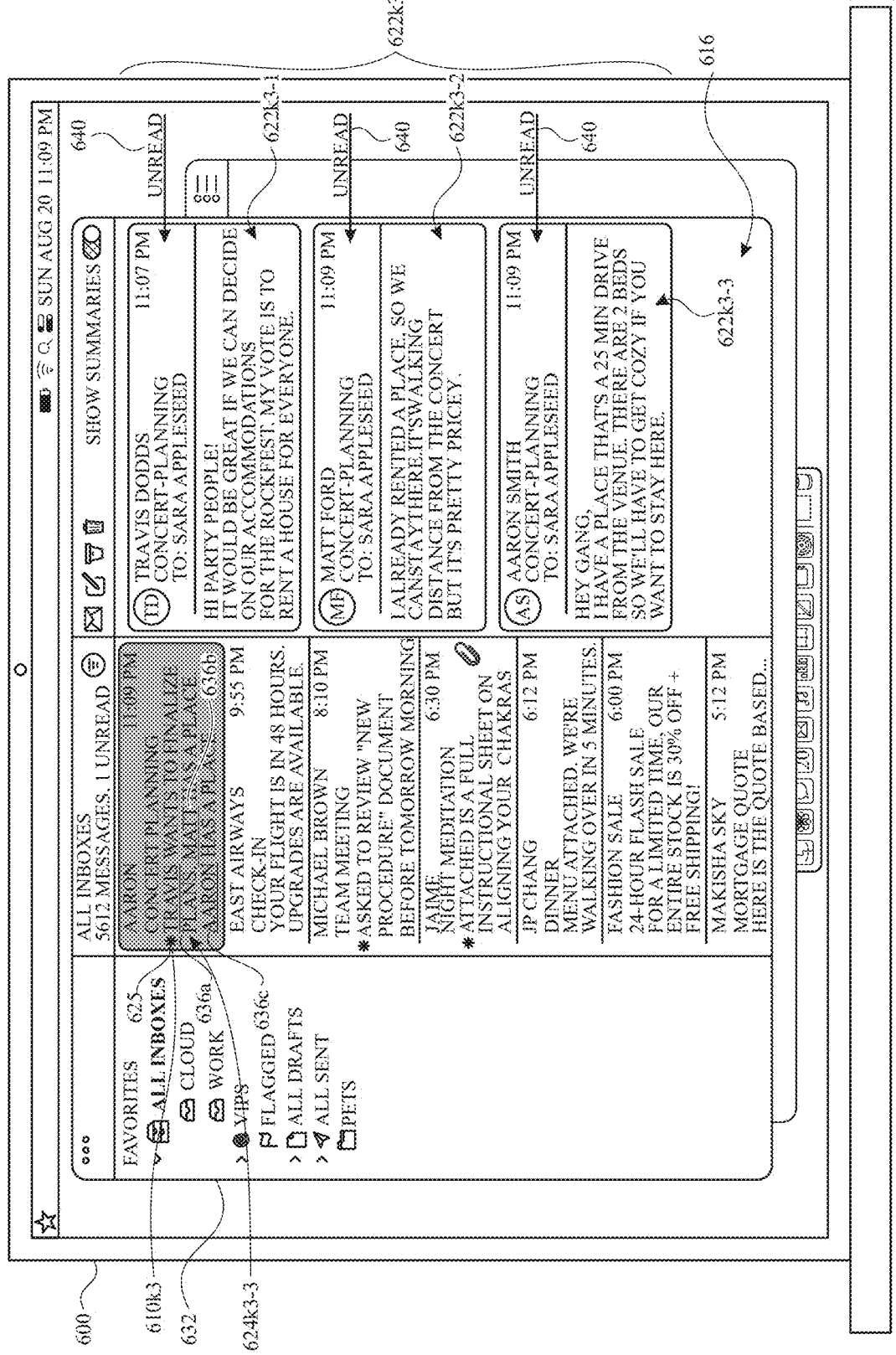
Figure 6S:
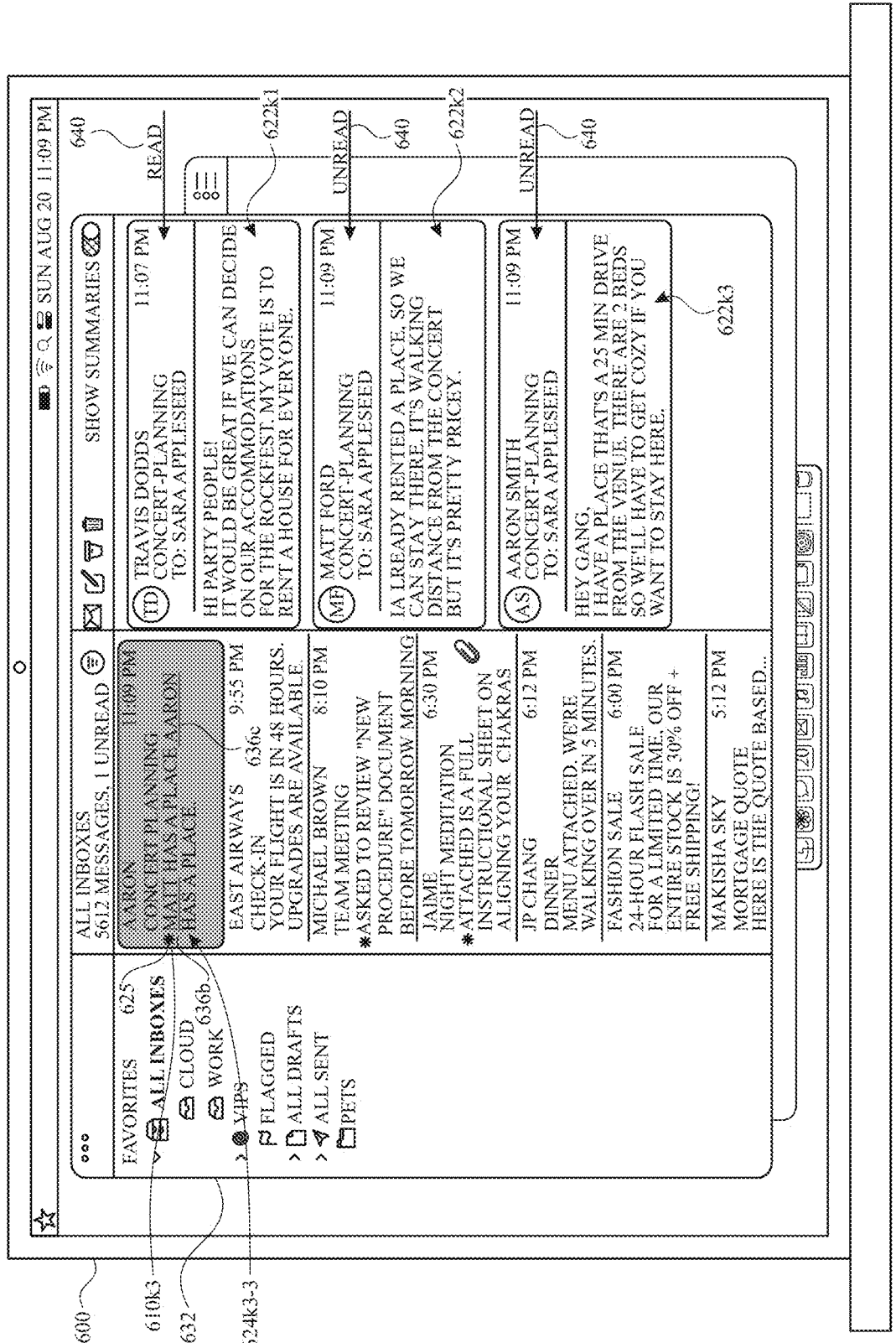
Figure 6T:
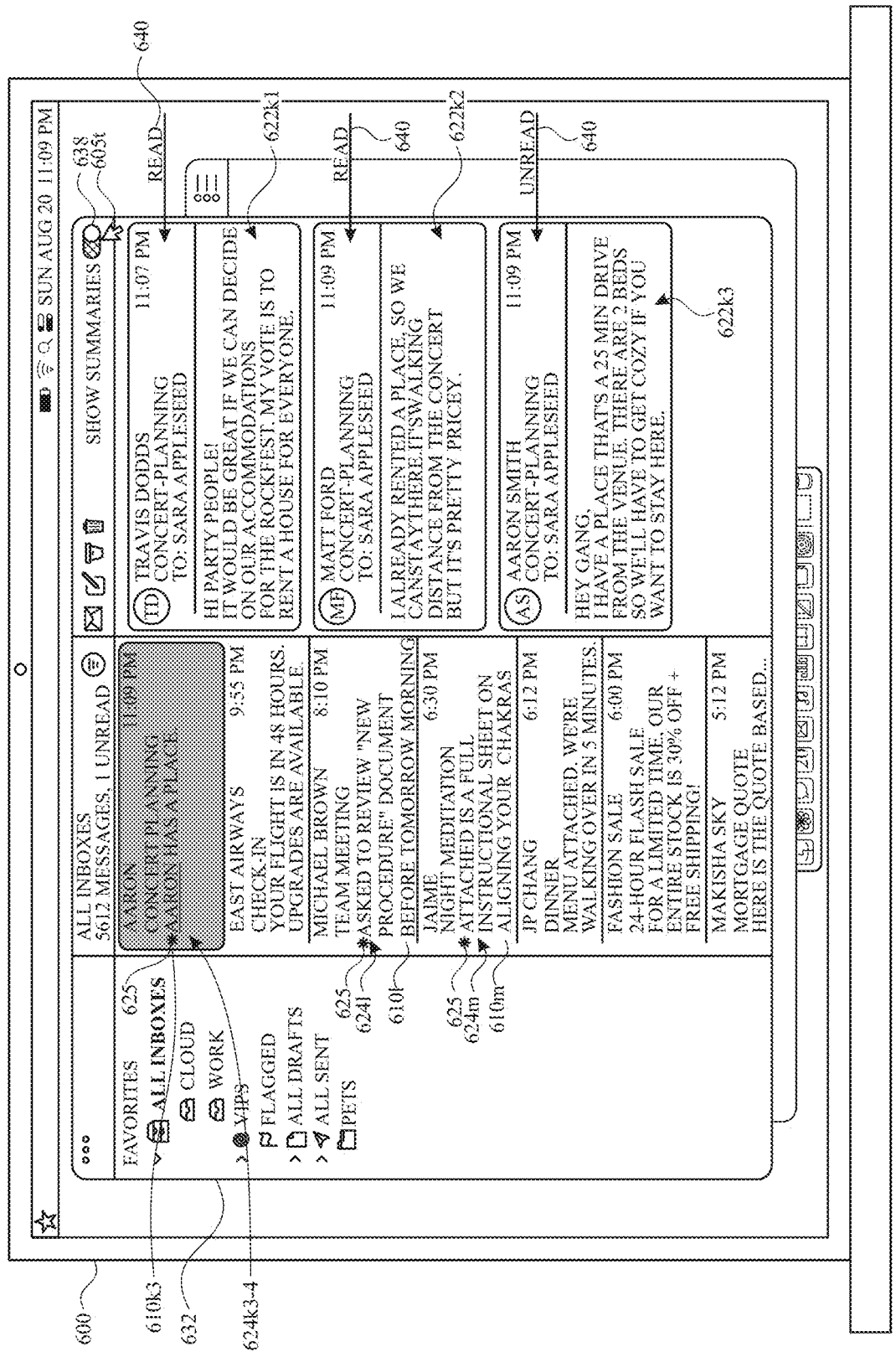
Figure 6U:
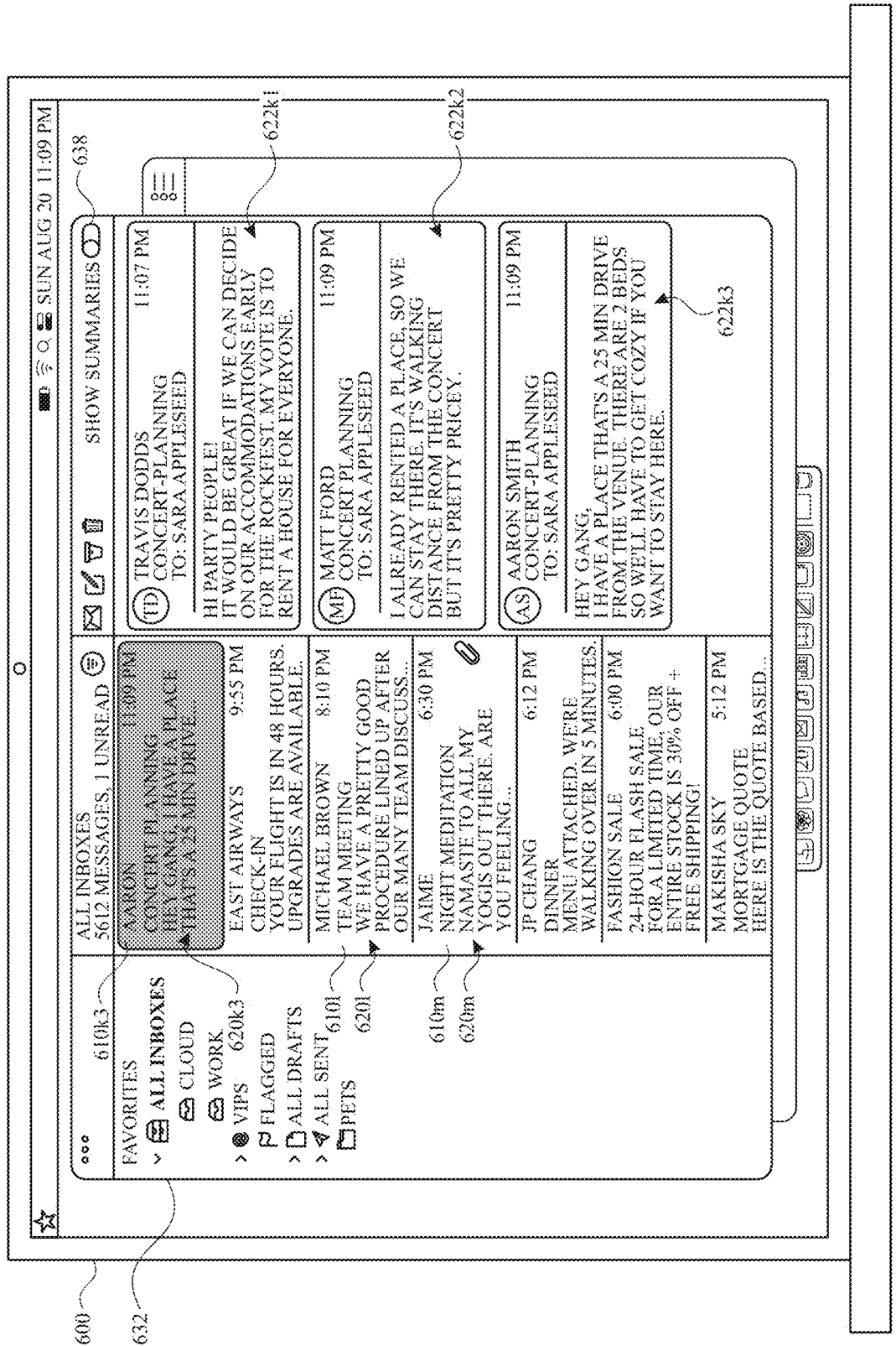
Figure 6A:
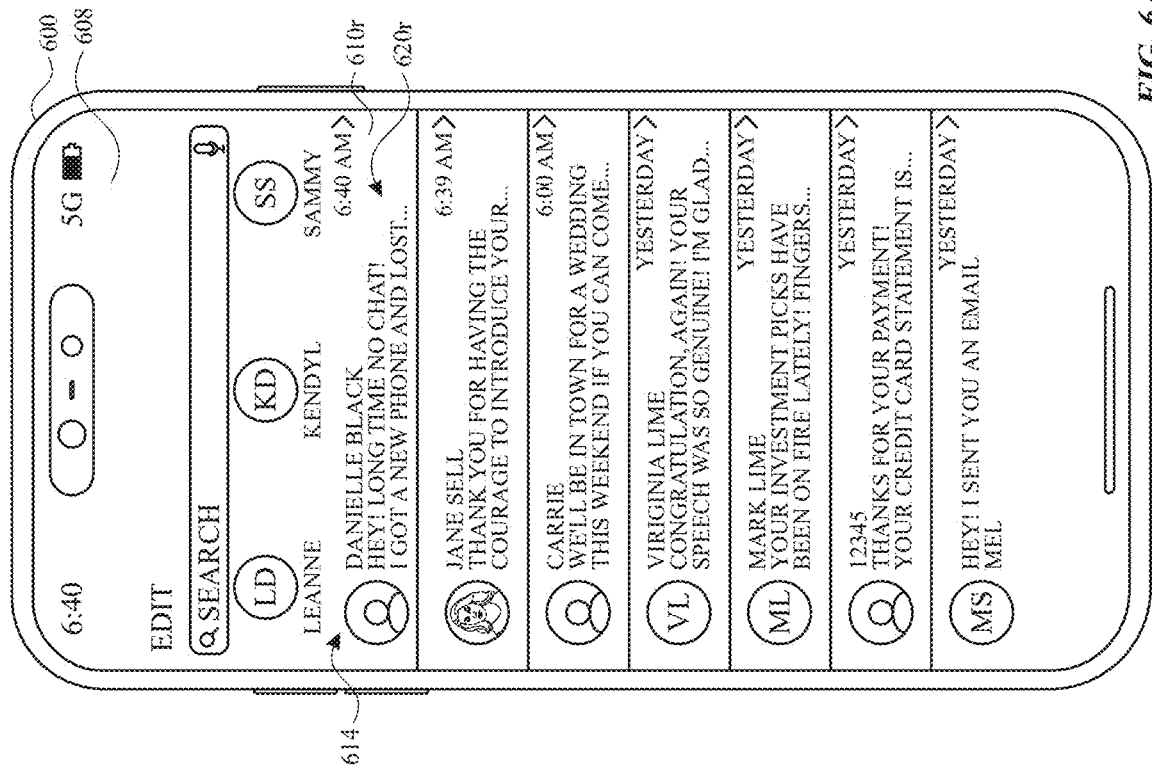

At FIG. 6A, device 600 (e.g., a laptop computer) displays, on display 601, messaging application icon 604 and email application icon 606. In some embodiments, device 600 is, or includes one or more features of, portable multifunction devices 100, 300, and/or 500. In some embodiments, messaging application icon 604 corresponds to a text messaging application that sends and/or receives text messages (e.g., SMS messages, instant messages (e.g., IM), and/or MMS messages). At FIG. 6A, device 600 detects input 605a1 (e.g., a mouse click, an air gesture, and/or a touch input) on input device 602 (e.g., a touch-sensitive surface) directed to messaging application icon 604. In response to detecting input 605a1, device 600 displays messaging user interface 608, as depicted in FIG. 6B. At FIG. 6A, device 600 detects input 605a2 (e.g., a mouse click, an air gesture, and/or a touch input) directed to email application icon 606. In response to detecting input 605a2, device 600 displays email user interface 632 of FIG. 6L. Notably, while FIGS. 6B-6K and FIGS. 6AB-6AD describe and depict user interfaces for text messages, they are merely for illustrative purposes. The techniques described with respect to FIGS. 6B-6K and FIGS. 6AB-6AD are applicable to various communication application user interfaces that includes written communications, including email user interface 632 of FIGS. 6L-6U and FIGS. 6V-6AA. Similarly, while FIGS. 6L-6U and FIGS. 6V-6AA describe and depict user interfaces for email messages, they are merely for illustrative purposes. The techniques described with respect to FIGS. 6L-6U and FIGS. 6V-6AA are applicable to various communication application user interfaces that include written communications, including messaging user interface 608 of FIGS. 6A-6K and FIGS. 6AB-6AD.

At FIG. 6B, messaging user interface 608 includes inbox interface 614 and content interface 616. Inbox interface 614 includes messages 610a-610g. In some embodiments, inbox interface 614 includes information about a sender, a recipient, and/or when the latest message was received. Content interface 616 includes content for a selected message (and/or content from messages related to a message, such as content from related messages in the same message thread). Selection indicator 611 indicates that a message is selected for viewing. For example, message 610g is selected, as depicted by gray shading. Content interface 616 thus includes content 622g of message 610g. Messaging user interface 608 further includes message compose region 618, which is configured receive content to send as a message in response to device 600 detecting an input directed at send affordance 619.

At FIG. 6B, inbox interface 614 also includes unread message indicator 612. In some embodiments, device 600 conditionally displays unread message indicator 612 based on whether a message is read or unread (e.g., has been opened and/or not been opened). For example, device 600 displays unread message indicator 612 at messages 610a-610f in response to a determination that messages 610a-610f are in an unread state. Device 600 does not display unread message indicator 612 at message 610g in response to detecting that message 610g is in a read state (e.g., has been opened and/or read).

At FIG. 6B, device 600 displays either a preview of the content for a particular message (e.g., "a preview") or a summary that is based on the content (e.g., "a summary") for the particular message. In some embodiments, the preview replicates (e.g., mirrors and/or duplicates) the content of a message whereas a summary summarizes the content of a message, as described in greater detail with respect to FIG. 6E. In some embodiments, the summary is generated (e.g., automatically-generated text content and/or generative text content) via a machine learning algorithm (e.g., a generative AI model and/or a large language model). As described in greater detail herein, device 600 conditionally displays a summary or a preview based on one or more condition(s) being met.

At FIG. 6B, messages 610a-610c, 610e, and 610g includes previews 620a-620c, 620e, and 620g, respectively. Previews 620a-620c, 620e, and 620g include a portion of the content for messages 610a-610c, 610e, and 610g, respectively. In some embodiments, previews 620a-620c, 620e, and 620g include a beginning portion of the content for messages 610a-610c, 610e, and 610g, respectively. As depicted in FIG. 6B, preview 620g includes a portion of content 622g (e.g., "Thank you so much! I just got your present . . . ").

At FIG. 6B, device 600 displays summary 624d and summary 624f for message 610d and message 610f, respectively. Summary 624d and summary 624f summarize content of message 610d and message 610f, respectively, as described in greater detail with respect to FIG. 6E. Device 600 also displays summary indicator 625 to distinguish message 610d and message 610f from messages 610a-610c, 610e, and 610g. At FIG. 6B, summary indicator 625 is a graphical element (e.g., a shape, icon, and/or badge) that is displayed adjacent to the text of summaries 624d and 624f, respectively. In some embodiments, device 600 displays summary indicator 625 by distinguishing the appearance of the text of summaries 624d and 624f from the appearance of the text of previews 620a-620c, 620e, and 620g (e.g., the text of summaries 624d and 624f has a different font color, font style, and/or size than the text of previews 620a-620c, 620e, and 620g). At FIG. 6B, device 600 detects input 605c (e.g., a mouse click, an air gesture, and/or a touch input) to scroll inbox interface 614. In response to detecting input 605c, device 600 displays effect 626 at messages 610d and 610f, as depicted in FIG. 6C.

At FIG. 6C, device 600 displays effect 626 for messages 610d and 610f without displaying effect 626 for messages 610c, 610e, 610g, 610h, and 610i. In some embodiments, device 600 displays effect 626 (e.g., a glowing, outlining, and/or highlighting effect) at summary 624d and summary 624f (e.g., the text of summary 624d and 624f glows) without displaying effect 626 (or any other visual emphasis) at previews 620b-620c, 620e, 620g, 620h, and 620i. In some embodiments, effect 626 is an indication that a summary is being displayed. In some embodiments, device 600 displays effect 626 by displaying at least a portion (e.g., some but not all or all) of message 610d and message 610f having a visual characteristic (e.g., color, animation, and/or brightness) that is different from a visual characteristic of messages 610c, 610e, 610g, 610h, and 610i. In some embodiments, device 600 displays a different visual characteristic by modifying a color, displaying an animation, and/or increasing the brightness of at least a portion of message 610d and message 610f. In some embodiments, effect 626 is an animation that has a visual characteristic that gradually changes over time (e.g., the effect gradually changes locations, pulses, and/or fades over time). At FIG. 6D, device 600 detects input 605d (e.g., a mouse click, an air gesture, and/or a touch input) directed at message 610c. In response to detecting input 605d, device 600 displays content 622c of message 610c in content interface 616, as depicted in FIG. 6D. In some embodiments, effect 626 is a color and/or brightness in a high dynamic range (HDR) (e.g., as opposed to a color and/or brightness in a standard dynamic range (SDR)). In some embodiments, effect 626 has a dynamic range that is wider than a standard dynamic range (SDR) display. In some embodiments, a dynamic range is the range of brightness (e.g., a range between the brightest level to the darkest level) and/or colors (e.g., a range and/or variation in colors). In some embodiments, a maximum brightness of messages 610c, 610e, 610g, 610h, and 610i is less than a maximum brightness of effect 626. In some embodiments, an HDR visual effect has a color and/or brightness that satisfies the criteria defined by universal HDR standards, including HDR10, HDR10+, Advanced HDR, and/or Dolby Vision.

At FIG. 6D, device 600 does not display effect 626 at summary 624d and summary 624f. In some embodiments, effect 626 is displayed for a threshold amount of time (e.g., 2 seconds, 5 seconds, and/or 10 seconds) after detecting a triggering event (e.g., the scrolling input 605b of FIG. 6B). In some embodiments, the triggering event is scrolling the messaging user interface 608. In some embodiments, the triggering event is opening the messaging application associated with messaging user interface 608 and/or bringing messaging user interface 608 to the foreground. In some embodiments, device 600 gradually ceases display of effect 626 over time (e.g., a color of message 610d and message 610f gradually returns to a color that message 610d and message 610f had without the effect, an animation begins to slow until there is no animation, and/or a brightness of message 610d and message 610f begins to decrease until the brightness of message 610d and message 610f returns to a brightness that message 610d and message 610f had without effect 626).

At FIG. 6D, device 600 detects input 605d (e.g., a mouse click, an air gesture, and/or a touch input) corresponding to a request to view the content of message 610d while summary 624d is displayed. In some embodiments, input 605d is directed at message 610d. In response to detecting input 605d, device 600 displays messaging user interface 608, as depicted in FIG. 6E or FIG. 6G.

At FIG. 6E, device 600 displays content 622d in content interface 616. As depicted in FIG. 6E, summary 624d ("May go for a ride. Asked you to go.") summarizes content 622d ("I know you've been really busy lately but I think it would be good for us to explore nature. Sorry, I've been traveling so I didn't respond sooner. I'm probably going on a ride tomorrow. Let me know if you're interested in biking on some local trails."). In some embodiments, summary 624d is an automatically-generated summary (e.g., automatically-generated text content and/or generative text content) that is based on message content 622d. In some embodiments, summary 624d is alphanumerical text that is generated (e.g., automatically-generated text content and/or generative text content) via a machine learning algorithm (e.g., a diffusion model and/or large language model). In some embodiments, the automatically-generated summary is generated by an artificial intelligence (AI) process (e.g., a generative AI model) that generates content (e.g., automatically-generated text content and/or generative text content) that is consistent with content 622d. In some embodiments, summary 624d is alphanumeric text that represents an overview of content 622d without replicating (e.g., mirroring) the exact text in content 622d. In some embodiments, a summary includes content based on content of a message that is determined (e.g., based on a set of criteria) to be more important relative to content of other messages within a message thread (e.g., as opposed to a recency of receiving a message). In some embodiments, summary 624d displays content that is determined to satisfy a threshold level of importance regardless of a location of that content within the message (e.g., beginning, middle, and/or end). In some embodiments, summary 624d is a summary from a particular perspective (e.g., a third-person perspective as opposed to first-person perspective) to distinguish the content of summary 624d from the content of a preview.

At FIG. 6E, in some embodiments, device 600 displays a summary or a preview for a message depending on the amount of content in the message. As depicted, device 600 displays summary 624d for message 610d and displays preview 620c for message 610c. In some embodiments, device 600 displays summary 624d when content 622d includes a threshold amount of content (e.g., content 622d includes more than 5, 10, and/or 15 words and/or content 622d includes 20, 30, and/or 50 alphanumeric characters). In some embodiments, the amount of content 622c (e.g., as depicted in FIG. 6D) did not exceed a threshold amount of content and, thus, did not trigger a summary. In some embodiments, the amount of content 622d (e.g., as depicted in FIG. 6E) exceeded the threshold amount of content and, thus, triggered a summary.

At FIGS. 6E-6F, device 600 stops displaying summary 624d and, instead, displays preview 620d. In some embodiments, device 600 replaces summary 624d with preview 620d in response to detecting that the message 610d is in a read state (e.g., is not in an unread state). At FIG. 6E, message 610d is in an unread state, as illustrated by unread message indicator 612. In some embodiments, device 600 updates the state of message 610d from an unread state to a read state after detecting an input to navigate away from content 622d and/or message 610d. For example, at FIG. 6E, device 600 detects input 605e (e.g., a mouse click, an air gesture, and/or a touch input) directed at message 610c. In response to detecting input 605e, device 600 displays messaging user interface 608 of FIG. 6F. In some embodiments, device 600 updates the state of message 610d from an unread state to a read state after detecting an input to navigate to content 622d and/or message 610d (e.g., input 605e). In some embodiments, in response to detecting an input to navigate to content 622d and/or message 610d (e.g., input 605e), device 600 stops displaying summary 624d and, instead, displays preview 620d.

At FIG. 6F, device 600 selects message 610c and displays content 622c in content interface 616. Moreover, message 610d has transitioned to a read state. For example, device 600 no longer displays unread message indicator 612 for message 610d. In response to detecting that message 610d is in a read state, device 600 displays preview 620d at a location that was previously occupied by summary 624d. As depicted, preview 620d includes content (e.g., text and/or other content) that is different from the content of summary 624d. The content of preview 620d exactly replicates a beginning portion of content 622d (e.g., "I know you've been really busy lately . . . "), whereas the content of summary 624d includes content that does not replicate a portion of content 622d. Device 600 has also stopped displaying summary indicator 625 for message 610d because summary 624d is no longer displayed.

At FIG. 6G, device 600 replaces summary 624d with preview 620d at a different time or manner than depicted in FIGS. 6E-6F. In response to detecting input 605d of FIG. 6D, device 600 displays messaging user interface 608 of FIG. 6G. At FIG. 6G, device 600 displays preview 620d for message 610d instead of summary 624d. In some embodiments, message 610d transitions from an unread state to a read state in response to input 605d selecting message 610d. As depicted, device 600 does not display summary indicator 625 and does not display unread message indicator 612 for message 610d. Notably, device 600 maintains display of summary 624f of message 610f because message 610f is still in an unread state. As depicted in FIG. 6G, device 600 maintains display of unread message indicator 612 and summary indicator 625 for message 610f.

At FIGS. 6H-6J, device 600 detects that multiple messages have been received within a threshold amount of time and are part of the same message thread. In response, device 600 displays a summary. At FIG. 6H, device 600 displays first message 610j1 with preview 620j1. As depicted in FIG. 6H, device 600 displays first message 610j1 with timestamp 628, indicating message 610j1 was received at 11:09 PM. First message 610j1 also includes indication 629 of a sender (e.g., "Chelse"). Device 600 also displays first message 610j1 with unread message indicator 612. In some embodiments, device 600 detects that the amount of content of first message 610j1 (e.g., content 622j1 of FIG. 6K) does not exceed the threshold amount of content and, in response, does not display a summary for first message 610j1.

At FIG. 6I, time has passed since displaying messaging user interface 608 of FIG. 6J, and device 600 detects that second message 610j2 has been received. Second message 610j2 is part of the same message thread as first message 610j1. In some embodiments, multiple messages are determined to be part of the same message thread when a new message is a message that is associated with (e.g., is a reply to and/or is sent in addition to) a previous message that was sent by one sender to a user of device 600 (e.g., as depicted in content interface 616 in FIG. 6K, where content 622j1, 622j2, and 622j3 are part of the same conversation between the user of device 600 and Chelse). In some embodiments, device 600 determines that second message 610j2 is part of a message thread based on information (e.g., metadata, title, and/or recipient list) associated with first message 610j1 and second message 610j2 that indicates first message 610j1 and second message 610*j*2 are part of the same message thread. Device 600 displays second message 610*j*2 with preview 620*j*2 (e.g., "I want to show you my new car") without displaying a summary of second message 610*j*2. In some embodiments, device 600 determines that the content of second message 610*j*2 (e.g., content 622*j*2 of FIG. 6K) does not exceed the threshold amount of content and, in response, does not display a summary of second message 610*j*2. Device 600 received second message 610*j*2 within one minute of first message 610*j*1, as indicated by timestamp 628 of FIG. 6J (e.g., "11:10 PM") and timestamp 628 of FIG. 6I (e.g., "11:09 PM"). Moreover, second message 610*j*2 is from the same sender as first message 610*j*1, as depicted by indication 629 (e.g., "Chelse").

At FIG. 6J, time has passed since displaying messaging user interface 608 of FIG. 6I, and device 600 detects that third message 610*j*3 has been received. Third message 610*j*3 is part of the same message thread as first message 610*j*1 and second message 610*j*2. Device 600 displays third message 610*j*3 with summary 624*j* (e.g., "Asked to go for a ride. She said pack a lunch."). In some embodiments, device 600 determines that a threshold number (e.g., 2, 4, and/or 5) of messages have been received and, in response, displays a summary for third message 610*j*3. Notably, device 600 does not display a preview of third message 610*j*3 even though the content of third message 610*j*3 (e.g., content 622*j*3 of FIG. 6K) does not exceed the threshold mount of content. As indicated by timestamp 628 of FIG. 6J (e.g., "11:11 PM"), third message 610*j*3 was received within two minutes of first message 610*j*1 and within one minute of second message 610*j*2. In some embodiments, device 600 detects that third message 610*j*3 is received within a threshold amount of time of receiving first message 610*j*1 (and/or, in some embodiments, within a threshold amount of time of receiving second message 610*j*2) and, in response, displays summary 624*j*. In some embodiments, device 600 determines that first message 610*j*1 and second message 610*j*2 are in an unread state and, in response, displays summary 624*j* for third message 610*j*3. In some embodiments, device 600 determines that only one and/or a combination of these conditions are met. For example, in some embodiments, device 600 detects that a threshold number of messages are part of the same thread and, in response, displays summary 624*j*. In some embodiments, device 600 displays summary 624*j* independent of detecting that third message 610*j*3 has been received within a threshold amount of time of receiving first message 610*j*1 and/or second message 610*j*2. As a further example, in some embodiments, device 600 determines that a threshold number of messages are part of the same thread and, in response, displays summary 624*j* independent of first message 610*j*1 and/or second message 610*j*2 being in an unread state. At FIG. 6J, device 600 detects input 605*j* (e.g., a mouse click, an air gesture, and/or a touch input) directed at third message 610*j*3. In response to detecting input 605*j*, device 600 displays message user interface 608 of FIG. 6K.

At FIG. 6K, device 600 displays the content of the message thread in content interface 616. For example, device 600 displays content 622*j*1 of first message 610*j*1, content 622*j*2 of second message 610*j*2, and content 622*j*3 of third message 610*j*3 in content interface 616. As depicted in FIG. 6K, device 600 displays content of messages in the message thread other than content 622*j*1, content 622*j*2, and content 622*j*3. In FIG. 6K, device 600 displays preview 620*j*3 without displaying summary 624*j* in response to detecting that third message 610*j*3 is selected (e.g., in response to input 605*j*). In some embodiments, device 600 replaces summary 624*j* with preview 620*j*3 in response to detecting input 605*j*.

At FIG. 6L, in response to detecting input 605*a*2 directed to email application icon 606, as depicted in FIG. 6A, device 600 displays email user interface 632. Email user interface 632 includes inbox interface 614 and content interface 616. Inbox interface 614 and content interface 616 of FIGS. 6L-6U are similar to inbox interface 614 and content interface 616 of FIGS. 6A-6K but have a different state. For example, while device 600 displays a summary similar to a summary described in FIGS. 6A-6K, device 600 displays a summary independent of a message being in a read state, as depicted by device 600 displaying messages 610*m*-610*n* with summaries 624*m*-624*n* and summary indicator 625 but without unread message indicator 612. At FIG. 6L, messages 610*l* and 610*o*-610*q* include previews 620*l* and previews 620*o*-620*q* based on specific conditions being met (e.g., the amount of content of a respective message did not exceed a threshold amount of content, and/or a summary is not available for a respective message).

At FIG. 6L, device 600 displays message 610*k*1 with summary 624*k*1 (e.g., "Asked if anyone has a place to stay.") that is based on content 622*k*1-1 of message 610*k*1 (e.g., content 622*k*1-1 is depicted in inbox interface 614 in FIG. 6R). Message 610*k*1 includes indication 637 of a sender (e.g., "Travis") and is in an unread state, as depicted by new message indicator 612. Message 610*k*1 includes indication 639 of a title of an email that is separate from summary 624*k*1. In some embodiments, device 600 detects input 605*l* (e.g., a mouse click, an air gesture, and/or a touch input) directed at message 610*k*1. In such embodiments, device 600 displays the content of message 610*k*1 (e.g., content 622*k*1 of FIG. 6R) and/or updates message 610*k*1 to be in a read state.

At FIG. 6M, time has passed and device 600 displays a new message, message 610*k*2, that is part of the same message thread as message 610*k*1. Message 610*k*2 includes indication 637 of a sender (e.g., "Matt") and is in an unread state, as depicted by unread message indicator 612. Device 600 displays preview 620*k*2 that replicates a portion of content 622*k*2 (e.g., depicted in content interface 616 of FIG. 6R) of message 610*k*2. At FIG. 6M, device 600 displays preview 620*k*2, as opposed to a summary, when one or more conditions are met. For example, in some embodiments, device 600 determines that email user interface 632 is currently being displayed and, in response, forgoes displaying a summary for message 610*k*2. In some embodiments, device 600 determines that the summary has not been generated and/or is not available for display within a threshold amount of time (e.g., 5 seconds, 10 seconds, and/or 30 seconds) and, in response, displays preview 620*k*2. In some embodiments, device 600 displays preview 620*k*2 until device 600 detects that a triggering event has occurred (e.g., an application has been closed and/or moved to the background). In some embodiments, device 600 displays preview 620*k*2 even if a summary is generated and/or available for display. At FIG. 6M, device 600 detects input 605*m* (e.g., a mouse click, an air gesture, and/or a touch input) directed at music application icon 633. In response to detecting input 605*m*, device 600 displays music user interface 634 for the music application associated with music application icon 633.

At FIG. 6N, device 600 displays music user interface 634. Device 600 prioritizes the display of music user interface 634 relative to the display of email user interface 632, as depicted by music user interface 634 obscuring a portion of email user interface 632. In some embodiments, device 600 is operating the music application in the foreground while operating the email application in the background. In some embodiments, device 600 moves the email application from operating in the foreground to operating in the background in response to detecting an input 605m. At FIG. 6N, device 600 detects input 605n (e.g., a mouse click, an air gesture, and/or a touch input) directed at email user interface 632. In response to detecting input 605n, device 600 prioritizes the display of email user interface 632 relative to the display of music user interface 634.

At FIG. 6O, device 600 prioritizes the display of email user interface 632 relative to the display of music user interface 634, as depicted by email user interface 632 obscuring a portion of music user interface 634. In some embodiments, device 600 moves the email application from operating in the background to operating in the foreground in response to detecting input 605n. In such embodiments, device 600 moves the music application from operating in the foreground to operating in the background in response to detecting input 605n.

At FIG. 6O, device 600 displays summary 624k2 without displaying preview 620k2. Summary 624k2 is based on content from two different messages from two different senders. Device 600 displays message 610k2, which is part of the same message thread as message 610k1. Summary 624k2 (e.g., "Asked if anyone has a place to stay. Said there is 1 place available.") is based on content 622k1 and content 622k2, which are depicted in FIG. 6R. Notably, summary 624k2 is different from summary 624k1 (e.g., summary 624k2 indicates "1 place" is available). Summary 624k2 is displayed at a location that was previously occupied by preview 620k2. Device 600 also displays summary indicator 625 for message 610k2. In some embodiments, device 600 displays summary 624k2 in response to detecting that the email application has been closed at a point in time after the time of receiving message 610k2, a user interface that is different from email user interface 632 is prioritized over email user interface 632 at a time after the time of receiving message 610k2, and/or the email application has been closed and/or moved to operating in the background at a time after the time of receiving message 610k2. In some embodiments, device 600 detects input 605o (e.g., a mouse click, an air gesture, and/or a touch input) directed at message 610k2. In such embodiments, device 600 displays the content of message 610k2 (e.g., content 622k2 of FIG. 6R) and/or updates message 610k2 to be in a read state. In some embodiments, summary 624k2 is based on content from two different messages from the same sender.

At FIG. 6P, time has passed and device 600 displays summary 624k3-1 that is based on content from three different messages from three different senders. Message 610k3-1 is part of the same message thread as message 610k1 and message 610k2. Message 610k3 includes indication 637 of a sender (e.g., "Aaron") and is in an unread state, as depicted by unread message indicator 612. Device 600 displays summary 620k3-1 (e.g., "Asked if anyone has a place to stay. Said there are 2 places available.") that is based on content 622k1, content 622k2, and content 622k3, which are depicted in FIG. 6R. Notably, summary 620k3-1 is different from summary 624k1 and summary 624k2 (e.g., summary 624k3-1 indicates "2 places" are available). In some embodiments, summary 624k3-1 is based on content from three different messages, where at least two of the messages are from the same sender.

At FIG. 6Q, in some embodiments, device 600 displays summary 624k3-2 that is similar to summary 624k3-1 but has a different state. Summary 624k3-2 includes an indication of a sender in the content of summary 624k3-2, whereas summary 624k3-1 does not include an indication of a sender. For example, summary 624k3-2 includes indication 636a (e.g., "Travis"), indication 636b (e.g., "Matt"), and indication 636c (e.g., "Aaron"). In some embodiments, indications 636a, 636b, and 636c are separate from and/or independent of an indication of a sender included in a sender field (e.g., indication 637 in FIG. 6P). Moreover, indications 636a, 636b, and 636c are displayed with a visual characteristic (e.g., color, bolding, underline, and/or shape) that is different from a visual characteristic of other content of summary 624k3-2, as depicted by indications 636a, 636b, and 636c being underlined and other content of summary 624k3-2 not having an underline. Indications 636a, 636b, and 636c also identify what portion of the content summary 624k3-2 is associated with each sender. Device 600 detects input 605q (e.g., a mouse click, an air gesture, and/or a touch input) directed at message 610k3. In response to detecting input 605q, device 600 displays content of message 610k3, as depicted in FIG. 6R.

At FIGS. 6R-6T, device 600 displays a different summary depending on whether a particular message in the message thread is in a read state. In some embodiments, device 600 displays a summary for content of an unread message and does not display a summary for content of read messages. At FIGS. 6R-6T, device 600 displays content 622k3 for message 610k3. Content 622k3 includes content 622k1 that corresponds to content of message 610k1, content 622k3-2 that corresponds to content of message 610k2, and content 622k3 that corresponds to content of message 610k3. In some embodiments, content 622k1, content 622k2, and content 622k3 originated from message 610k1, message 610k2, and message 610k3, respectively. At FIGS. 6R-6T, device 600 displays content 622k1, content 622k2, and content 622k3 in platters. In some embodiments, device 600 does not display content 622k1, content 622k2, and/or content 622k3 in platters. In some embodiments, device 600 displays content 622k1, content 622k2, and/or content 622k3 as continuous text (e.g., as part of a body of an email).

At FIG. 6R, device 600 displays summary 624k3-2 that includes summarized content that is based on content from three unread messages in the message thread. Status indicators 640 illustrate whether a particular message within a message thread is read or unread when a summary is generated. In some embodiments, device 600 does not display status indicators 640. Status indicators 640 indicate that message 610k1, message 610k2, and message 610k3 are and/or were in an unread state when a summary is generated. In response to determining that message 610k1, message 610k2, and message 610k3 are in an unread state, device 600 displays summary 624k3-2 that is based on content from message 610k1, message 610k2, and message 610k3. As depicted in FIG. 6R, summary 624k3-2 includes summarized content (e.g., "Travis wants to finalize plans") that is associated with content 622k1 from message 610k1. Summary 624k3-2 includes summarized content (e.g., "Matt has a place") that is associated with content 622k2 from message 610k2. Summary 624k3-2 includes summarized content (e.g., "Aaron has a place") that is associated with content 622k3 from message 610k3. In some embodiments, summary 624k3-2 is based on the original content from message 610k1, message 610k2, and message 610k3. In some embodiments, summary 624k3-2 is based on content from previously received emails, where the content of the previously received emails has been incorporated into the content of a newly received message (e.g., in the body of an email of a new message). In some embodiments, status indicators 640 represent the state of message 610*k*1, message 610*k*2, and/or message 610*k*3 at a time immediately prior to (e.g., at a time that is right before) device 600 detecting input 605*p* of FIG. 6P to open message 610*k*3 and/or a time when a summary is initially displayed.

At FIG. 6S, device 600 displays summary 624*k*3-3 that is based on content from two unread messages in the message thread. Status indicators 640 indicate that message 610*k*1 is in a read state and message 610*k*2 and message 610*k*3 are in an unread state. In response to detecting that message 610*k*1 is in a read state and message 610*k*2 and message 610*k*3 are in an unread state, device 600 displays summary 624*k*3-3 that is based on content from message 610*k*2 and message 610*k*3 and is not based on content from message 610*k*1. As depicted in FIG. 6S, summary 624*k*3-3 does not include summarized content (e.g., "Travis wants to finalize plans") that is associated with content 622*k*1 from message 610*k*1. Summary 624*k*3-3 includes summarized content (e.g., "Matt has a place") that is associated with content 622*k*2 from message 610*k*2. Summary 624*k*3-3 includes summarized content (e.g., "Aaron has a place") that is associated with content 622*k*3 from message 610*k*3.

At FIG. 6T, device 600 displays summary 624*k*3-4 that is based on content from one unread message in the message thread. Status indicators 640 indicate that messages 610*k*1-610*k*2 are in a read state and message 610*k*3 is in an unread state. In response to detecting that messages 610*k*1-610*k*2 are in a read state and message 610*k*3 is in an unread state, device 600 displays summary 624*k*3-4 that is based on content from message 610*k*3 and is not based on content from messages 610*k*1-610*k*2. As depicted in FIG. 6T, summary 624*k*3-4 does not include content (e.g., "Travis wants to finalize plans") that is associated with content 622*k*1 from message 610*k*1. Summary 624*k*3-4 does not include content (e.g., "Matt has a place") that is associated with content 622*k*2 from message 610*k*2. Summary 624*k*3-4 includes content (e.g., "Aaron has a place") that is associated with content 622*k*3 from message 610*k*3. In some embodiments, device 600 maintains display of summary 624*k*3-4 when message 610*k*3 is read (e.g., after a user opens message 610*k*3). In such embodiments, device 600 displays summary 624*k*3-4 independent of message 610*k*3 being in a read state.

At FIG. 6T, device 600 displays show summaries setting 638. Device 600 detects that show summaries setting 638 is activated (e.g., enabled and/or turned on) and, in response, displays summaries 624*k*3-4, 624*l*, and 624*m*. In some embodiments, show summaries setting 638 is displayed in a user interface different from email user interface 632. In some embodiments, device 600 conditionally displays summaries in messaging user interface 608 of FIGS. 6A-6K based on whether a show summaries setting (e.g., similar to show summaries setting 638 of FIG. 6T) is activated. Device 600 detects input 605*t* (e.g., a mouse click, an air gesture, and/or a touch input) directed at show summaries setting 638. In response to detecting input 605*t*, device 600 does not display (e.g., removes and/or ceases to display) summaries 624*k*3-4, 624*l*, and 624*m*, as depicted in FIG. 6U.

At FIG. 6U, device 600 detects that show summaries setting 638 is deactivated (e.g., disabled and/or not turned on). In response to detecting that show summaries setting 638 is deactivated, device 600 displays previews 620*k*3, 620*l*, and 620*m* for messages 610*k*3, 610*l*, and 610*m*, respectively. As depicted in FIG. 6U, device 600 does not display summaries 624*k*3-4, 624*l*, and 624*m*. Moreover, device 600 does not display summary indicators 625 for messages 610*k*3, 610*l*, and 610*m*.

At FIGS. 6V-6X, device 600 displays a summary in content interface 616 for multiple messages in response to detecting a request to display a summary. Device 642 is similar to device 600. Device 642 includes one or more features of device 600 and/or portable multifunction devices 100, 300, and/or 500. Device 642 displays, on display 643, email user interface 632. Email user interface 632 is similar to email user interface 632 of FIGS. 6L-6U but has a different state.

At FIG. 6V, device 642 displays messages 610*n*, 610*o*, 610*p*1, and 610*q*. Device 642 displays summaries 624*n*, 624*o*, and 624*q*1 for messages 610*n*, 610*o*, and 610*q*, respectively. Device 642 also displays preview 620*p* for message 610*p*. In some embodiments, device 642 displays summaries 624*n*, 624*o*, and 624*q*1 for messages 610*n*, 610*o*, and 610*q* (e.g., as opposed to a preview) in response to a determination that one or more conditions are met, as described herein with respect to FIGS. 6A-6U. In some embodiments, device 642 displays preview 620*p* (e.g., "11:00 PM") for message 610*p*1 in response to a determination that one or more conditions are met. For example, in some embodiments, device 642 displays preview 620*p* (e.g., "11:00 PM") in response to a determination that content of message 610*p*1 (e.g., content 622*p*1 of FIG. 6X) does not exceed a threshold amount of content. At FIG. 6V, device 642 detects input 605*v*1 (e.g., a mouse click, an air gesture, and/or a touch input) directed at message 610*p*1. In response to detecting input 605*v*1, device 642 displays content 622*p*1 of message 610*p*1, as depicted in FIG. 6W. At FIG. 6V, device 642 detects input 605*v*2 (e.g., a mouse click, an air gesture, and/or a touch input) directed at message 610*q*. In response to detecting input 605*v*2, device 642 displays content 622*q* of message 610*q*, as depicted in FIG. 6Z.

At FIG. 6W, device 642 displays a message thread of message 610*p*1 in content interface 616 of email user interface 632. Message thread of message 610*p* includes content 622*p*1-622*p*4. As depicted in FIG. 6W, device 642 does not display a summary of message 610*p* and/or a summary of content 622*p*1-622*p*4. In some embodiments, email user interface 632 includes summary affordance 644. In some embodiments, summary affordance 644, when selected, displays a summary of a message thread. In some embodiments, the summary is based on content from unread messages and is not based on read messages, as described with respect to FIGS. 6R-6T. In some embodiments, the summary is based on content from messages in the message thread and is independent of whether a particular message in the message thread is in an unread state and/or read state. At FIG. 6W, device 642 detects input 605*w*1 (e.g., a mouse click, an air gesture, and/or a touch input) directed at summary affordance 644. In response to detecting input 605*w*1, device 642 displays summary 624*p*1, as depicted in FIG. 6X. At FIG. 6W, in some embodiments, device 642 detects input 605*w*2 (e.g., a mouse click, an air gesture, and/or a touch input) directed at back affordance 648. In such embodiments, in response to detecting input 605*w*2, device 642 displays inbox interface 614.

At FIG. 6X, device 642 displays summary 624*p*1 in content interface 616. In some embodiments, summary 624*p*1 is based on content 622*p*1-622*p*4. In some embodiments, summary 624*p*1 includes summarized content from at least one of content 622*p*1, content 622*p*2, content 622*p*3, and/or content 622*p*4. In some embodiments, device 642 modifies a location of content 624*p*1-624*p*4 to display summary 624*p*1. As depicted in FIG. 6X, device 642 displays content 624*p*1-624*p*4 below summary 624*p*1. In some embodiments, summary 624*p*1 is generated (e.g., at device 642 and/or a device different from device 642) in response to detecting input 605w1. In some embodiments, device 642 displays summary affordance 644 with a different visual characteristic (e.g., color, shape, and/or animation) to indicate a summary is being generated. Device 642 also displays hide summary affordance 646 that, when selected, causes device 642 to stop displaying summary 624p. For example, in some embodiments, device 642 detects input 605x1 (e.g., a mouse click, an air gesture, and/or a touch input) directed at hide summary affordance 646. In such embodiments, in response to detecting input 605x1, device 642 displays a content interface similar to content interface 616 of FIG. 6W. In some embodiments, at FIG. 6X, device 642 detects input 605x2 (e.g., a mouse click, an air gesture, and/or a touch input) directed at back affordance 648. In such embodiments, in response to detecting input 605x2, device 642 displays inbox interface 614.

At FIG. 6Y, device 642 displays summary 624p2 as opposed to preview 620p of FIG. 6V. In some embodiments, device 642 displays a summary or a preview for a respective message when the content of the respective message is determined to be relevant to the content of another message in the message thread. In some embodiments, device 642 determines that content of one message is relevant to the content of another message based on the content of the different messages exceeding a threshold level of relevancy. In some embodiments, content of one message is determined to exceed a threshold level of relevancy when the content of one message answers a question from a different message. In some embodiments, device 642 determines that content exceeds a threshold of relevancy when content of one message is incomplete and/or missing information that is included in content from a different message. As depicted in FIG. 6W, message 610p includes content 622p1 (e.g., "11:00 PM"). In some embodiments, device 642 determines that content 622p1 is relevant to content of a previous message (e.g., content 622p2, content 622p3, and/or content 622p4). In response to a determination that content 622p1 is relevant to content of a previous message, device 642 displays summary 624p2 (e.g., "Your flight departs at 11:00 PM with reservation #124AB."), as depicted in FIG. 6Y.

At FIG. 6Y, in some embodiments, a summary displayed in inbox interface 614 is different from a summary displayed in content interface 616. In some embodiments, device 642 detects input 605y (e.g., a mouse click, an air gesture, and/or a touch input) directed at message 610p1 that includes summary 624p2. In such embodiments, in response to detecting input 605y, device 642 displays a summary in a content interface that is similar to summary 624p1 in content interface 616 of FIG. 6X. In such embodiments, the summary that is displayed in the content interface in response to device 600 detecting input 605y is automatically displayed (e.g., as opposed to summary 624p1, which was displayed in response to detecting a request to display a summary and/or in response to device 600 detecting input 605w1). In some embodiments, the summary that is displayed in content interface 616 is different from (e.g., includes more summarized content than, includes a more detailed summary than, includes less summarized content than, and/or includes a less detailed summary than) the summary displayed in inbox interface 614.

At FIG. 6Z, in response to detecting input 605v2 of FIG. 6V, device 642 displays content 622q. At FIG. 6Z, device 642 displays content 622q without a summary. At FIG. 6Z, device 642 detects input 605z (e.g., a mouse click, an air gesture, and/or a touch input) directed at summary affordance 644. In response to detecting input 605z, device 642 displays summary 624q2, as depicted in FIG. 6AA.

At FIG. 6AA, device 642 displays summary 624q2 in content interface 616. As depicted, summary 624q2 is different from (e.g., includes more summarized content than and/or includes a more detailed summary than) summary 624q1. In some embodiments, summary 624q2 is the same as summary 624q1.

At FIGS. 6AB-6AD, device 642 displays a preview after displaying content of a message that is associated with a summary. At FIGS. 6AB-6AC, device 642 displays messaging user interface 608. Messaging user interface 608 of FIGS. 6AB-6AD is similar to messaging user interface 608 of FIGS. 6A-6L but has a different state. Inbox interface 614 and content interface 616 of FIGS. 6AB-6AD are similar to inbox interface 614 and content interface 616 of FIGS. 6A-6L but have a different state.

At FIG. 6AB, device 642 displays message 610r with summary 624r that is based on content 622r (e.g., as depicted in FIG. 6AC). At FIG. 6AB, device 642 also displays summary indicator 625 and unread message indicator 612. Device 642 detects input 605ab (e.g., a mouse click, an air gesture, and/or a touch input) directed at message 610r. In response to detecting input 605ab, device 642 displays content 622r of message 610r, as depicted in FIG. 6AC.

At FIG. 6AC, device 642 displays content 622r in content interface 616 without displaying inbox interface 614 (and/or without displaying summary 624r). At FIG. 6AC, device 642 detects input 605ac (e.g., a mouse click, an air gesture, and/or a touch input) directed at back affordance 648. In response to detecting input 605ac, device 642 displays inbox interface 614, as depicted in FIG. 6AD.

At FIG. 6AD, device 642 displays message 610r with preview 620r of content 622r without displaying summary 624r. Moreover, device 642 does not display summary indicator 625 and/or unread message indicator 612.

FIG. 7 is a flow diagram illustrating a method for displaying a summary for a message using a computer system in accordance with some embodiments. Method 700 is performed at a computer system (e.g., 100, 300, 500, 600 and/or 642) (e.g., a smart phone, a smart watch, a tablet computer, a laptop computer, a desktop computer, a wearable device, and/or head-mounted device) that is in communication with a display generation component (e.g., 601 and/or 643) (e.g., a display, touch-screen display, a monitor, a holographic display system, and/or a head-mounted display system) and one or more input devices (e.g., 602 and/or 643) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device (e.g., a microphone); a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 700 are, optionally, combined, the orders of some operations are, optionally, changed, and some operations are, optionally, omitted.

As described below, method 700 provides an intuitive way for displaying a summary for a message. The method reduces the cognitive burden on a user for viewing messages and/or message summaries, thereby creating a more efficient human-machine interface. For battery-operated computing devices, enabling a user to view messages and/or message summaries faster and more efficiently conserves power and increases the time between battery charges.

The computer system displays (702), via the display generation component, a first user interface (e.g., 608, 614, and/or 632) (e.g., of a communication application), including: in accordance with a determination that a first set of criteria (e.g., a set of summary criteria) is satisfied, displaying (704) a summary (e.g., 624*d*, 624*f*, 624*j*, 624*k*1, 624*k*2, 624*k*3-1, 624*k*3-2, 624*k*3-3, 624*k*3-4, 624*l*, 624*m*, 624*n*, 624*o*, 624*p*2, and/or 624*r*) (e.g., a textual and/or graphical summary of one or more messages; an automatically generated summary (e.g., a summary including automatically-generated text content and/or a summary including generative text content); and/or a summary that is generated without user input) that is based on (e.g., derived from and/or is generated from) content (e.g., text and/or written content) of a first message (e.g., 610*d*, 610*e*, 610*j*1-610*j*3, 610*k*1, 610*k*2, and/or 610*k*3) (e.g., text message and/or email). In some embodiments, displaying the first user interface includes, in accordance with the determination that the first set of criteria is not satisfied, forgoing display of the summary. In some embodiments, the summary is generated (e.g., automatically) via one or more machine learning algorithms (e.g., the summary includes automatically-generated text content and/or the summary includes generative text content). While displaying the summary that is based on the content of the first message, the computer system detects (706), via the one or more input devices, a request to display the first message (e.g., 605*d*, 605*j*, 605*l*, 605*o*, 605*p*, 605*q*, 605*v*2, 605*y*, and/or 605*ab*) (e.g., a request to open the first message and/or a request to update a message viewing pane to display content from a selected message). In some embodiments, the request to display the first message includes detecting an input directed to a representation of the first message (or, optionally, an input directed to the summary). In response to detecting the request to display the first message, the computer system displays (708), via the display generation component, the first message (e.g., content of a message is displayed in content interface 616 as depicted in FIGS. 6E, 6G, 6K, 6R, 6S, 6T, 6Z, and/or 6AC) (e.g., in a second user interface that is different from the first user interface). In some embodiments, in response to detecting the request to display the content of the first message, the computer system displays content of the first message that was not displayed while displaying the summary. In some embodiments, the summary that is based on the content of the first message is displayed without displaying a preview of the content of the first message. In some embodiments, a preview of the content of the first message is different from (e.g., does not include) a subject line, an indication of a sender, and/or a time associated with the first message. After displaying the first message (e.g., after content of a message is displayed in content interface 616 as depicted in FIGS. 6E, 6G, 6K, 6R, 6S, 6T, 6Z, and/or 6AC), the computer system displays (710), via the display generation component, the first user interface, including displaying at least a portion (e.g., some but not all or the entirety) (in some embodiments, a preview) of the content of the first message (e.g., 620*d*, 620*j*3, 620*k*2, 620*k*3, and/or 620*r*) without displaying the summary (e.g., 620*d*, 620*j*3, 620*k*2, 620*k*3, and/or 620*r* are displayed without a summary as depicted in FIGS. 6F, 6K, 6M, 6U, 6AD) (e.g., after the first message has been opened and/or viewed, the summary is replaced by a preview of the first message). In some embodiments, the computer system concurrently displays the summary with an indication that the first message is a new message. In some embodiments, after displaying the first message, the computer system displays the portion of the content of the first message without the indication that the first message is a new message (e.g., because the first message has been opened). Detecting a request to display a first message while displaying a first user interface, including conditionally displaying a summary that is based on content of the first message when a first set of criteria is satisfied, and, in response, displaying the first message, and, after displaying the first message, displaying the first user interface, including displaying at least a portion of the content of the first message without displaying the summary, performs an operation when a set of conditions has been met without requiring further user input, declutters the user interface, provides conditional display of a summary, and provides improved visual feedback that the first message has been displayed.

In some embodiments, displaying the first message includes the computer system displaying the first message in a second user interface (e.g., 616), different from the first user interface, without displaying the summary in the second user interface (e.g., summaries 624*d*, 624*j*, 624*k*3-1, 624*k*3-2, 624*k*3-3, 624*k*3-4, 624*q*1, and 624*r* are not displayed in content interface 616 in FIGS. 6E, 6K, 6R, 6S, 6T, 6Z, and 6AC) (e.g., the summary is not displayed in the second user interface even though it is available and/or has been generated). In some embodiments, the second user interface is displayed without displaying the first user interface. In some embodiments, the second user interface is concurrently displayed with the first user interface. In some embodiments, the second user interface includes the summary. Detecting a request to display a first message while displaying a first user interface, including conditionally displaying a summary that is based on content of the first message when a first set of criteria is satisfied, and, in response, displaying the first message in a second user interface that is different from the first user interface reduces the number of inputs needed to perform an operation, provides conditional display of a summary, and declutters the user interface.

In some embodiments, displaying the first user interface includes concurrently displaying: the summary that is based on the content of the first message (e.g., 624*d*, 624*f*, 624*j*, 624*k*1, 624*k*2, 624*k*3-1, 624*k*3-2, 624*k*3-3, 624*k*3-4, 624*l*, 624*m*, 624*n*, 624*o*, 624*p*2, and/or 624*r*) and at least a portion of a second message without displaying a summary that is based on content of the second message (e.g., summaries 624*d*, 624*f*, 624*j*, 624*k*1, 624*k*2, 624*k*3-1, 624*k*3-2, 624*k*3-3, 624*k*3-4, 624*l*, 624*m*, 624*n*, 624*o*, 624*p*2, and/or 624*r* are displayed with previews 620*a*, 620*b*, 620*c*, 620*g*, in FIGS. 6B-6G) (e.g., a summary of a message is displayed with a message that does not include a summary). In some embodiments, the computer system displays at least the portion of the second message without displaying the summary that is based on the content of the second message in accordance with a determination that a first set of criteria is not satisfied (e.g., a summary was not triggered). In some embodiments, the summary that is based on the content of the second message was previously displayed (e.g., the summary was triggered but has since been replaced by a preview). Displaying the first user interface, including concurrently displaying the summary that is based on the content of the first message at least a portion of a second message without displaying a summary that is based on the content of the second message, reduces the number of inputs needed to perform an operation, provides conditional display of a summary, and declutters the user interface.

In some embodiments, while displaying the summary (e.g., 624*d*, 624*f*, 624*j*, 624*k*1, 624*k*2, 624*k*3-1, 624*k*3-2, 624*k*3-3, 624*k*3-4, 624*l*, 624*m*, 624*n*, 624*o*, 624*p*2, and/or

624*r*) that is based on content of the first message: in accordance with the determination that a set of indication criteria (e.g., a set of criteria including a criterion that is satisfied when text of a summary is displayed and/or when text that summarizes content of a message is displayed) is satisfied, the computer system displays an indication (e.g., 625 and/or 626) (e.g., a badge, a shape, a color, and/or an animation) (e.g., a temporary indication and/or a non-temporary indication) that a summary (e.g., the summary that is based on content of the first message) is being displayed (e.g., as opposed to the actual content of the first message). In some embodiments, the set of indication criteria is different from the first set of criteria (e.g., 625 and/or 626 are displayed in FIGS. 6B-6E when a summary is displayed). In some embodiments, in accordance with the determination that the set of indication criteria is not satisfied, forgoing display of the indication that a summary (e.g., the summary that is based on content of the first message) is being displayed. Displaying the first user interface, including conditionally displaying an indication that a summary is being displayed based on a set of indication criteria that is different from the first set of criteria performs an operation when a set of conditions has been met without requiring further user input provides improved visual feedback that a summary is being displayed (e.g., as opposed to actual content of the message).

In some embodiments, the set of indication criteria includes a criterion that is satisfied when an event is detected (e.g., 626 is displayed in FIG. 6C when scrolling inbox interface 614). In some embodiments, the event includes an input corresponding to a request to navigate (e.g., scroll and/or not scroll) the first user interface is detected. In some embodiments, the event includes displaying a summary (e.g., the summary that is based on content of the first message). In some embodiments, the indication is not displayed if the summary is not displayed. Displaying the first user interface, including conditionally displaying an indication that a summary is being displayed based on a second set of criteria that includes a criterion that is satisfied when an event is detected performs an operation when a set of conditions has been met without requiring further user input provides improved visual feedback that a summary is being displayed (e.g., as opposed to actual content of the message).

In some embodiments, the summary is based on content (e.g., 622*j*1, 622*j*2, 622*j*3, 622*k*3-1, 622*k*3-2, and/or 622*k*3-3) of a second message (e.g., 610*j*1, 610*j*2, 610*j*3, 610*k*1, 610*k*2, 610*k*3, 622*k*3-1, 610*k*3-2, and/or 610*k*3-3) that is different from the first message (e.g., 610*j*1, 610*j*2, 610*j*3, 610*k*1, 610*k*2, 610*k*3, 622*k*3-1, 610*k*3-2, and/or 610*k*3-3) (e.g., the summary is based on multiple messages). In some embodiments, the second message is associated with (e.g., has the same subject line, is part of the same thread of messages, and/or is communicated to the same group of users as) the first message. In some embodiments, the second message and the first message are associated (e.g., linked and/or grouped together) by a common characteristic (e.g., same subject line, are part of same thread of messages, and/or are messages that are communicated to the same group of users). Conditionally displaying a summary that is based on content of the first message and content of a second message when a first set of criteria is satisfied performs an operation when a set of conditions has been met without requiring further user input, declutters the user interface, and provides conditional display of a summary.

In some embodiments, the first set of criteria includes a criterion that is satisfied when a threshold number of messages (e.g., 2, 4, 7, and/or 10) are received within a threshold time period (e.g., 1 minute, 5 minutes, 30 minutes, 1 hour, and/or 2 hours) (e.g., summary 624*j* is displayed in FIG. 6J when third message 610*j*3 is received within 2 minutes of first message 610*j*1 and/or 1 minute of second message 610*j*2). In some embodiments, the threshold time period is measured from a time that an initial message (e.g., the first in a sequence of messages) of the threshold number of messages was received. In some embodiments, the first set of criteria includes a criterion that is satisfied when the threshold number of messages are associated with a common characteristic (e.g., same sender, same recipient, same title, same group of recipients, and/or same message thread). Conditionally displaying a summary that is based on content of the first message and content of a second message when a first set of criteria is satisfied, where the first set of criteria includes a criterion that is satisfied when a threshold number of messages are received within a threshold time period performs an operation when a set of conditions has been met without requiring further user input, declutters the user interface, and provides conditional display of a summary.

In some embodiments, the first set of criteria includes a criterion that is satisfied when a summary setting is activated (e.g., 638 is activated in FIG. 6T and deactivated in FIG. 6U) (e.g., summaries are enabled and/or permitted). In some embodiments, the summary setting is user-configurable (e.g., the summaries setting is activated and/or deactivated in response to detecting an input). Conditionally displaying a summary that is based on content of the first message when the first set of criteria is satisfied, where the first set of criteria includes a criterion that is satisfied when a summary setting is activated, performs an operation when a set of conditions has been met without requiring further user input and provides conditional display of a summary.

In some embodiments, the first set of criteria includes a criterion that is satisfied when the content of the first message satisfies a threshold amount of content (e.g., as described with respect to FIG. 6E, summary 624*d* is displayed based on content 622*d* that exceeds a threshold amount of content) (e.g., a threshold amount of text, a threshold number of alphanumeric characters, and/or a threshold number of lines of content) (e.g., the computer system displays a summary for longer messages and not for shorter messages). Conditionally displaying a summary that is based on content of the first message when a first set of criteria is satisfied, where the first set of criteria includes a criterion when the content of the first message satisfies a threshold amount of content, performs an operation when a set of conditions has been met without requiring further user input and provides conditional display of a summary.

In some embodiments, the first set of criteria includes a criterion that is satisfied when the first message is in an unread state (e.g., 610*d* is in an unread state in FIG. 6E and is in a read state in FIG. 6F; 610*d* is in an unread state in FIG. 6E and is in a read state in FIG. 6G; 610*j*3 is in a read state in FIG. 6J and is in an unread state in FIG. 6K) (e.g., has not been read and/or has not been opened) (e.g., a summary is displayed for a message that is in the unread state and is not displayed for a message that has been read and/or opened). Conditionally displaying a summary that is based on content of the first message when the first set of criteria is satisfied, where the first set of criteria includes a criterion that is satisfied when the first message is in an unread state, performs an operation when a set of conditions has been met without requiring further user input and provides conditional display of a summary.

Note that details of the processes described above with respect to method 700 (e.g., FIG. 7) are also applicable in an analogous manner to the methods described herein (e.g., methods 800 and 1000). For example, methods 800 and 1000 optionally include one or more of the characteristics of the various methods described above with reference to method 700. For example, methods 800 and 1000 include features of method 700 to selectively display content of a message (e.g., a preview) or a summary of the message. For example, methods 800 and 1000 include features of method 700 to visually distinguishing a summary from other written content. For brevity, these details are not repeated herein.

FIG. 8 is a flow diagram illustrating a method for displaying a summary for related messages using a computer system in accordance with some embodiments. Method 800 is performed at a computer system (e.g., 100, 300, 500, 600 and/or 642) (e.g., a smart phone, a smart watch, a tablet computer, a laptop computer, a desktop computer, a wearable device, and/or head-mounted device) that is in communication with a display generation component (e.g., 601 and/or 643) (e.g., a display, touch-screen display, a monitor, a holographic display system, and/or a head-mounted display system) and one or more input devices (e.g., 602 and/or 643) (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device (e.g., a microphone); a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 800 are, optionally, combined, the orders of some operations are, optionally, changed, and some operations are, optionally, omitted.

As described below, method 800 provides an intuitive way for displaying a summary for related messages. The method reduces the cognitive burden on a user for viewing messages and/or message summaries for related messages, thereby creating a more efficient human-machine interface. For battery-operated computing devices, enabling a user to view messages and/or message summaries faster and more efficiently conserves power and increases the time between battery charges.

The computer system receives (802) a first message (e.g., 610$k$1 and/or 610$k$2) (e.g., text message and/or email) including first content (e.g., 622$k$1 and/or 622$k$2) and a second message (e.g., 610$k$1 and/or 610$k$2) (e.g., text message and/or email), different from the first message, including second content (e.g., 622$k$1 and/or 622$k$2). The computer system displays (804), via the display generation component, a first summary (e.g., 624$k$2) (e.g., an automatically generated summary (e.g., a summary including automatically-generated text content and/or a summary including generative text content); and/or a summary that is generated without user input) that is based on (e.g., derived from and/or is generated from) the first content of the first message and the second content of the second message. In some embodiments, the first summary (and/or a second summary) is generated via one or more machine learning algorithms (e.g., the first summary (and/or a second summary) includes automatically-generated text content and/or generative text content) (e.g., as described with respect to FIG. 6E). After displaying the first summary, the computer system receives (806) a third message (e.g., 610$k$3) (e.g., text message and/or email) that is associated with (e.g., has the same subject line, is part of the same thread of messages, and/or is communicated to the same group of users as) the first message and the second message (e.g., 610$k$3 is part of the same thread as 610$k$1 and 610$k$2 and/or 610$k$3 is communicated to the same group of users as 610$k$1 and 610$k$2), wherein the third message includes third content (e.g., 622$k$3-3). In some embodiments, the first message, second message, and/or third message are associated (e.g., linked and/or grouped together) by a common characteristic (e.g., same subject line, are part of same thread of messages, and/or are messages that are communicated to the same group of users). After receiving the third message and in accordance with a determination that a first set of criteria (e.g., a first set of summary criteria) is satisfied, the computer system displays (808), via the display generation component, a second summary (e.g., 624$k$3-1, 624$k$3-2, 624$k$3-3, and/or 624$k$3-4), that is different from (e.g., includes different information than and/or includes a different synopsis than) the first summary, wherein the second summary is based on (e.g., derived from; is generated from; and/or is automatically (e.g., using an AI process or a generative AI process) generated from) the third content of the third message (e.g., as depicted in FIGS. 6P-6T, summaries 624$k$3-1, 624$k$3-2, 624$k$3-3, and/or 624$k$3-4 includes a summary from content 622$k$3). In some embodiments, displaying the second summary includes updating the first summary to the second summary and/or replacing the first summary with the second summary. In some embodiments, the second summary is based on (e.g., determined from and/or automatically (e.g., using an AI process or a generative AI process) generated from) the third content of the third message and the first content and/or the second content. In some embodiments, the second summary is based on the first content and the third content while not being based on the second content. In some embodiments, the second summary is based on the second content and the third content while not being based on the first content. In some embodiments, in accordance with a determination that the first set of criteria is not satisfied, the computer system forgoes displaying the second summary (e.g., forgoes updating the first summary). In some embodiments, the first set of criteria includes a criterion that is satisfied when the second summary is available (e.g., has been generated) (e.g., is available for display). In some embodiments, the first set of criteria includes a criterion that is satisfied when the third content meets a threshold amount of content (e.g., the third content includes a threshold number of characters and/or alphanumeric text). Receiving a third message associated with a first message and a second message after displaying a first summary based on first content of the first message and second content of the second message, and conditionally displaying a second summary that is based on the third content when a first set of criteria is satisfied, performs an operation when a set of conditions has been met without requiring further user input and provides different summaries after receiving additional messages.

In some embodiments, displaying the second summary includes, in accordance with a determination that the first message is in an unread state (e.g., as depicted by 640 in FIGS. 6P-6T and/or as indicated by unread message indicator 612) (e.g., has not been read and/or has not been opened), the second summary (e.g., 624$k$3-1, 624$k$3-2, 624$k$3-3, and/or 624$k$3-4) is based on (e.g., determined from and/or automatically (e.g., using an AI process or a generative AI process) generated from) the first content (e.g., as depicted in FIGS. 6P-6T, summaries 624$k$3-1, 624$k$3-2, 624$k$3-3, and/or 624$k$3-4 conditionally include a summary from content 622$k$3-1 and/or 622$k$3-2) (e.g., the second summary includes a summary of the first message). In some embodiments, displaying the second summary includes, in accordance with a determination that the first message is not in an unread state (e.g., as depicted by 640 in FIGS. 6P-6T and/or as indicated by a message not including unread message indicator 612) (e.g., the first message has been read and/or opened), the second summary is not based on the first content (e.g., as depicted in FIGS. 6P-6T, summaries 624*k*3-1, 624*k*3-2, 624*k*3-3, and/or 624*k*3-4 conditionally includes a summary from content 622*k*3-1 and/or 622*k*3-2) (e.g., the second summary does not summarize the first message). In some embodiments, the second summary is based on (e.g., based only on) content from unread messages (e.g., the second summary is not based on content from messages that have been opened and/or read). In some embodiments, in accordance with a determination that the second message is in an unread state (e.g., has not been read and/or has not been opened), the second summary is based on the second content. In some embodiments, in accordance with a determination that the second message is not in an unread state, the second summary is not based on the second content. Conditionally displaying a second summary that is based on the first content when the first message is in an unread state performs an operation when a set of conditions has been met without requiring further user input and provides a summary of multiple messages.

In some embodiments, the second summary is based on the first content after the first message has been opened (e.g., 624*k*3-1 and/or 624*k*3-2 is displayed in FIGS. 6P-6Q after message 610*k*1 and/or message 610*k*2 has been opened in response to input 605*l* of FIG. 6L and/or 605*o* of FIG. 6O) (e.g., has been read, is in a read state, and/or is not in an unread state). In some embodiments, displaying the second summary includes: in accordance with a determination that the first message has been opened and the first content satisfies relevancy criteria, the second summary includes a summary of the first content and the third content. In some embodiments, displaying the second summary includes: in accordance with a determination that the first message is in a read state and the first content does not satisfy relevancy criteria, the second summary includes a summary of the third content and does not include a summary of the first content. Displaying a second summary that is based on the first content after the first message has been opened, reduces the number of inputs needed to perform an operation (e.g., opening multiple messages to view their content).

In some embodiments, the second summary is based on the first content (e.g., summaries 624*k*3-1 and/or 624*k*3-2 is based on 622*k*3-1 and/or 622*k*3-2). In some embodiments, the first message is from a first sender (e.g., message 610*k*1 is from Travis and/or message 610*k*2 is from Matt). In some embodiments, the third message is from a second sender that is different from the first sender (e.g., message 610*k*3 is from Aaron) (e.g., the summary is based on messages from different senders). Displaying a second summary that is based on the third content and the first content, when the first message is from a first sender and the third message is from a different sender, reduces the number of inputs needed to perform an operation (e.g., opening multiple messages to view content sent from different senders).

In some embodiments, the second summary includes an indication (e.g., alphanumeric text, shape, and/or image) of the first sender (e.g., 636*a*, 636*b*, and/or 636*c*) and an indication of the second sender (e.g., 636*a*, 636*b*, and/or 636*c*) (e.g., within the summary itself and/or within the synopsis). In some embodiments, the indication of the first sender and the indication of the second sender are independent of an indication in a sender field (or, optionally, a recipient field). In some embodiments, the computer system concurrently displays (e.g., in a recipient field and/or a sender field) an indication of the first sender with an indication of the second sender in addition to a second indication of the first sender (and/or a second indication of the second sender). Including an indication of the first sender and an indication of the second sender in the second summary reduces the number of inputs needed to perform an operation (e.g., to open multiple messages to view what portion of the summary is attributed to what sender).

In some embodiments, the second summary is displayed independent (e.g., regardless) of a state of the third message (e.g., 624*k*3-1, 624*k*3-2, 624*k*3-3, 624*k*3-4 are displayed independent of a read or unread state of message 610*k*3) (e.g., the summary is displayed regardless of whether the third message is unopened or opened). In some embodiments, the second summary is displayed while the third message is in a read state (and/or, an unread state). Displaying the second summary independently of a state of the third message reduces the number of inputs needed to perform an operation (e.g., opening the message and/or displaying the content of the message) regardless of the state of the message.

In some embodiments, prior to displaying the second summary, the computer system concurrently displays, via the display generation component, the first summary with the third content (e.g., prior to displaying summaries 624*k*3-1, 624*k*3-2, 624*k*3-3, and/or 624*k*3-4, device 600 displays summaries 624*k*1 and/or 62*k*2 with content 622*k*3) (e.g., a summary that is not based on the third content is displayed with the content of the new message). In some embodiments, the computer system displays the third content prior to displaying the second summary. Concurrently displaying the first summary with the third content provides quick access to the third content because the third content can be viewed regardless of whether the second summary is displayed (and/or available).

In some embodiments, the first message, the second message, and the third message are messages of (e.g., correspond to) a communication application (e.g., messaging application associated with messaging user interface 608 and/or email application associated with email user interface 632) (e.g., the first, second, and third message are messages from the same communication application). In some embodiments, the first set of criteria includes a criterion that is satisfied by the communication application having been in an inactive state (e.g., closed and/or running in the background) after the third message is received (e.g., summary 624*k*2 is not displayed until email user interface 632 is moved to the background, as depicted in FIGS. 6M-6O) (e.g., the second summary is not displayed until the communication application is moved to the background or closed after the third message is received). In some embodiments, the computer system forgoes (and/or delays) display of the second summary until the communication application has transitioned to an inactive state. In some embodiments, the computer system detects the state of the communication application (e.g., whether the communication application is in the inactive state and/or active state). In some embodiments, the computer system detects a request to activate (e.g., navigate to and/or bring to the foreground) a second application, different from the communication application, and, in response causes the communication application to transition to an inactive state (e.g., from an active state) and causes the second application to transition to an active state (e.g., from an inactive state). In some embodiments, while the communication application is in the inactive state, the computer system detects a request to activate (e.g., navigate to and/or bring to the foreground) the communication application and, in response, causes the communication application to transition to an active state (and/or causes a respective application in an active state to transition to an inactive state). Conditionally displaying a second summary based on whether a communication application has been in an inactive state associated with different messages has transitioned from an active state to an inactive state performs an operation when a set of conditions has been met without requiring further user input.

In some embodiments, the first set of criteria includes a criterion that is satisfied when the second summary is generated (e.g., available for display) within a threshold period of time (e.g., 1 second, 3 seconds, 10 seconds, and/or 1 minute) of the third message being received (e.g., device 600 displays a preview 620k3 for message 610k3 is displayed if a summary, such as summary 603k3-1, has not been generated within a threshold period of time of receiving message 610k3) (and/or available for display). In some embodiments, after receiving the third message and in accordance with the determination that the first set of criteria is not satisfied, the computer system displays at least a portion of the third content without displaying the second summary (e.g., device 600 displays a preview for message 610k3 without displaying a summary, such as summary 624k3-1) (e.g., if the third content is available for display and the second summary is not available within a threshold period of time, then the computer system does not delay displaying at least a portion of the third content). Conditionally displaying the second summary or a portion of the third content without displaying the second summary depending on whether the second summary is generated within a threshold period of time, performs an operation when a set of conditions has been met without requiring further user input and prevents the delay of displaying content when a summary is not generated.

In some embodiments, after receiving the first message (e.g., 610k1) (and/or, in some embodiments, before receiving the second message), the computer system displays, via the display generation component, a third summary (e.g., 624k1) based on (e.g., determined from and/or automatically (e.g., using an AI process or a generative AI process) generated from) the first content, wherein the third summary is different (e.g., includes different information than and/or includes a different synopsis than) from the second summary (e.g., 624k1 is different from 624k3-1, 624k3-2, 624k3-3, and/or 624k3-4) (and/or, in some embodiments, from the first summary) (e.g., a summary for an initial message is different from a summary for multiple messages). Displaying, after receiving the first message, a third summary based on the first content, where the third summary is different from the second summary message reduces the number of inputs needed to perform an operation (e.g., opening the message).

Note that details of the processes described above with respect to method 800 (e.g., FIG. 8) are also applicable in an analogous manner to the methods described herein (e.g., methods 700 and 1000). For example, methods 700 and 1000 optionally include one or more of the characteristics of the various methods described above with reference to method 800. For example, methods 700 and 1000 include features of method 800 to selectively display a summary for related messages. For example, methods 700 and 1000 include features of method 800 to display a different summary based on (e.g., determined from and/or automatically (e.g., using an AI process or a generative AI process) generated from) a state of message (and/or related messages). For example, methods 700 and 1000 include features of method 800 to display a summary for related messages that are from different senders and/or display indication of a different sender. For example, methods 700 and 1000 include to conditionally display a summary based on various conditions (e.g., whether a communication application has been in an inactive state after receiving a message and/or whether the summary is generated within a threshold period-of-time). For brevity, these details are not repeated herein.

FIGS. 9A-9P illustrate user interfaces for displaying a message summary affordance, in accordance with some embodiments. The user interfaces in these figures are used to illustrate the processes described below, including the processes in FIG. 10. While FIGS. 9A-9P describe and depict user interfaces for email messages, they are merely for illustrative purposes. The techniques described with respect to FIGS. 9A-9P are applicable to various communication application user interfaces that include written communications, including text messaging user interfaces and instant messaging user interfaces. The techniques described with respect to FIGS. 9A-9P are applicable to messaging user interface 608 and email user interface 632 of FIGS. 6A-6AD. Additionally, the techniques described with respect to messaging user interface 608 and email user interface 632 of FIGS. 6A-6AD are applicable to email user interface 632 of FIGS. 9A-9P. Features and reference numbers of FIGS. 9A-9P include several common features and reference numbers that are described in further detail with respect to FIGS. 6A-6AD. The details of these common features are not repeated in FIGS. 9A-9P for brevity.

At FIG. 9A, device 642 displays, on display 643, inbox interface 614 of an email application corresponding to email user interface 632. Inbox interface 614 includes messages 910a-910d (e.g., email messages), which are part of message thread 902. As depicted by unread message indicator 612, message thread 902 includes at least one unread message. In some embodiments, message thread 902 includes messages that device 642 has determined to group together in one message thread based on a set of criteria (e.g., based on a message ID, based on a title of the message, and/or based on a similar group of recipients). In some embodiments, in response to detecting an input directed at message thread view option 901, device 642 displays a single message (e.g., Michael's message 910a, Sara's message 910b, Carrie's message 910c, or Carrie's message 910d) from message thread 902 in inbox interface 614, as illustrated in FIG. 9J. As depicted, show summaries setting 638 is off. In response to detecting show summaries setting 638 is off, device 642 does not display a summary of one or more messages in inbox interface 614, as described in greater detail with respect to FIGS. 6A-6AD. In some embodiments, in response to detecting show summaries setting 638 is on, device 642 displays a summary of one or more messages in inbox interface 614, as described in greater detail with respect to FIGS. 6A-6AD.

At FIG. 9A, device 642 detects a request to view message thread 902. In some embodiments, the request to view message thread 902 includes input 905a (e.g., a touch input, an air gesture, a button press, a gaze, and/or a speech input) directed at message thread 902 and/or a message (e.g., message 910a, 910b, 910c, and/or 910d) of message thread 902. In response to detecting input 905a, device 642 displays content interface 616 of FIG. 9B or content interface 616 of FIG. 9C, depending on a read and/or unread state of messages 910a, 910b, 910c, and/or 910d in message thread 902. In some embodiments, in response to detecting input 905a, device 642 displays content interface 616 of FIG. 9E or content interface 616 of FIG. 9F, depending on a read and/or unread state of messages 910a, 910b, 910c, and/or 910d in message thread 902.

Figure 9B:
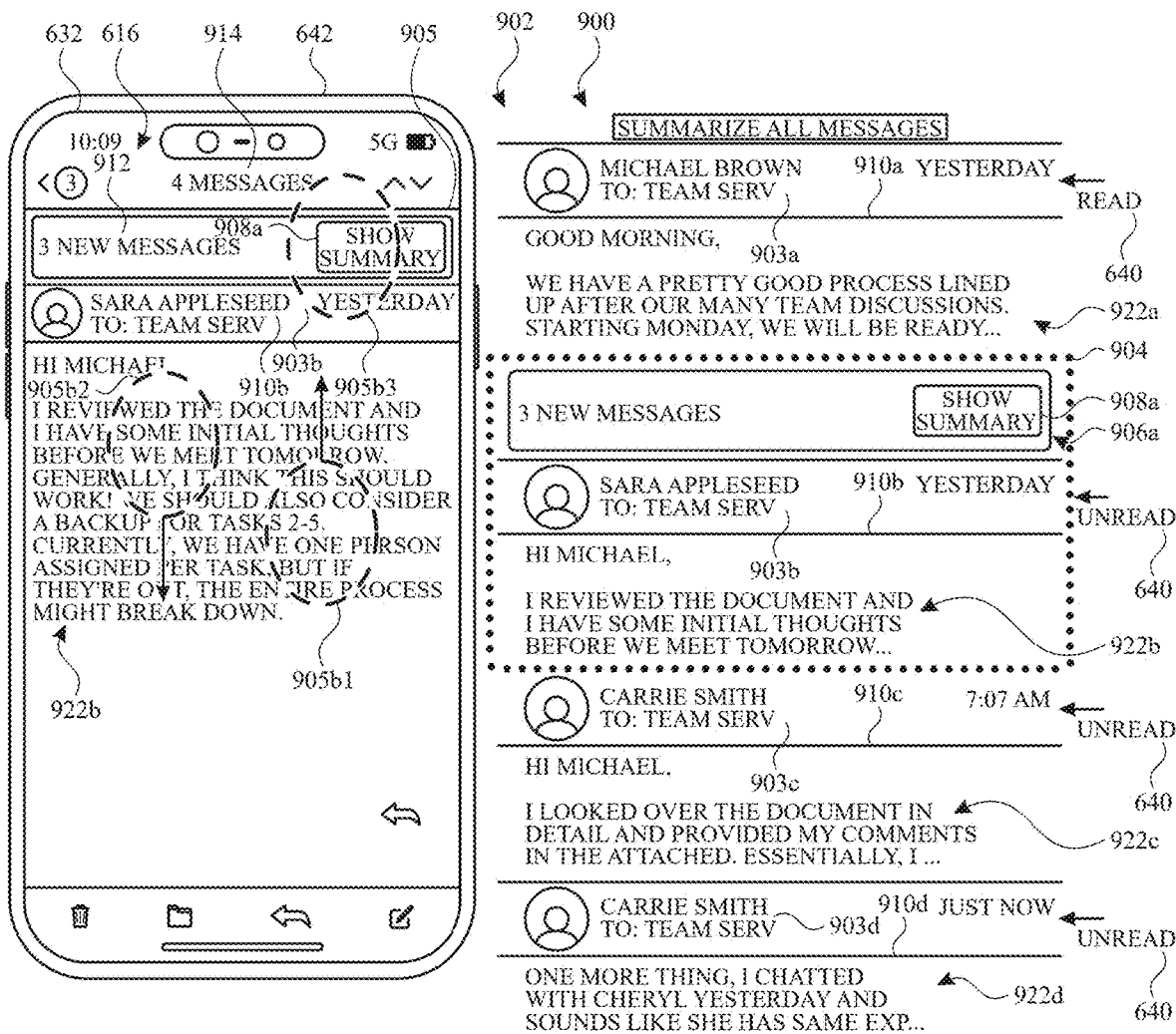

At FIG. 9B, in response to detecting input 905a and based on determining Sara's message 910b is unread (and/or based on determining Michael's message 910a is read), device 642 displays content interface 616. In some embodiments, Sara's message 910b is the first unread message in a series of unread messages (e.g., messages 910b-910d), where the series of unread messages were received after Sara's message 910b was received. Content interface 616 displays portion 905 of message thread 902 corresponding to dotted box 904, which surrounds a portion of expanded representation 900 of message thread 902. Dotted box 904 illustrates that content interface 616 of device 642 is displaying specific content and/or is at a specific position within message thread 902. Because expanded representation 900 of message thread 902 is provided for illustrative purposes, expanded representation 900 includes only a portion of the content that is depicted in content interface 616 of device 642. Moreover, expanded representation 900 of message thread 902 depicts an example layout of a message thread, an example order of messages, and/or an example orientation of messages in message thread 902. In some embodiments, expanded representation 900 of message thread 902 includes a layout of a message thread, an order of messages, and/or an orientation of messages that is different from what is depicted in FIG. 9B. In some embodiments, the contents (messages 910a-910d, summary affordance 908a, summary affordance 908b, and/or summary 924) of content interface 616 are visually distinguished from each other (e.g., by using one or more tiles, by using different colors, by separating the content using one or more shapes, and/or by separating the content using one or more icons).

At FIG. 9B, device 642 displays summary affordance 908a in content interface 616. Summary affordance 908a is similar to summary affordance 644, but has a different state. As described herein, device 642 displays a summary in response to detecting an input (e.g., a touch input, an air gesture, a button press, a gaze, and/or a speech input) directed at summary affordance 908a. In some embodiments, device 642 generates the summary in response to detecting the input directed at summary affordance 908a. In some embodiments, device 642 has generated a summary prior to detecting the input directed at summary affordance 908a. In such embodiments, device 642 displays the previously generated summary in response to detecting the input directed at summary affordance 908a.

At FIG. 9B, device 642 displays summary affordance 908a at a specific position in content interface 616. As depicted, summary affordance 908a is displayed above at least a portion of Sara's message 910b. For example, summary affordance 908a is displayed above message header 903b of Sara's message 910b. In some embodiments, a message header (e.g., message header 903b) includes a subject line (e.g., a title) of a message, an indication of a sender (e.g., "Sara Appleseed"), a recipient of the message (e.g., "team serv"), and/or a date or time that the message was received (e.g., "yesterday"). Device 642 also displays an indication of a number of new messages that are and/or will be summarized, as depicted by reference number 912 (e.g., "3 new messages"). Device 642 displays indication 914 (e.g., "4 messages") of a total quantity of messages in the message thread.

At FIG. 9B, as depicted in expanded representation 900, summary affordance 908a is displayed at location 906a within message thread 902. For example, summary affordance 908a is displayed below Michael's message 910a (e.g., below message header 903a of Michael's message 910a and/or below content 922a of Michael's message 910a). Moreover, summary affordance 908a is displayed above Sara's message 910b (e.g., above header 903b of Sara's message 910b and/or above content 922b of Sara's message 910b). Summary affordance 908a is displayed above Carrie's message 910c (e.g., above header 903c of Carrie's message 910c and/or above content 922c of Carrie's message 910c). Summary affordance 908a is displayed above Carrie's message 910d (e.g., above header 903d of Carrie's message 910d and/or above content 922d of Carrie's message 910d).

At FIG. 9B, as depicted in expanded representation 900 of message thread 902, summary affordance 908a has a specific orientation relative to read and unread messages. Status indicators 640 illustrate the state of a message immediately prior (or, optionally, within a threshold amount of time) to device 642 detecting the request to view message thread 902 (and/or input 905a). Summary affordance 908a is displayed between a read message (e.g., Michael's message 910a) and an unread message (e.g., Sara's message 910b). As depicted, a summary affordance is not displayed between two unread messages (e.g., between Sara's message 910b and/or Carrie's message 910c).

At FIG. 9B, in some embodiments, device 642 scrolls summary affordance 908a in response to detecting a request to scroll the content of content interface 616. For example, in some embodiments, in response to detecting a request to scroll content interface 616 in a respective direction, device 642 scrolls both the content (e.g., content 922b) of content interface 616 and summary affordance 908a. In some embodiments, device 642 detects input 905b1 (e.g., a touch input, an air gesture, a button press, a gaze, and/or a speech input) corresponding to a request to scroll in a downward direction. In such embodiments, in response to detecting input 905b1, device 642 shifts both content 922b and summary affordance 908a in an upward direction. In some embodiments, in response to detecting input 905b1, device 642 displays content 922c of Carrie's message 910c without displaying summary affordance 908a. In some embodiments, device 642 detects input 905b2 (e.g., a touch input, an air gesture, a button press, a gaze, and/or a speech input) corresponding to a request to scroll in an upward direction. In such embodiments, in response to detecting input 905b2, device 642 shifts both content 922b and summary affordance 908a down. In some embodiments, in response to detecting input 905b2, device 642 displays content 922a of Michael's message 910a without displaying summary affordance 908a.

At FIG. 9B, device 642 detects input 905b3 (e.g., a touch input, an air gesture, a button press, a gaze, and/or a speech input) directed at summary affordance 908a. In response to detecting input 905b3, device 642 displays summary 924 of FIG. 9F.

Figure 9C:
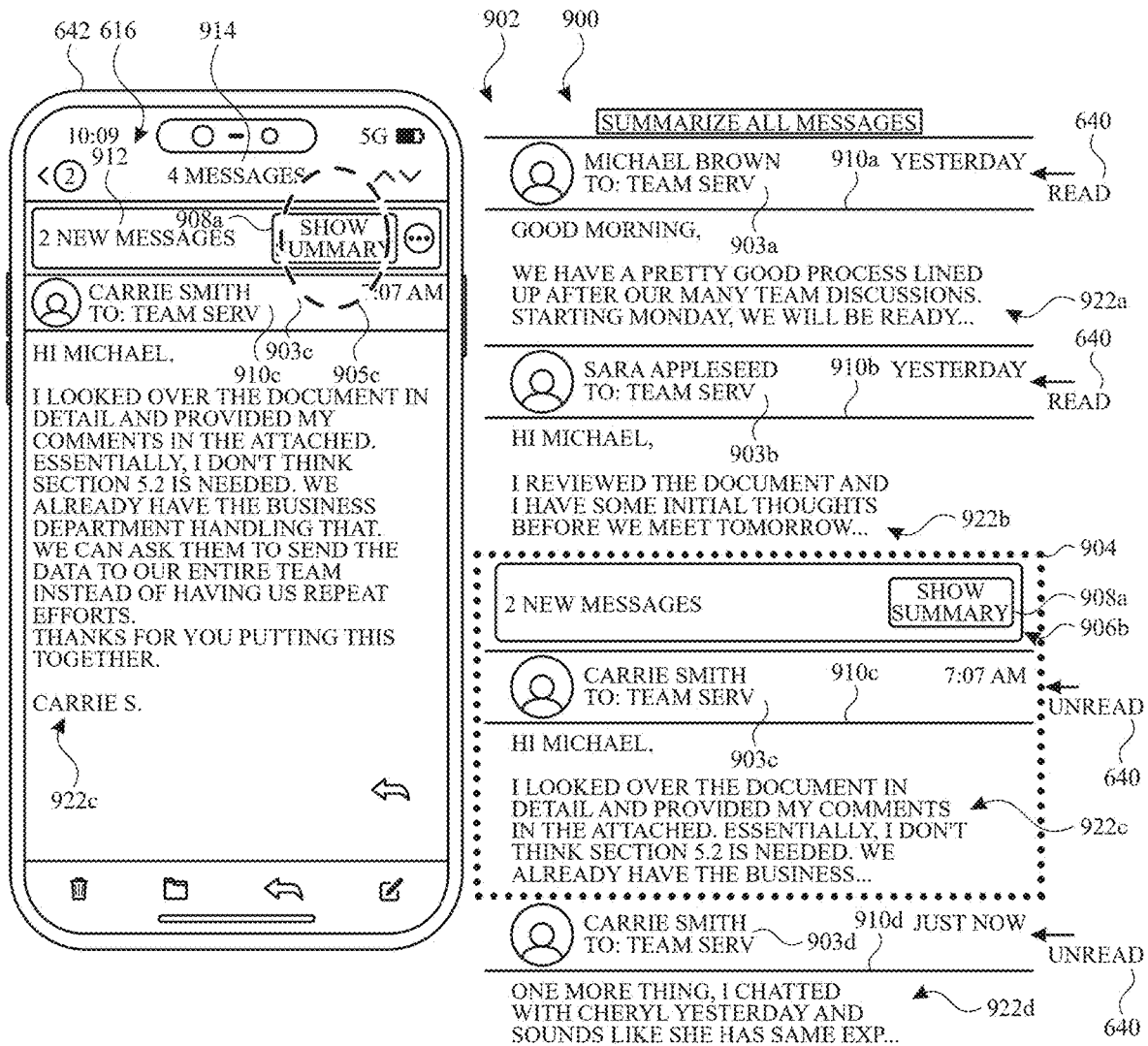

At FIG. 9C, in response to detecting input 905a of FIG. 9A and based on determining Carrie's message 910c is unread (and/or based on determining Sara's message 910b and Michael's message 910a are read), device 642 displays content interface 616. In some embodiments, Carrie's message 910c is the first unread message of a series of unread messages, where the series of unread messages were received after Carrie's message 910c was received. As depicted by dotted box 904 in expanded representation 900, device 642 displays summary affordance 908a at location 906b. Location 906b is a different location in message thread 902 than location 906a of FIG. 9B (e.g., location 906b is below location 906a). As depicted in FIG. 9C, summary affordance 908a has a specific position (e.g., between, above, below, to the left, and/or to the right) relative to read and unread messages of message thread 902. For example, device 642 displays summary affordance 908a between Carrie's message 910c (which is unread) and Sara's message 910b (which is read). As depicted in FIG. 9C, summary affordance 908a is not displayed between Michael's message 910a and Sara's message 910b (e.g., location 906a of FIG. 9B). At FIG. 9C, device 642 detects input 905c (e.g., a touch input, an air gesture, a button press, a gaze, and/or a speech input) directed at summary affordance 908a.

Figure 9D:
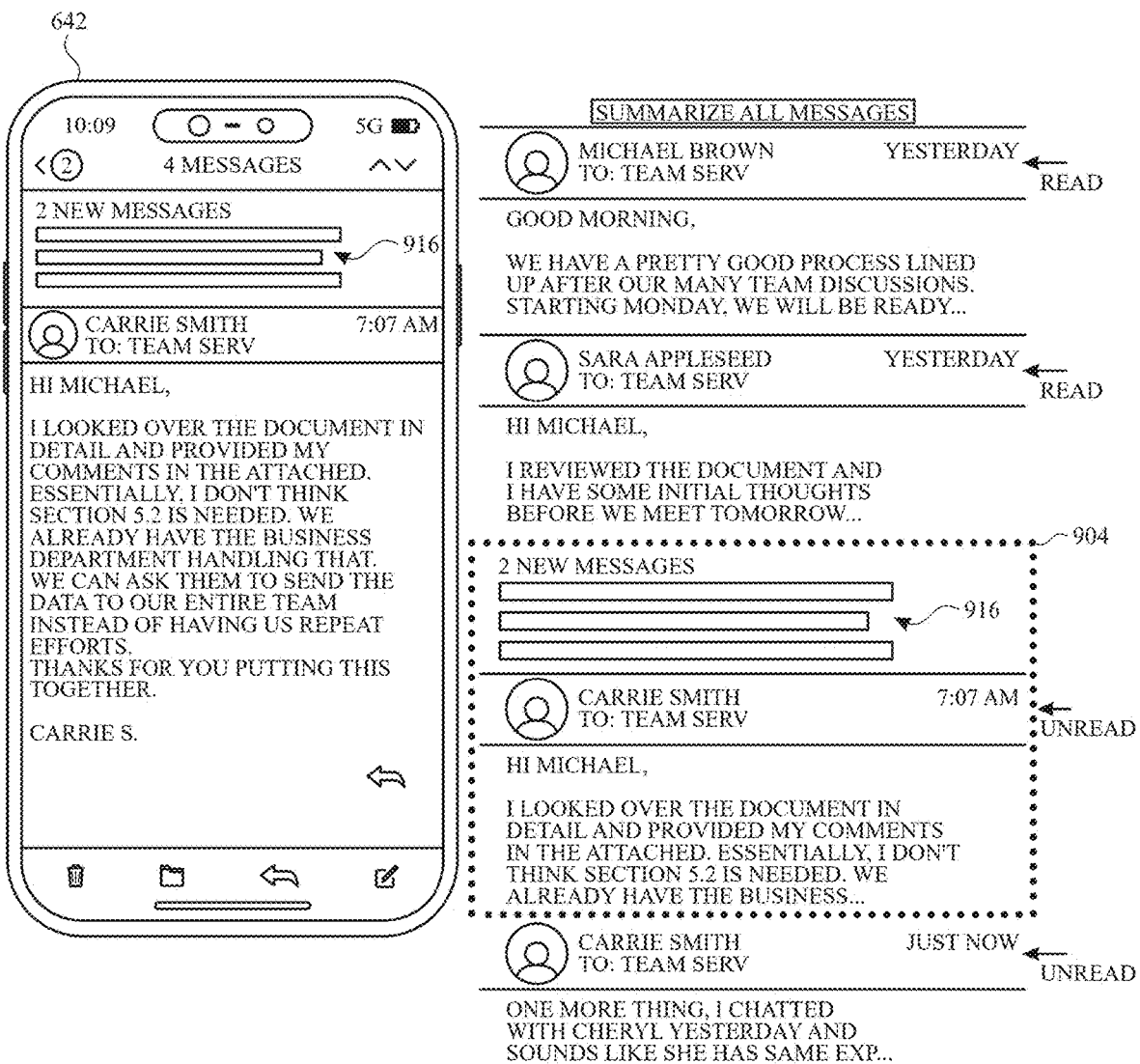

At FIG. 9D, in response to detecting input 905c, device 642 displays animation 916. Animation 916 includes an effect (e.g., a glowing, outlining, and/or highlighting effect) that changes over a period of time (e.g., 1 second, 3 seconds, 10 seconds) until device 642 no longer displays animation 916. In some embodiments, animation 916 indicates that a summary is being generated.

Figure 9E:
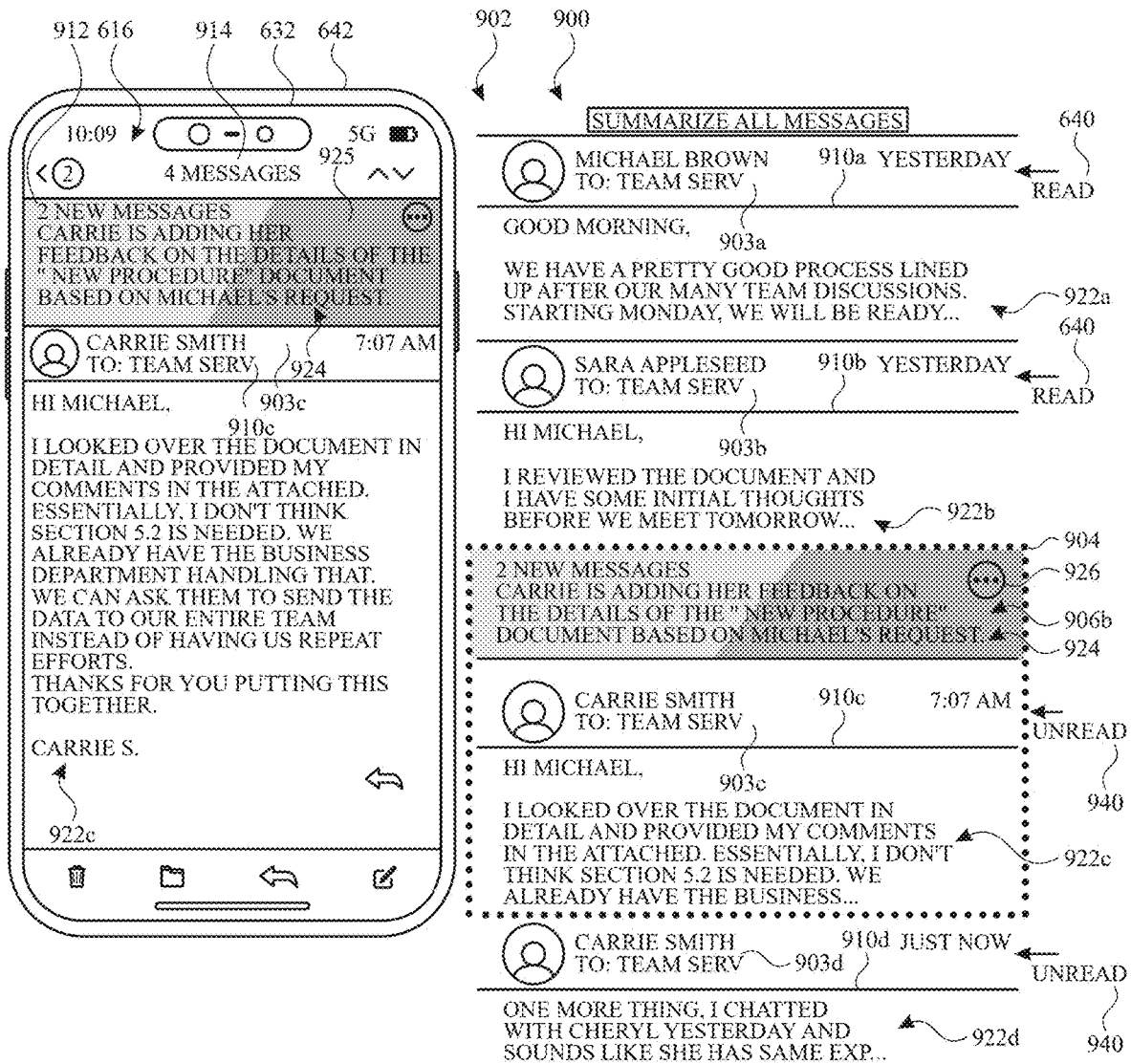

At FIG. 9E, in response to detecting input 905c and/or after animation 916 has ended, device 642 displays summary 924 in content interface 616. Summary 924 is similar to the summaries described with respect to FIGS. 6A-6AD (e.g., summaries 624d, 624f, 624j, 624k1, 624k2, 624k3-1, 624k3-2, 624k3-3, 624k3-4, 624l, 624m, 624n, 624o, 624p1, 624p2, 624q1, 624q2, and/or 624r), but has a different state. For example, summary 924 summarizes the content of a message and/or one or more messages of a message thread. In some embodiments, the summary is content (e.g., automatically-generated text content and/or generative text content) that is generated from a machine learning algorithm (e.g., a generative AI model and/or a large language model). In some embodiments, summary 924 includes machine-generated content (e.g., automatically-generated text content and/or generative text content) that is based on (e.g., derived from, determined from, and/or automatically (e.g., using an AI process or a generative AI process) generated from) and/or is different from the content of one or more messages. In some embodiments, summary 924 provides an overview of the content of one or more messages (e.g., without replicating (e.g., mirroring) the exact text of the content).

At FIG. 9E, summary 924 summarizes (e.g., is based on) unread messages of message thread 902. For example, summary 924 summarizes Carrie's message 910c (e.g., content 922c) and Carrie's message 910d (e.g., content 922d). Summary 924 does not summarize the read messages of thread 902, including Michael's message 910a (e.g., content 922a) and Sara's message 910b (e.g., content 922b). As depicted, summary 924 includes indication 923 (e.g., "Carrie . . . ") of a portion of the summary that is attributed to a specific person, similar to indications 636a, 636b, and/or 636c described with respect to FIGS. 6A-6AD. In some embodiments, summary 924 does not include indication 923. Device 642 displays summary 924 with an indication of how many messages are included in summary 924, as depicted by reference number 912 (e.g., "2 new messages").

At FIG. 9E, device 642 displays summary 924 without displaying summary affordance 908a. In some embodiments, a location occupied by at least a portion (e.g., some but not all and/or all) of summary 924 replaces a location occupied by at least a portion (e.g., some but not all and/or all) of summary affordance 908a. Summary 924 is displayed at location 906b, which was previously occupied by summary affordance 908a, as depicted with respect to FIG. 9C. Location 906b has a specific position within message thread 902, as described with respect to FIG. 9C. Device 642 also displays summary menu affordance 926, which is described in greater detail with respect to FIG. 9F. As described in greater detail with respect to FIG. 9F, in response to detecting a request to scroll the content of content interface 616, device 642 scrolls both summary 924 and the content in content interface 616.

At FIG. 9E, device 642 displays summary 924 with visual characteristic 925 to distinguish summary 924 from other content of message thread 902. In some embodiments, visual characteristic 925 is displayed at the text. In some embodiments, visual characteristic 925 is a font characteristic (e.g., bold, underline, font color, and/or font size). In some embodiments, visual characteristic 925 is displayed adjacent to the text (e.g., a color, shape, glow, and/or outline). In some embodiments, visual characteristic 925 is displayed in response to detecting an event (e.g., scrolling and/or user interaction with content interface 616). In such embodiments, visual characteristic 925 is displayed for a threshold period of time and, once the threshold period of time is met, device 642 stops displaying visual characteristic 925. In some embodiments, visual characteristic 925 is persistent (e.g., is not displayed in response to detecting an event) and/or is displayed when summary 924 is displayed.

At FIG. 9E, in some embodiments, device 642 displays (e.g., automatically displays) summary 924 in response to a request to view the message thread (e.g., and without an input directed at summary affordance 908a and/or without displaying summary affordance 908a). For example, in response to detecting input 905a and based on determining Carrie's message 910c is unread (and/or based on determining Sara's message 910b and Michael's message 910a are read), device 642 displays summary 924 of FIG. 9F (e.g., automatically and/or without user input directed to summary affordance 908a of FIG. 9C).

Figure 9F:
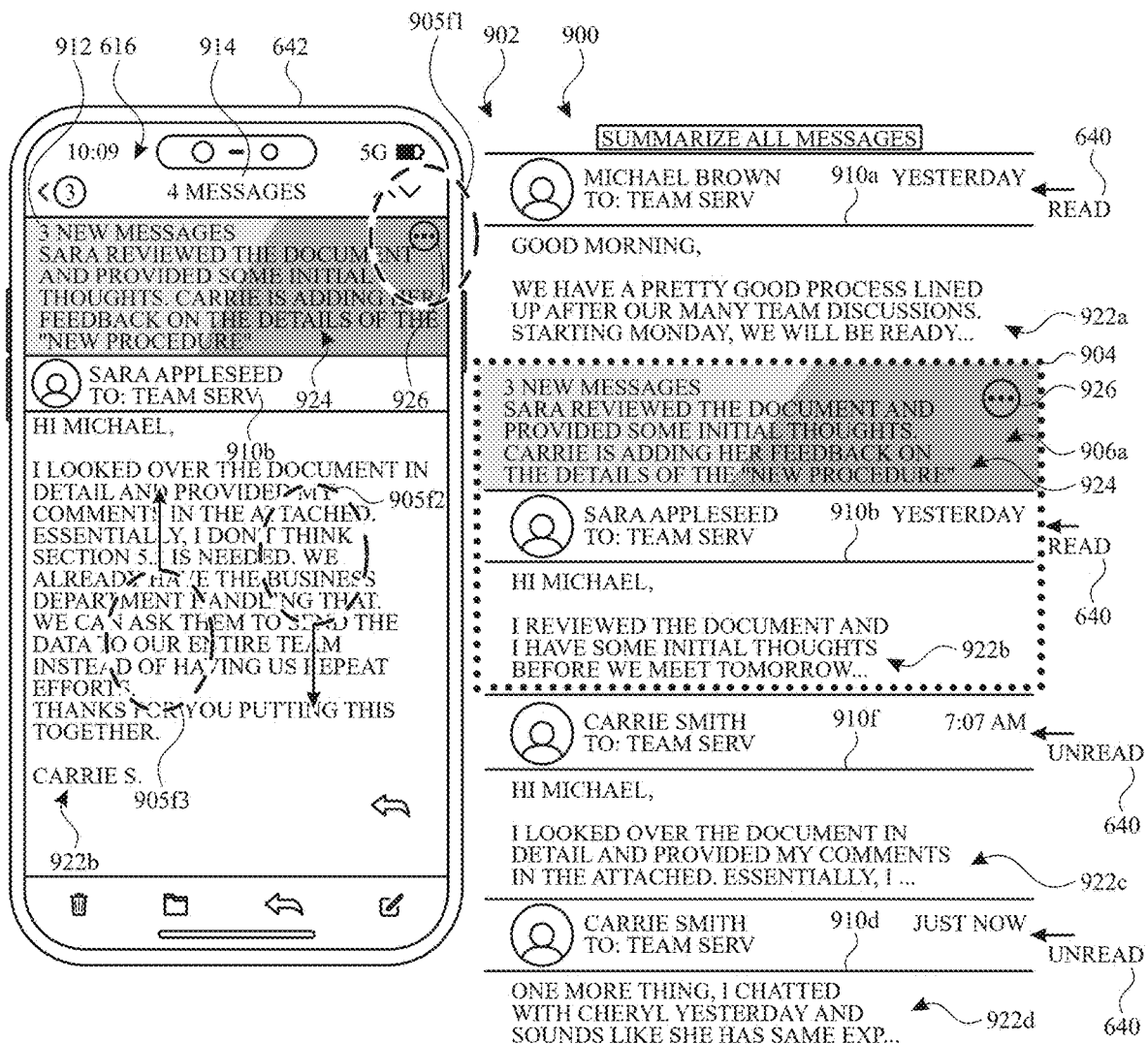

At FIG. 9F, in response to detecting input 905b3 of FIG. 9B, device 642 displays summary 924. Summary 924 of FIG. 9F is different from summary 924 of FIG. 9E. Summary 924 of FIG. 9F summarizes the unread messages of message thread 902, including Sara's message 910b (e.g., content 922b), Carrie's message 910c (e.g., content 922c), and Carrie's message 910d (e.g., content 922d). Summary 924 of FIG. 9F does not summarize the read messages of message thread 902, including Michael's message 910a (e.g., content 922a). Device 642 displays summary 924 with an indication of how many messages are included in summary 924, as depicted by reference number 912 (e.g., "3 new messages"). Device 642 displays summary 924 at location 906a, as described with respect to FIG. 9B.

At FIG. 9F, in some embodiments, device 642 scrolls summary 924 in response to detecting a request to scroll the content of content interface 616. For example, in some embodiments, in response to detecting a request to scroll the content of content interface 616 in a respective direction, device 642 shifts both the content (e.g., content 622b) of content interface 616 and summary 924. In some embodiments, device 642 detects input 905f2 (e.g., a touch input, an air gesture, a button press, a gaze, and/or a speech input) corresponding to a request to scroll in an upward direction. In such embodiments, in response to detecting input 905f2, device 642 shifts both content 622b and summary 924 in a downward direction. In some embodiments, in response to detecting input 905f3, device 642 displays content 922a of Michael's message 910a without displaying summary 924. In some embodiments, device 642 detects input 905f3 (e.g., a touch input, an air gesture, a button press, a gaze, and/or a speech input) corresponding to a request to scroll in a downward direction. In such embodiments, in response to detecting input 905f3, device 642 shifts both content 622b and summary 924 in an upward direction. In some embodiments, in response to detecting input 905f2, device 642 displays content 922c of Carrie's message 910c without displaying summary 924.

At FIG. 9F, in some embodiments, device 642 displays (e.g., automatically displays) summary 924 in response to a request to view the message thread (e.g., and without an input directed at summary affordance 908a and/or without displaying summary affordance 908a). For example, in response to detecting input 905a and based on determining Sara's message 910b is unread (and/or based on determining Michael's message 910a is read), device 642 displays summary 924 of FIG. 9F (e.g., automatically and/or without user input directed to summary affordance 908a of FIG. 9B).

At FIG. 9F, device 642 displays summary menu affordance 926. Summary menu affordance 926, when selected, causes device 642 to display options corresponding to summary 924. Device 642 detects input 905f1 (e.g., a touch input, an air gesture, a button press, a gaze, and/or a speech input) directed at summary menu affordance 926. In response to detecting input 905f1, device 642 displays summary menu 928 of FIG. 9G.

Figure 9G:
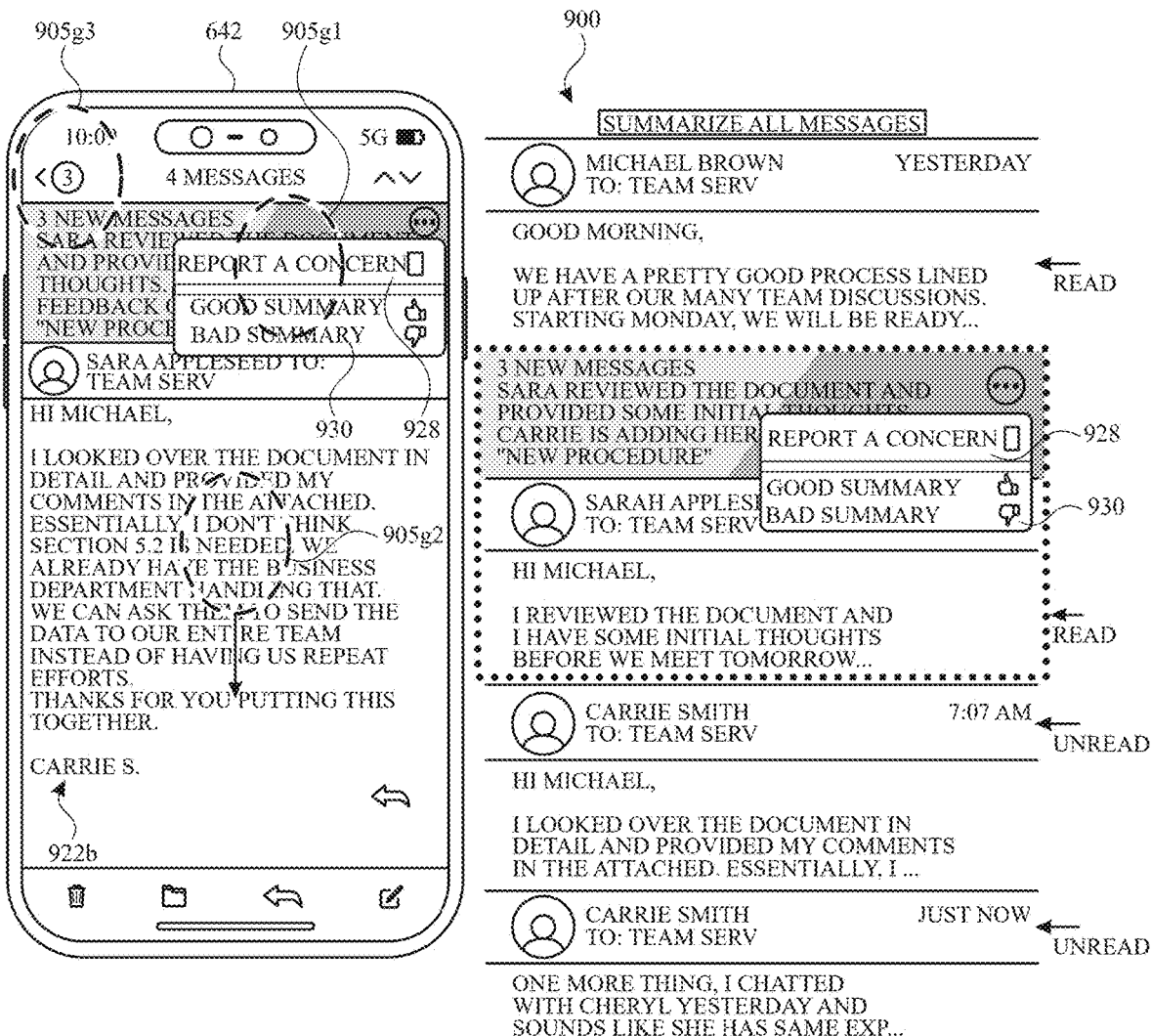

At FIG. 9G, summary menu 928 includes one or more options corresponding to summary 924. For example, summary menu 928 includes report affordance 930. In some embodiments, device 642 detects input 905g1 (e.g., a touch input, an air gesture, a button press, a gaze, and/or a speech input) directed at report affordance 930. In response to detecting input 905g1, device 642 initiates a communication regarding an issue corresponding to summary 924 to an external computer system. In some embodiments, in response to detecting input 905g1, device 642 stops displaying summary 924. In some embodiments, the one or more options corresponding to summary 924 include an affordance that, when selected, stops displaying (e.g., hides) summary 924. In some embodiments, the one or more options corresponding to summary 924 include an affordance that, when selected, provides feedback (e.g., feedback that summary 924 is a good summary and/or negative feedback that summary 924 is not a good summary) regarding summary 924.

Figure 9H:
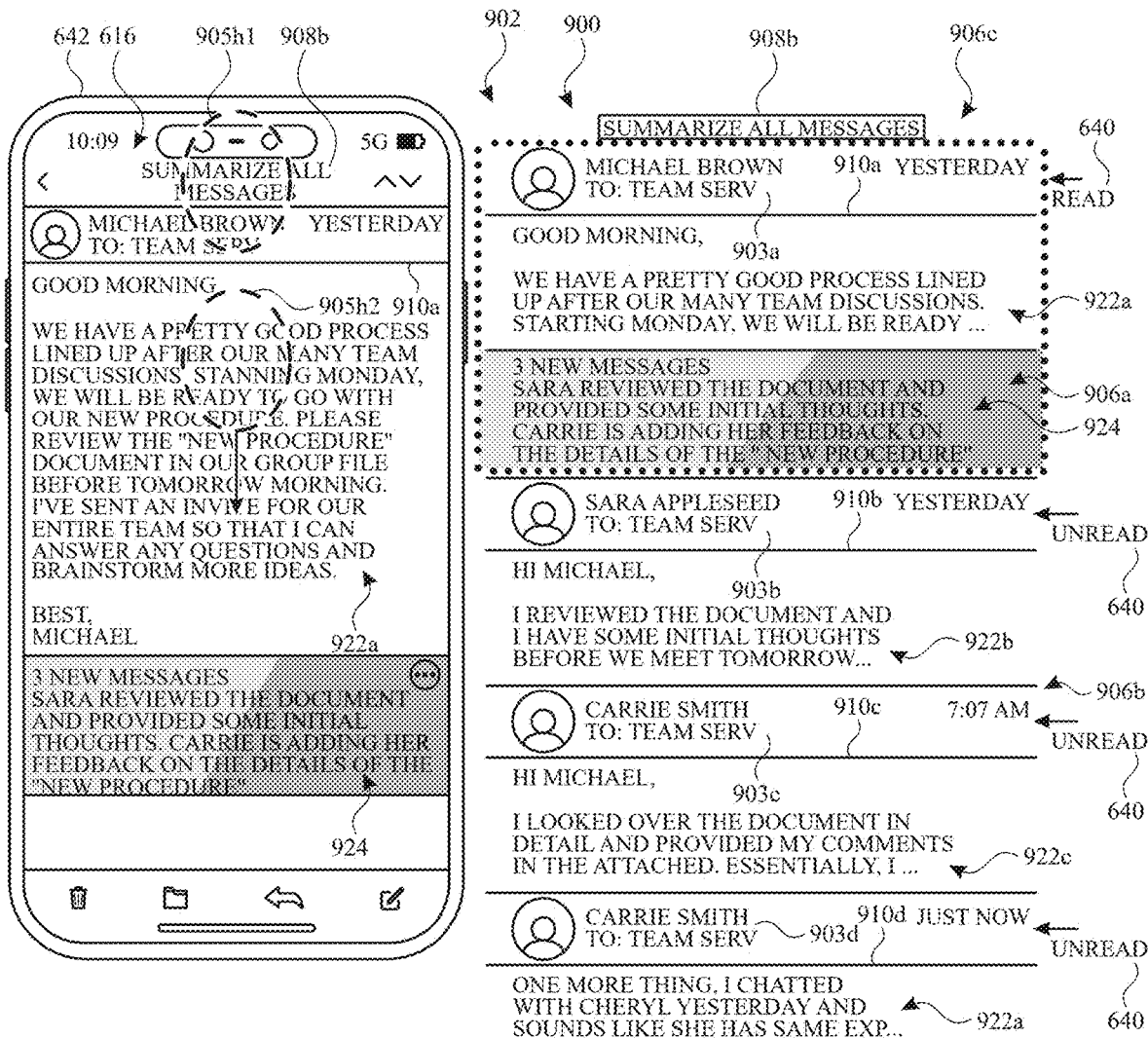

At FIG. 9G, device 642 detects input 905g2 (e.g., a touch input, an air gesture, a button press, a gaze, and/or a speech input) to scroll content interface 616. In response to detecting input 905g2, device 642 scrolls content interface 616 (e.g., up, down, left, and/or right), as depicted in FIG. 9H. In some embodiments, device 642 detects input 905g3 (e.g., a touch input, an air gesture, a button press, a gaze, and/or a speech input) directed at back affordance 936. In such embodiments, in response to detecting input 905g3, device 642 displays an inbox interface similar to inbox interface 614 of FIG. 9J.

At FIG. 9H, in response to detecting input 905g2, device 642 displays summary affordance 908b. Summary affordance 908b is similar to summary affordance 908a, but has a different state. In some embodiments, summary affordance 908b summarizes all messages of message thread 902 (e.g., summary affordance 908b summarizes both read and unread messages). In some embodiments, summary affordance 908a summarizes messages of message thread 902 based on (e.g., dependent on) a read and/or unread status of a particular message (e.g., summary affordance 908a summarizes unread messages).

At FIG. 9H, summary affordance 908b is at location 906c, which is different from location 906a and location 906b. Location 906c is above Michael's message 910a (e.g., above header 903a and/or content 922a). As depicted in expanded representation 900, location 906c is in an upper-most portion of message thread 902. As depicted, location 906c is above read and unread messages (e.g., messages 910a-910d) of message thread 902. In some embodiments, summary affordance 908b is not displayed in content interface 616 of FIG. 9H and/or is not displayed in an upper-most portion of message thread 902. In some embodiments, device 642 displays summary affordance 908b at a location that is different from location 906c. In some embodiments, device 642 displays summary affordance 908b at location 906a and location 906b (e.g., and/or currently with summary affordance 908a).

At FIG. 9H, device 642 detects a request to display a summary based on all the messages of message thread 902. In some embodiments, device 642 detects input 905h1 (e.g., a touch input, an air gesture, a button press, a gaze, and/or a speech input) directed at summary affordance 908b. In such embodiments, in response to detecting input 905h1, device 642 displays summary 924 of FIG. 9I. At FIG. 9H, in some embodiments, device 642 detects input 905h2 (e.g., a touch input, an air gesture, a button press, a gaze, and/or a speech input) to scroll content interface 616 beyond a boundary of content interface 616 (e.g., a top boundary and/or bottom boundary) and/or beyond message thread 902. In response to detecting input 905h2, device 642 displays content interface 616 of FIG. 9I.

Figure 9I:
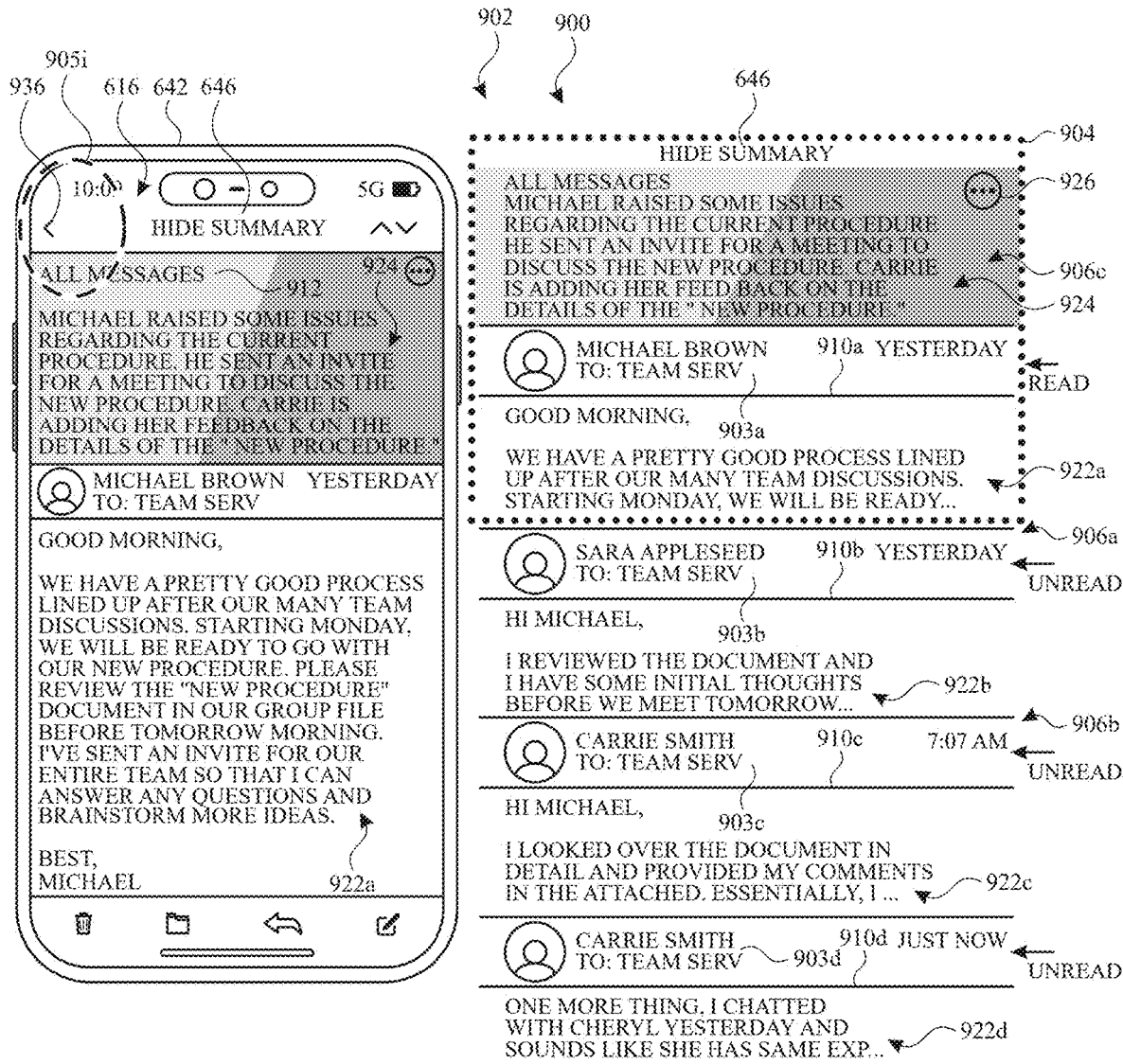
Figure 9J:
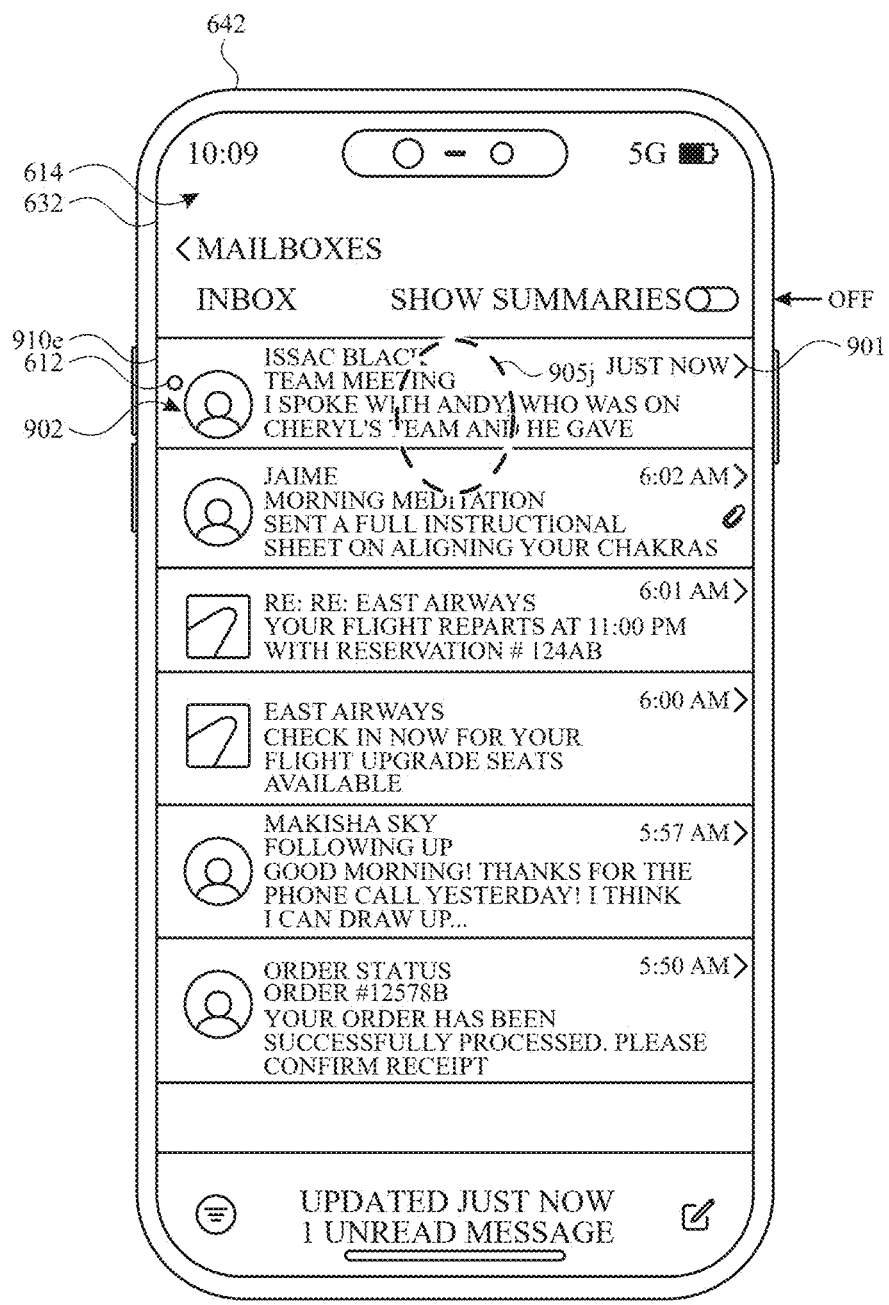

At FIG. 9I, in response to detecting input 905h2 (and/or input 905h1), device 642 displays content interface 616. Content interface 616 includes summary 924 at location 906c. As depicted, device 642 no longer displays summary 924 at location 906b (e.g., because a different summary is displayed). Device 642 also shifts message thread 902 in a respective direction (e.g., up, down, left, and/or right) in response to displaying summary 924.

At FIG. 9I, summary 924 at location 906c summarizes a different set of messages than summary 924 at location 906b and/or summary 924 at location 906a. Summary 924 at location 906c summarizes both read and unread messages (e.g., messages 910a-910d) of message thread 902. In some embodiments, summary 924 at location 906c summarizes all the messages of message thread 902. Device 642 displays summary 924 at location 906c with an indication of how many messages are included in summary 924, as depicted by reference number 912 (e.g., "all messages"). Device 642 detects input 905i (e.g., a touch input, an air gesture, a button press, a gaze, and/or a speech input) directed at back affordance 936. In response to detecting input 905i, device 642 displays an inbox interface similar to inbox interface 614 of FIG. 9J.

At FIG. 9J, device 642 has received Issac's message 910e, which is part of message thread 902. Messages 910a-910d are not displayed in FIG. 9J because the message thread view option 901 is set to show a collapsed view of message thread 902. Device 642 detects input 905j (e.g., a touch input, an air gesture, a button press, a gaze, and/or a speech input) directed at Issac's message 910e. In response to detecting input 905j, device 642 displays content interface 616 of FIG. 9K.

Figure 9K:
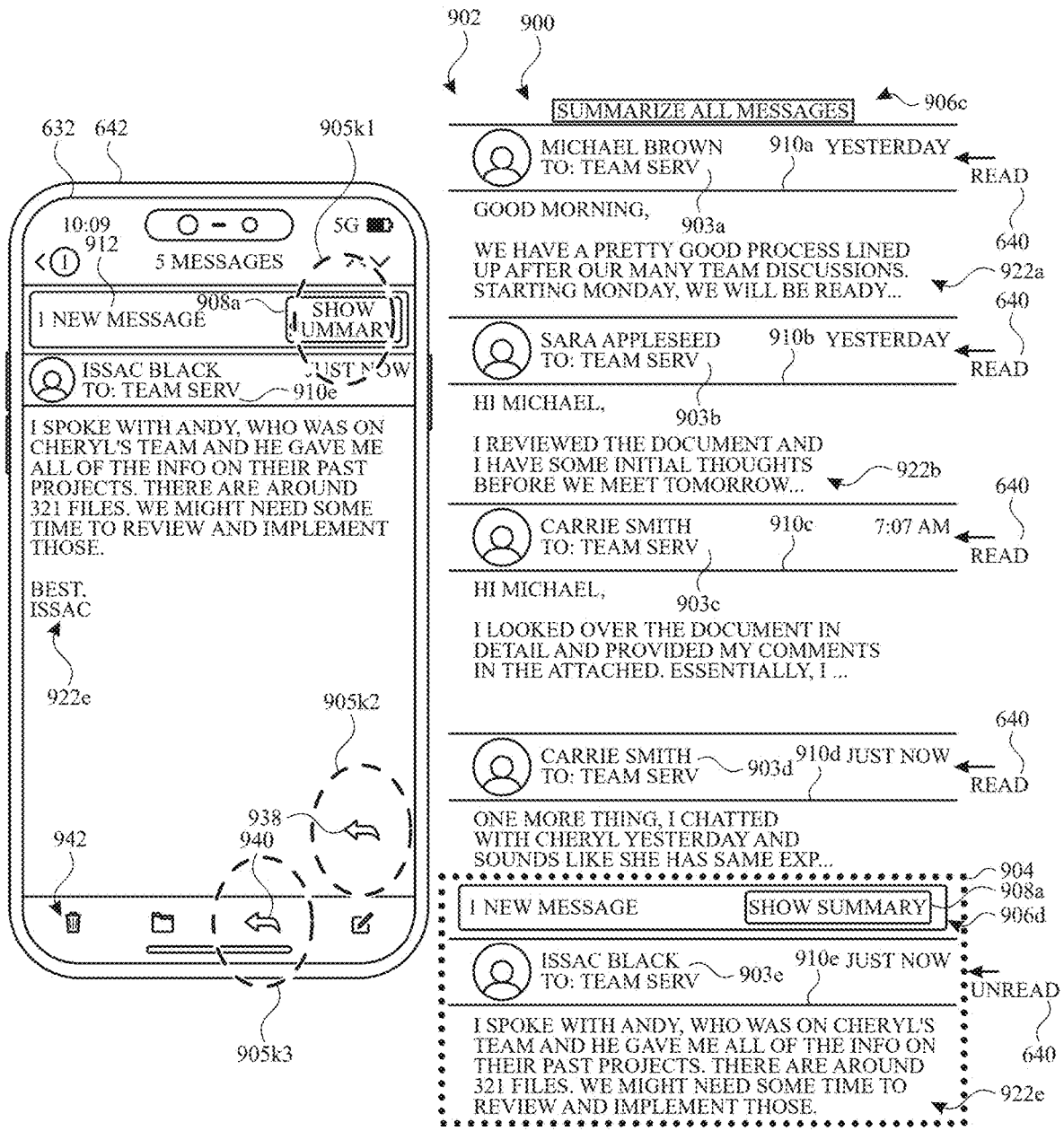

At FIG. 9K, content interface 616 includes summary affordance 908a above Issac's message 910e (e.g., above header 903e and/or content 922e). As depicted in expanded representation 900 of message thread 902, summary affordance 908a is displayed at location 906d that is above Issac's message 910e and below Carrie's message 910d. Issac's message 910e is unread, and Carrie's message 910d is read, as illustrated by status indicators 640. In some embodiments, Carrie's message 910d is in a read state based on device 642 determining that Carrie's message 910*d* was previously displayed in content interface 616. In some embodiments, device 642 displays Carrie's message 910*d* in response to scrolling content interface 616 of FIG. 9E and/or FIG. 9F so as to display content 622*d* of Carrie's message 910*d*. At FIG. 9K, as depicted in expanded representation 900 of message thread 902, device 642 does not display summary affordance 908*a* at a location that summary affordance 908*a* was previously displayed in message thread 902 (e.g., location 906*a* and/or location 906*b*).

At FIG. 9K, device 642 does not display a summary that was previously displayed (e.g., summary 924 of FIGS. 9E-9F and/or FIG. 9I). In some embodiments, device 642 does not display a summary that was previously displayed in response to detecting an event (e.g., navigating away from content interface 616, displaying inbox interface 614, navigating to an application that is different from the message application corresponding to content interface 616, and/or generating a summary for a different message thread).

At FIG. 9K, device 642 displays multiple options to initiate a process to display a summary. In some embodiments, device 642 detects input 905*k*1 (e.g., a touch input, an air gesture, a button press, a gaze, and/or a speech input) directed at summary affordance 908*a*. In such embodiments, in response to detecting input 905*k*1, device 642 displays a summary that summarizes Issac's message 910*e* (e.g., without summarizing messages 910*a*-910*d*). In such embodiments, device 642 displays the summary at location 906*d*. At FIG. 9K, device 642 detects input 905*k*2 (e.g., a touch input, an air gesture, a button press, a gaze, and/or a speech input) directed to option 938. In response to detecting input 905*k*2, device 642 displays message menu 944*b* of FIG. 9M and/or message menu 944*b* of FIG. 9N. At FIG. 9K, device 642 detects input 905*k*3 (e.g., a touch input, an air gesture, a button press, a gaze, and/or a speech input) directed to option 940. In response to detecting input 905*k*3, device 642 displays message menu 944*a* of FIG. 9L. In some embodiments, option 938 scrolls with the content of content interface 616. In some embodiments, option 940 scrolls with the content of content interface 616 (e.g., option 940 is always displayed independent of what content and/or message is currently being displayed in content interface 616). In some embodiments, option 940 is in menu bar 942 that is displayed independent of what content and/or message is currently being displayed in content interface 616.

Figure 9L:
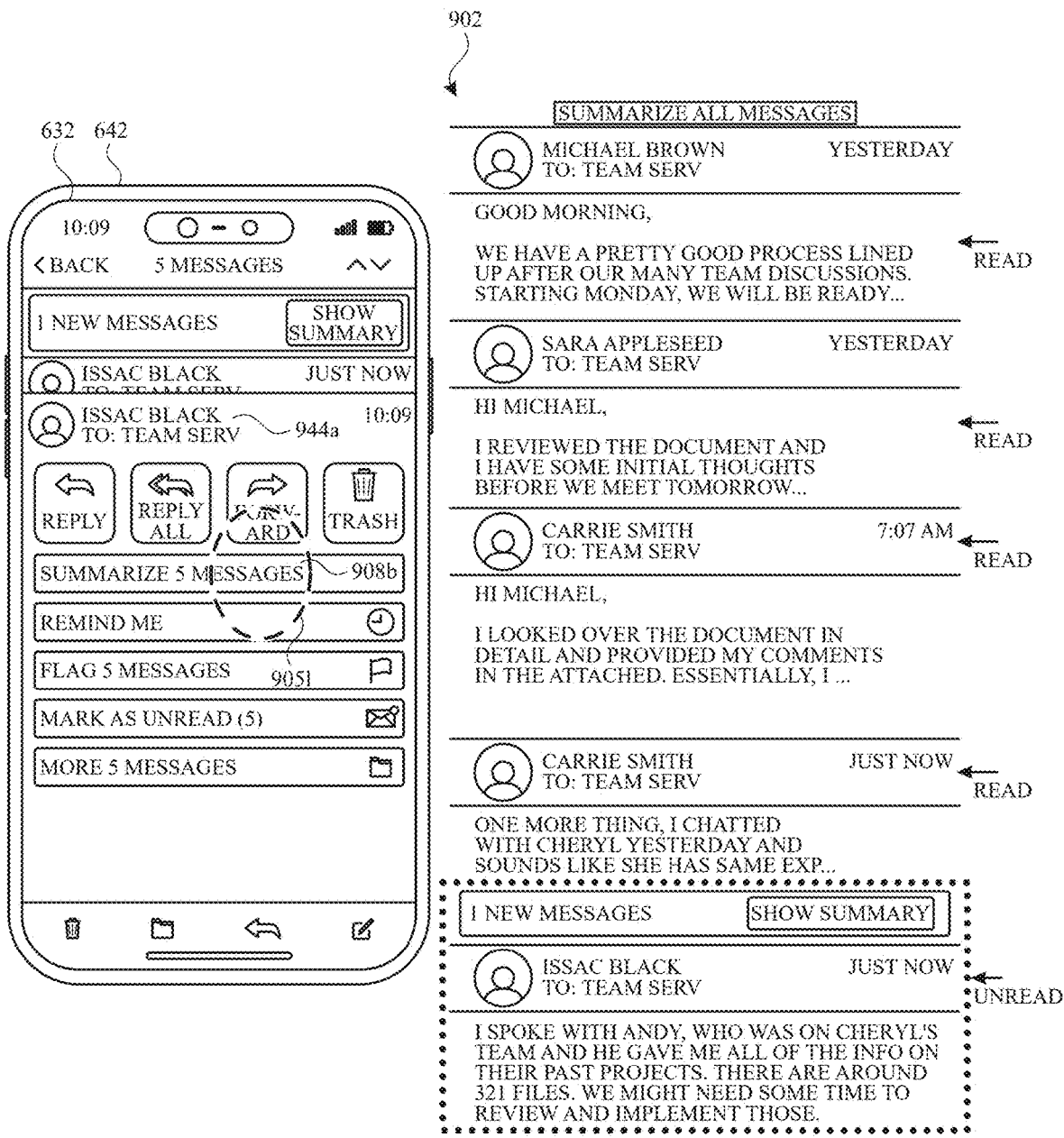

At FIG. 9L, message menu 944*a* includes various options corresponding to Issac's message 910*e* and/or message thread 902. Message menu 944*a* includes summary affordance 908*b*. Summary affordance 908*b* of FIG. 9L is similar to summary affordance 908*b* of FIG. 9H, but has a different state. At FIG. 9L, device 642 detects input 905*l* (e.g., a touch input, an air gesture, a button press, a gaze, and/or a speech input) directed to summary affordance 908*b*. In some embodiments, in response to detecting input 905*l*, device 642 displays a summary of both read and unread messages of message thread 902 (e.g., a summary that is based on (e.g., determined from and/or automatically (e.g., using an AI process or a generative AI process) generated from) messages 910*a*-910*e*). In some embodiments, device 642 displays the summary of both read and unread messages at location 906*d*, which is described in greater detail with respect to FIG. 9K. In some embodiments, device 642 displays the summary of both read and unread messages at a location different from location 906*d*. In some embodiments, device 642 displays the summary of both read and unread messages at location 906*c* as described with respect to FIG. 9I. In such embodiments, device 642 optionally scrolls content interface 616 to location 906*c* (e.g., so as to display the summary of both read and unread messages at location 906*c*) in response to detecting input 905*l*. In some embodiments, message menu 944*a* includes an affordance for replying to Issac's message 910*e*, an affordance for replying to all recipients of message thread 902, and/or an affordance to delete Issac's message 910*e*.

At FIG. 9M, device 642 displays message menu 944*a* in response to detecting input 905*k*2 of FIG. 9K. Message menu 944*a* includes summary affordance 908*c*. Summary affordance 908*c* is similar to summary affordances 908*a* and 908*b*, but has a different state. For example, summary affordance 908*c*, when selected, causes device 642 to display a summary for a single message and/or a currently selected message (e.g., Issac's message 910*e*). In some embodiments, device 642 detects input 905*m* (e.g., a touch input, an air gesture, a button press, a gaze, and/or a speech input) directed at summary affordance 908*c*. In such embodiments, device 642 displays a summary for Issac's message 910*e*. In some embodiments, the summary for Issac's message 910*e* is displayed at location 906*d*. In some embodiments, the summary for Issac's message 910*e* is displayed at a different location. In some embodiments, message menu 944*a* includes an affordance for replying to Issac's message 910*e*, an affordance for replying to all recipients of message thread 902, and/or an affordance to delete Issac's message 910*e*.

At FIG. 9N, device 642 displays message menu 944*c* in response to detecting input 905*k*2 of FIG. 9K (or, optionally, input 905*k*3 of FIG. 9K). Message menu 944*c* includes summary affordance 908*d*. Summary affordance 908*d* is similar to summary affordances 908*a*, 908*b*, and 908*c*, but has a different state. For example, summary affordance 908*d*, when selected, causes device 642 to display a summary for a currently selected message (e.g., Issac's message 910*e*) and all remaining messages of message thread 902 that are received after the currently selected message. In some embodiments, summary affordance 908*c*, when selected, causes device 642 to display a summary for Issac's message 910*e* and one or more messages that were received after Issac's message 910*e* was received. In some embodiments, device 642 detects input 905*n* (e.g., a touch input, an air gesture, a button press, a gaze, and/or a speech input) directed at summary affordance 908*d*. In such embodiments, in response to detecting input 905*n*, device 642 displays a summary for Issac's message 910*e* and one or more messages received after Issac's message 910*e* (e.g., Issac's message 910*f* of FIG. 9P). In some embodiments, summary affordance 908*c* summarizes the one or more messages received after Issac's message 910*e* regardless of a read state of the one or more messages received after Issac's message 910*e*. In some embodiments, device 642 displays the summary for Issac's message 910*e* and the one or more messages received after Issac's message 910*e* at location 906*d*. In some embodiments, device 642 displays the summary for Issac's message 910*e* and the one or more messages received after Issac's message 910*e* at a location that is different from location 906*d*. In some embodiments, message menu 944*c* includes an affordance for replying to Issac's message 910*e*, replying to all recipients of message thread 902, and/or an affordance to delete Issac's message 910*e*.

Figure 9O:
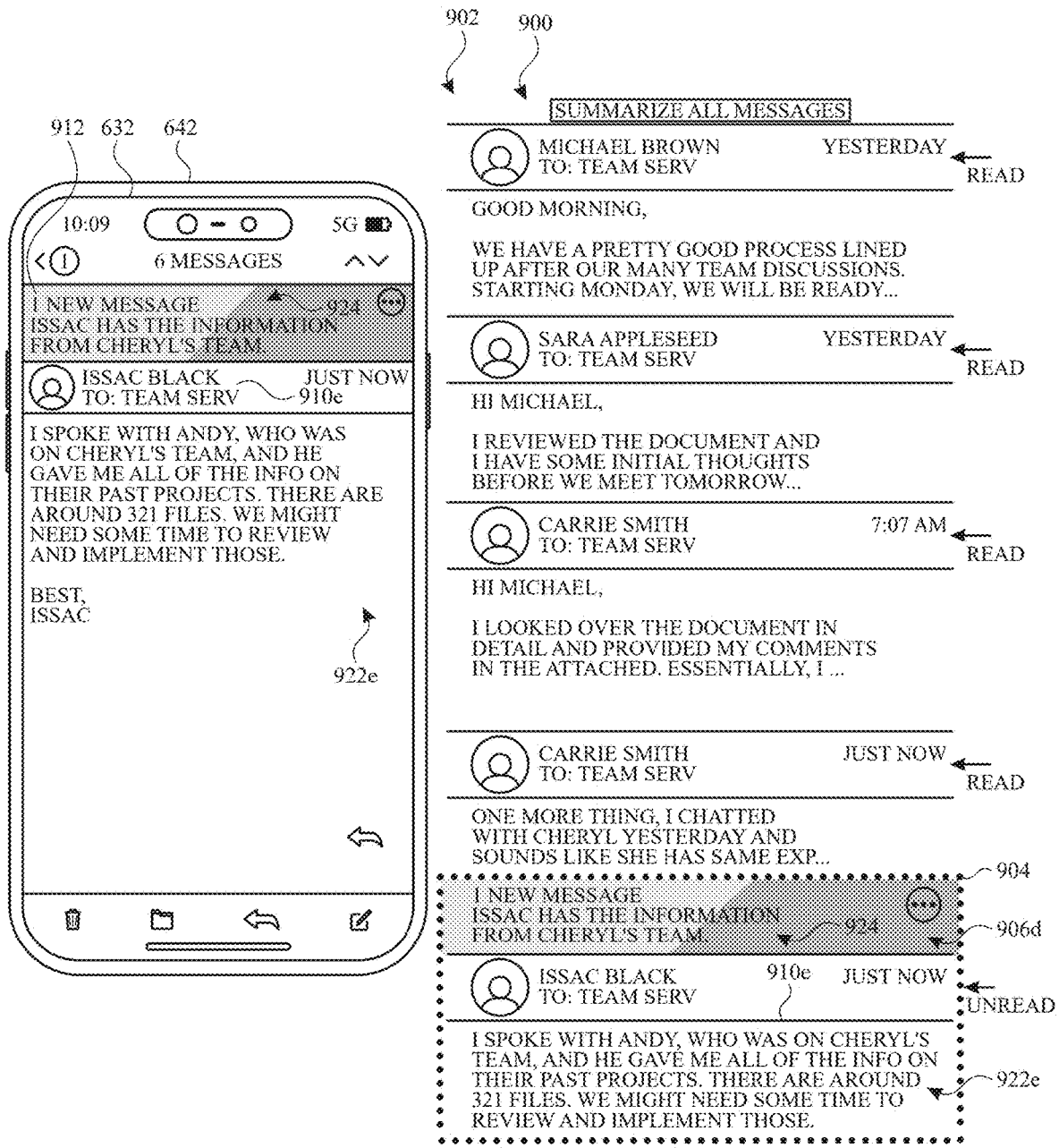

At FIG. 9O, in response to detecting a request to display a summary of Issac's message 910*e* (e.g., in response to detecting input 905*k*1, input 905*m*, or input 905*n*), device 642 displays summary 924 that summarizes Issac's message 910*e* at location 906*d*. Device 642 displays summary 924 with an indication of how many messages are included in summary 924, as depicted by reference number 912 (e.g., "1 new message"). While displaying summary 924, device 642 receives a new message, as depicted in FIG. 9P.

At FIG. 9P, while displaying summary 924 and as depicted in expanded representation 900 of message thread 902, device 642 has received Issac's message 910*f*, including content 922*f*. As depicted in content interface 616, device 642 maintains a display of summary 924 and the indication of how many messages are included in summary 924 (e.g., "1 new message"). In response to receiving Issac's message 910*f*, device 642 displays indication 952 (e.g., "+1 more") that a message is not included in summary 924. In some embodiments, while displaying summary 924, device 642 detects a request to display a new summary (e.g., via option 938 and/or via option 940). In some embodiments, in response to receiving Issac's message 910*f* and while displaying summary 924, device 642 displays (e.g., re-displays) a summary affordance similar to summary affordance 908*a* of FIG. 9K.

FIG. 10 is a flow diagram illustrating a method for displaying a message summary affordance in accordance with some embodiments. Method 1000 is performed at a computer system (e.g., 100, 300, 500, 600 and/or 642) (e.g., a smart phone, a smart watch, a tablet computer, a laptop computer, a desktop computer, a wearable device, and/or head-mounted device) that is in communication with a display generation component (e.g., 601 and/or 643) (e.g., a display, touch-screen display, a monitor, a holographic display system, and/or a head-mounted display system) and one or more input devices (e.g., 602 and/or 643) (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device (e.g., a microphone); a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 1000 are, optionally, combined, the orders of some operations are, optionally, changed, and some operations are, optionally, omitted.

As described below, method 1000 provides an intuitive way for displaying a message summary affordance. The method reduces the cognitive burden on a user for viewing messages and/or message summaries for related messages, thereby creating a more efficient human-machine interface. For battery-operated computing devices, enabling a user to view message summary affordances and/or message summaries faster and more efficiently conserves power and increases the time between battery charges.

The computer system detects (1002), via the one or more input devices, a request (e.g., 905*a*, 605*c*, 605*d*, 605*j*, 605*l*, 605*m*, 605*n*, 605*o*, 605*p*, and/or 605*q*) (e.g., one or more inputs) to display one or more messages (e.g., 910*a*-910*f*, the messages of message thread depicted in FIG. 6K, the messages of the message thread depicted in FIG. 6E, and/or the messages of the message thread depicted in FIGS. 6R-6W, 6X) (e.g., text messages and/or emails) of a first message thread (e.g., 902, the message thread depicted in FIG. 6K, the message thread depicted in FIG. 6E, and/or the message thread depicted in FIGS. 6R-6W, 6X) (e.g., a set of one or more messages that share a characteristic and/or a set of one or more messages that share and/or originate from a common message). In some embodiments, the request to display the one or more messages of the first message thread includes a request to display content (e.g., text, image(s), and/or written content) of one or more messages of a message thread. In response to detecting the request to display the one or more messages of the first message thread, the computer system displays (1004), via the display generation component, a user interface (e.g., 608, 614, 616, and/or 632) that includes the one or more messages of the first message thread (e.g., the user interface includes content of the one or more messages of the first message thread), including: in accordance with a determination that a first message is unread (e.g., 910*b* is unread in FIG. 9B and/or 910*c* is unread in FIG. 9C) (e.g., has not been read and/or has not been opened), the computer system displays (1006) a first summary element (e.g., 908*a*) (e.g., a selectable graphical user interface element, a user-interactive graphical user interface element, a button, a selectable icon, and/or an affordance) at a first location (e.g., 906*a*, 906*b*, 906*c*, and/or 906*d*) in the first message thread, wherein the first summary element, when selected, causes the computer system to display a summary (e.g., 924, 624*d*, 624*f*, 624*j*, 624*k*1, 624*k*2, 624*k*3-1, 624*k*3-2, 624*k*3-3, 624*k*3-4, 624*l*, 624*m*, 624*n*, 624*o*, 624*p*2, and/or 624*r*) (e.g., a textual summary and/or a graphical summary) of a first set of one or more messages of the first message thread. In some embodiments, the summary of the first set of one or more messages of the first message thread includes a summary of a portion (e.g., at least a portion, some but not all, or all) of the content of the first set of one or more messages of the first message thread. In some embodiments, the set of one or more messages is the same as the one or more messages that are requested to be displayed. In some embodiments, the set of one or more messages is different from the one or more messages that are requested to be displayed. In some embodiments, the computer system detects an input directed to the first summary element and, in response, displays a summary of the portion of the content of the one or more messages of the first message thread. In response to detecting the request to display the one or more messages of the first message thread, the computer system displays (1004), via the display generation component, a user interface (e.g., 608, 614, 616, and/or 632) that includes the one or more messages of the first message thread (e.g., the user interface includes content of the one or more messages of the first message thread), including: in accordance with a determination that the first message is not unread (e.g., 910*b* is read in FIG. 9C and/or 910*c* is read in FIG. 9K) (e.g., the first message has been read and/or has been opened), the computer system displays (1008) the first summary element at a second location (e.g., 906*a*, 906*b*, and/or 906*d*) in the first message thread, wherein the second location is different from the first location (e.g., the location of the first summary element within the first message thread is based on whether the first message is read). In some embodiments, in response to detecting a selection of the first summary element when the first summary element is displayed in the second location in the first message thread, the computer system displays a summary based on (e.g., determined from and/or automatically (e.g., using an AI process or a generative AI process) generated from) the first set of one or more messages of the first message thread (or, optionally, a second set of one or more messages of the first message thread, where the second set of one or more messages is different from the first set of one or more messages). In some embodiments, displaying the first summary element in the first location includes displaying the first summary element in a first orientation (e.g., relative to the one or more messages of the first message thread), and displaying the first summary element in the second location includes displaying the first summary element in a second orientation that is different from the first orientation (e.g., the first summary element is displayed in different orientations at different locations in the first message thread). In some embodiments, the first summary element is embedded (e.g., inserted, implanted, and/or at a fixed position) within the first message thread. In some embodiments, while displaying the first summary element in the first location, the computer system detects a request to scroll the first message thread (e.g., scroll the one or more messages and/or the content of the one or more messages of the first message thread) and, in response, concurrently scrolls the first message thread and the first summary element (e.g., the first summary element scrolls with the content of the first message thread and/or maintains the same location relative to the first message thread as the first message thread is scrolled). In some embodiments, the first summary is generated via one or more machine learning algorithms (e.g., a large language model and/or diffusion model) (e.g., the first summary includes automatically-generated text content and/or generative text content). In some embodiments, the first summary is generated (e.g., includes automatically-generated text content and/or generative text content) via an artificial intelligence process (e.g., generative AI). Conditionally displaying the first summary element at different locations in the first message thread based on whether the first message is unread performs an operation when a set of conditions has been met without requiring further user input, provides additional control options without cluttering the user interface, and reduces the number of inputs needed to perform an operation (e.g., navigate to a summary button and/or generate a summary).

In some embodiments, after displaying the first summary element at the first location in the first message thread (e.g., 908a is displayed at 906b in FIG. 9C) (e.g., in response to detecting the request to display the one or more messages of the first message thread, in accordance with a determination that a first message is unread, and/or after the computer system has navigated away from the user interface that includes the one or more messages of the first message thread), the computer system detects, via the one or more input devices, a second request (e.g., 905j) to display one or more messages of the first message thread (e.g., the same as or different from the one or messages of the first message thread that were previously displayed). In response to detecting the second request to display one or more messages of the first message thread, the computer system displays, via the display generation component, the first summary element at a third location (e.g., 906a, 906b, and/or 906d) in the first message thread, wherein the third location is different from the first location (and/or the second location). In some embodiments, the computer system displays the first summary element at the third location based on detecting that the first message is not unread (e.g., is read). For example, in some embodiments, the computer system displays the first summary element in a different position when the user navigates back to the user interface that includes the one or more messages of the message thread (e.g., after navigating away from the user interface that includes the one or more messages of the message thread). In some embodiments, the third location is the same as the second location. Displaying the first summary element at a different location in the first message thread after it has been displayed in the first location provides additional control options without cluttering the user interface and reduces the number of inputs needed to perform an operation (e.g., navigate to a summary button and/or generate a summary).

In some embodiments, while displaying the user interface that includes the one or more messages of the first message thread, the computer system detects, via the one or more input devices, an input (e.g., 905b3, 905c, and/or 905k1) (e.g., a touch input, an air gesture, a button press, a gaze, and/or a speech input) directed at the first summary element. In response to detecting the input directed to the first summary element and in accordance with a determination that the first summary element is displayed at the first location (e.g., 906a, 906b, and/or 906d) (e.g., and/or in accordance with a determination that the first message is unread), the computer system displays, via the display generation component, a first summary (e.g., 924 and/or 624p1) that is based on (e.g., determined from and/or automatically (e.g., using an AI process or a generative AI process) generated from) the first message (e.g., 924 of FIG. 9F is based on 910b). In response to detecting the input directed to the first summary element and in accordance with the determination that the first summary element is displayed at the second location (e.g., 906a, 906b, and/or 906d) (e.g., and/or in accordance with a determination that the first message is not unread), the computer system displays, via the display generation component, a second summary (e.g., 924 and/or 624p1) that is based on (e.g., determined from and/or automatically (e.g., using an AI process or a generative AI process) generated from) a second message (e.g., 924 of FIG. 9E is based on 910c and/or 910d) that is different from the first message. In some embodiments, the second summary is not based on the first message (e.g., 924 of FIG. 9E is not based on 910b) (e.g., the summary generated by first summary element is based on the first message when the first summary is the first location and the summary generated by the first summary element is not based on the first message when the first summary element is in the second location). In some embodiments, in accordance with the determination that the first summary element is displayed at the first location (e.g., and/or in accordance with a determination that the first message is unread), the computer system displays a summary that is based on (e.g., determined from and/or automatically (e.g., using an AI process or a generative AI process) generated from) both the first message and the second message. Displaying a summary that is conditionally based on the first message depending on whether the first summary element is displayed in the first location or second location performs an operation when a set of conditions has been met without requiring further user input, provides additional control options without cluttering the user interface, reduces the number of inputs needed to perform an operation (e.g., navigate to a summary button and/or generate a summary), and selectively summarizes messages that are unread, which surfaces relevant information.

In some embodiments, the second message is unread (e.g., 910c and/or 910d are unread in FIG. 9E). Displaying a summary that is based on a second message that is unread without being based on the first message, when the first message is read, provides additional control options without cluttering the user interface, reduces the number of inputs needed to perform an operation, and selectively summarizes messages that are unread, which surfaces relevant information.

In some embodiments, while the first summary element (e.g., 908a) is displayed at the first location (e.g., 906a) in the first message thread (and/or at the second location in the first message thread), the computer system detects, via the one or more input devices, an input (e.g., 905*b*3) (e.g., a touch input, an air gesture, a button press, a gaze, and/or a speech input) directed at the first summary element. In response to detecting the input directed at the first summary element, the computer system displays, in the first message thread and via the display generation component, a summary (e.g., 924 and/or 624*p*1) of the first set of one or more messages of the first message thread (e.g., 924 is displayed at 906*a* in FIG. 9H); In some embodiments, the summary is embedded (e.g., inserted, implanted, and/or at a fixed position) within the first message thread. In some embodiments, the computer system scrolls the summary in response to detecting a request to scroll the one or more messages of the first message thread. In some embodiments, the computer system ceases the display of the summary element in response to detecting the input directed at the first summary element (and/or in response to displaying the summary of the one or more messages of the first message thread). In some embodiments, after displaying the summary of the first set of one or more messages of the first message thread, the computer system detects an event (e.g., an input directed at 908*b*, input 905*i* directed at 936, 905*j*, inbox interface 614 was displayed as depicted in FIG. 9J, an input to view a different message and/or different message thread, and/or bringing 632 and/or 616 to the foreground after it has been moved to the background as depicted in FIGS. 6M-6O) (e.g., an event corresponding to the first message thread and/or an event corresponding to displaying a second summary different from the summary of the one or more messages of the first message thread). In some embodiments, detecting the event includes the computer system detecting that the computer system has navigated away from (e.g., and/or has subsequently returned to) the user interface that includes the one or more messages of the first message thread. In some embodiments, detecting the event includes the computer system detecting a request to display a summary of a second set of one or more messages that is different from the first set of one or more messages of the first message thread (e.g., wherein the second set of one or more messages correspond to a different message thread and/or a different set of messages of the same message thread). In some embodiments, detecting the event includes the computer system detecting that the summary of the first set of one or more messages of the first message thread is outdated (e.g., a state of the message thread has changed). In some embodiments the first message thread is outdated in response to the computer system detecting that a new message has been received and/or detecting an unread message of the first message thread has changed to a read message. In some embodiments, in response to detecting the event (or, optionally, after detecting the event), the computer system displays the user interface that includes the one or more messages of the first message thread without displaying the summary in the first message thread (e.g., 924 is not displayed at 906*a* in FIG. 9I and/or 924 is not displayed at 906*a*, 906*b*, and/or 906*c* in FIG. 9K) (e.g., the computer system no longer displays the summary in the first message thread). In some embodiments, the computer system removes (e.g., deletes and/or erases) the summary from the first message thread in response to detecting the event. In some embodiments, after detecting the event, the computer system detects a request to display one or more messages of the first message thread and, in response, displays the one or more messages without displaying the summary of the set of one or more messages. Displaying the user interface including the one or more messages of the first message thread without displaying the summary in the first message thread in response to detecting an event, reduces the number of inputs needed to perform an operation and declutters the user interface.

In some embodiments, while the first summary element is displayed in the first location of the first message thread, the computer system detects an input (e.g., 905*b*3, 905*c*, and/or 905*k*1) (e.g., a touch input, an air gesture, a button press, a gaze, and/or a speech input), via the one or more input devices, directed at the first summary element. In response to detecting the input directed at the first summary element, the computer system displays, via the display generation component, a summary (e.g., 924 and/or 624*p*1) of a respective set of one or more messages in the first message thread (e.g., 924 is based on 910*c*, and 910*d* in FIG. 9E and/or 924 is based on 910*b*, 910*c*, and 910*d* in FIG. 9F), and an indication (e.g., 912) of a quantity (e.g., "2 new messages" and/or "3 new messages" in FIG. 9E and FIG. 9F) (e.g., a number and/or an amount) of messages in the respective set of one or more messages (e.g., the summary is displayed with an indication of the number of messages that the summary is based on). In some embodiments, the summary is based on (e.g., determined from and/or automatically (e.g., using an AI process or a generative AI process) generated from) unread messages without being based on read messages. In some embodiments, the indication of the quantity of the one or more messages on which the summary is based is an indication of the quantity of unread messages on which the summary is based. Displaying a summary of a respective set of one or more messages of the first message thread and an indication of a quantity of messages in the respective set of one or more messages in response to detecting the input directed at the first summary element, provides visual feedback regarding the state of the summary and/or what messages are included in the summary.

In some embodiments, while the first summary element is displayed in the first location of the first message thread, the computer system detects an input (e.g., 905*b*3, 905*c*, and/or 905*k*1) (e.g., a touch input, an air gesture, a button press, a gaze, and/or a speech input), via the one or more input devices, directed at the first summary element. In response to detecting the input directed at the first summary element, the computer system displays, via display generation component, a summary (e.g., 924 and/or 624*p*1) of a respective set of one or more messages of the first message thread (e.g., 924 is based on 910*c*, and 910*d* in FIG. 9E and/or 924 is based on 910*b*, 910*c*, and 910*d* in FIG. 9F) and a selectable feedback element (e.g., 926, 928, and/or 930) (e.g., a user-interactive graphical user interface element, a button, a selectable icon, and/or an affordance) that, when selected, initiates a process to communicate feedback (e.g., problems, issues, positive feedback, and/or negative feedback) for the summary (e.g., as described with respect to FIGS. 9F-9G, 928 includes options, such as 930, for initiating a communication that provides feedback for 924) (e.g., the summary is displayed with a button to provide feedback). In some embodiments, the computer system detects an input directed to the selectable object and, in response, initiates the process to communicate feedback for the summary. Displaying a summary of a respective set of one or more messages of the first message thread and a selectable feedback element that, when selected, initiates a process to communicate feedback for the summary in response to detecting the input directed at the first summary element, reduces the number of inputs and/or provides options to initiate a communication that includes feedback for the summary.

In some embodiments, the second location (e.g., 906*b*) in the first message thread is between the first message (e.g., 910*b* in FIG. 9C) (e.g., a read message) and a second message (e.g., 910*c* in FIG. 9C), different from the first message, wherein the second message is unread (e.g., 910*c* is unread in FIG. 9C). In some embodiments, while displaying the first summary element at the second location in the first message thread, the computer system detects a request to scroll the first message thread and, in response, scrolls the first message thread and ceases the display of the first summary element. In some embodiments, while displaying the first summary element at the second location in the first message thread, the computer system detects a request to scroll the first message thread in a respective direction (e.g., up and/or down) and, in response, scrolls the first message thread in the respective direction, displays content of the second message, and ceases the display of the first summary element. In some embodiments, the first location is not between the first message and the second message. In some embodiments, the first location is between the first message (e.g., an unread message) and a third message (e.g., a read message) that is different from the second message. Conditionally displaying the first summary element at a position between the first message (which is a read) and a second message (that is unread) based on whether the first message is unread, performs an operation when a set of conditions has been met without requiring further user input, provides additional control options without cluttering the user interface, and reduces the number of inputs needed to perform an operation (e.g., navigate to a summary button and/or generate summary).

In some embodiments, displaying the user interface that includes the one or more messages of the first message thread includes displaying a second summary element (e.g., 908*a* and/or 908*b*) at a third location (e.g., 906*a*, 906*b*, 906*c*, and/or 906*d*) in the first message thread. In some embodiments, the third location is different from the first location and the second location (e.g., the second summary element is displayed at a different location than the first summary element). In some embodiments, the second summary element, when selected, causes the computer system to display a summary (e.g., 924 and/or 624*p*1) of a respective set of one or more messages of the first message thread (e.g., 908*a* summarizes unread messages in message thread 902 and/or 908*b* summarizes both read and unread messages in message thread 902). In some embodiments, the second summary element is displayed above an original message in the first message thread (e.g., a message that was first sent and/or received in the first message thread). In some embodiments, the second summary element is displayed at the top (or, optionally, bottom) of the first message thread. Displaying a second summary element at a different location in the first message thread than the location of the first summary element provides additional control options to generate a summary.

In some embodiments, the first summary element, when selected, causes the computer system to display a summary that is based on (e.g., determined from and/or automatically (e.g., using an AI process or a generative AI process) generated from) unread messages in the first message thread without being based on read messages (e.g., 924 of FIG. 9E is based on 910*c* and 910*d* and is not based on 910*a* and 910*b*). In some embodiments, the second summary element, when selected, causes the computer system to display a summary (e.g., 924) that is based on (e.g., determined from and/or automatically (e.g., using an AI process or a generative AI process) generated from) read messages and unread messages (e.g., all messages) in the first message thread (e.g., 924 is a summary that is based on both read and unread messages in FIG. 9I) (e.g., independent of whether a message is read or unread). Displaying the first summary element that, when selected, causes the computer system to display a summary that is based on unread messages in the first message thread without being based on read messages and displaying a second summary element that, when selected, causes the computer system to display a summary of all messages in the first message thread provides additional control options to generate a summary of different messages and reduces the number of inputs to generate a summary.

In some embodiments, while displaying the first summary element (e.g., 908*a*) at the first location (e.g., 906*a*, 906*b*, and/or 906*d*), the computer system detects, via the one or more input devices, an input (e.g., 905*k*2 and/or 905*k*3) (e.g., a touch input, an air gesture, a button press, a gaze, and/or a speech input) directed to a respective option element (e.g., 938 and/or 940) (e.g., a user-interactive graphical user interface element, a button, a selectable icon, and/or an affordance). In response to detecting the input directed to the respective option element, the computer system displays, via the display generation component, a third summary element (e.g., 908*b*, 908*c*, and/or 908*d*) that, when selected, causes the computer system to display a summary (e.g., 924 and/or 624*p*1) that is based on (e.g., determined from and/or automatically (e.g., using an AI process or a generative AI process) generated from) a third set of one or more messages in the first message thread (e.g., as described with respect to FIGS. 9L-9N, selecting 908*b* displays a summary of both read and unread messages, selecting 908*c* displays a summary of a currently selected message, and/or selecting 908*d* summarizes all remaining messages), wherein the third set of one or more messages is different from the first set of one or more messages. In some embodiments, the third set of one or more messages includes at least one message that is not included in the first set of one or more messages. In some embodiments, the third set of one or more messages does not include at least one message that is included in the first set of one or more messages. Detecting the input directed to a respective option element while displaying the first summary element and, in response, displaying a third summary element that, when selected, causes the computer system to display a summary that is based on a third set of one or more messages in the first message thread, wherein the third set of one or more messages is different from the first set of one or more messages provides additional control options without cluttering the user interface and reduces the number of inputs needed to perform an operation, and provides an option to summarize a different set of messages.

In some embodiments, causing the computer system to display the summary that is based on the third set of one or more messages in the first message thread includes, in accordance with a determination that the respective option element is a first option element (e.g., 908*b*) (e.g., an option to initiate a process to reply to all the recipients of a message and/or a menu option that displays a first menu), causing the computer system to display a summary (e.g., 924 and/or 624*p*1) that is based on (e.g., determined from and/or automatically (e.g., using an AI process or a generative AI process) generated from) all messages of the first message thread (e.g., selecting 908*b* causes the display of a summary that is based on all messages as described with respect to FIG. 9L) (e.g., if the computer system detects an input directed to the first option element, then the third summary element, when selected, causes the display of a summary that is based on all messages of the first message thread). In some embodiments, in accordance with a determination that the respective options is not the first option element (e.g., is an option element that is different from the first option element), the third set of one or more messages does not correspond to all messages of the first message thread. Conditionally displaying a third summary element that, when selected, displays a summary of all messages of the first message thread, depending on whether the respective option element is a first option element, performs an operation when a set of conditions has been met without requiring further user input, provides additional control options without cluttering the user interface, and reduces the number of inputs needed to perform an operation (e.g., navigate to a summary button and/or generate summaries for different sets of message).

In some embodiments, causing the computer system to display a summary that is based on the third set of one or more messages in the first message thread includes: in accordance with a determination that the respective option element is a second option element (e.g., 908*c*) (e.g., the same as or different from the first option element), causing the computer system to display a summary that is based on (e.g., determined from and/or automatically (e.g., using an AI process or a generative AI process) generated from) a single message (e.g., an individual message and/or not more than one message) of the first message thread (e.g., selecting 908*c* causes the display of a summary that is based on a single message as described with respect to FIG. 9M) (e.g., if the computer system detects an input directed to the second option element then the third summary element, when selected, causes the display of a summary that is based on a single of the first message thread). In some embodiments, the second option element initiates a process to reply to all the recipients of a message and/or a menu option that displays a first menu. In some embodiments, in accordance with a determination that the respective option element is not the second option element (e.g., is an option element that is different from the second option element), the third set of one or more messages does not correspond to a single message of the first message thread. Conditionally displaying a third summary element that, when selected, displays a summary of a single message of the first message thread depending on whether the respective option is a second option element performs an operation when a set of conditions has been met without requiring further user input, provides additional control options without cluttering the user interface, and reduces the number of inputs needed to perform an operation (e.g., navigate to a summary button and/or generate summaries for different sets of message).

In some embodiments, the computer system detects, via one or more input devices, a request (e.g., 905*h*2) (e.g., one or more inputs) to scroll beyond a boundary of the first message thread (e.g., the edge of the first message thread, the terminal end of the first message thread, and/or the boarder of the first message thread). In some embodiments, the boundary is a top (or, optionally, bottom, left, or right) boundary of the first message thread. In response to detecting the request to scroll beyond the boundary of the first message thread the computer system shifts the first message thread (e.g., 902 is shifted down in FIG. 9I relative to 902 in FIG. 9H) and displays a summary (e.g., 924 and/or 624*p*1) of one or more messages of the first message thread (e.g., 924 is displayed in FIG. 9I). In some embodiments, the summary of the one or more messages is based on all messages of the first message thread. In some embodiments, shifting the first message thread includes shifting a message of the first message thread in a respective direction (e.g., up, down, left, and/or right) and displaying the summary of the one or more messages of the first message thread in an area that was previously occupied by the message of the first message thread. In some embodiments, the summary of one or more messages of the first message thread is not included in the first message thread when the request to scroll beyond the boundary of the first message thread is detected. Detecting the request to scroll beyond a boundary of the first message thread, shifting the content of the user interface and displaying a summary of one or more messages of the first message thread provides additional control options without cluttering the user interface and reduces the number of inputs needed to perform an operation (e.g., navigate to a summary button and/or generate summaries).

In some embodiments, the computer system detects, via the one or more input devices, a request (e.g., 905*a*, 605*c*, 605*d*, 605*j*, 605*l*, 605*m*, 605*n*, 605*o*, 605*p*, and/or 605*q*) to display one or more messages (e.g., 910*a*-910*f*, the messages of the message thread depicted in FIG. 6K, the messages of the message thread depicted in FIG. 6E, and/or the messages of the message thread depicted in FIGS. 6R-6W, and/or 6X) of a second message thread (e.g., 902, the message thread depicted in FIG. 6K, the message thread depicted in FIG. 6E, and/or the message thread depicted in FIGS. 6R-6W, and/or 6X) (e.g., prior to, after, and/or independent of detecting the request to display the one or more messages of the first message thread). In response to detecting the request to display the one or more messages of the second message thread, the computer system displays, via the display generation component, a user interface (e.g., 608, 614, 616, and/or 632) that includes the one or more messages of the second message thread, including: in accordance with a determination that a first message of the second message thread is unread (e.g., 910*c* is unread in FIG. 9E and/or 910*b* is unread in FIG. 9F), the computer system displays a fourth summary element (e.g., 924 and/or 624*p*1) at a first location (e.g., 906*a*, 906*b*, 906*c*, and/or 906*d*) in the second message thread, wherein the fourth summary element summarizes a first set of one or more messages of the second message thread (e.g., 924 summarizes 910*c* and 910*d* in FIG. 9E and/or 924 summarizes 910*b*, 910*c*, and 910*d* in FIG. 9F). In response to detecting the request to display the one or more messages of the second message thread, the computer system displays, via the display generation component, a user interface (e.g., 608, 614, 616, and/or 632) that includes the one or more messages of the second message thread, including: in accordance with a determination that the first message of the second message thread is not unread, the computer system displays the fourth summary element at a second location (e.g., 906*a*, 906*b*, 906*c*, and/or 906*d*) in the second message thread that is different from the first location in the second message thread (e.g., 924 summarizes 910*c* and 910*d* in FIG. 9E and/or 924 summarizes 910*b*, 910*c*, and 910*d* in FIG. 9F). In some embodiments, the fourth summary element is automatically generated and displayed in response to detecting the request to display the one or more messages of the second message thread (e.g., and/or is not generated in response to detecting a request to generate a summary). In some embodiments, the fourth summary element is not generated in response to detecting an input directed to a summary element that causes the computer system to display a summary (e.g., after displaying the one or more messages of the second message thread). In some embodiments, the fourth summary element is displayed without displaying a summary element that, when selected, displays a summary of one or more messages of the second message thread. Conditionally displaying the fourth summary element summarizes a set of one or more messages of the second message thread at different locations in the first message thread based on whether the first message is unread, performs an operation when a set of conditions has been met without requiring further user input, provides additional control options without cluttering the user interface, and reduces the number of inputs needed to perform an operation (e.g., navigate to a summary button and/or generate a summary).

Note that details of the processes described above with respect to method 1000 (e.g., FIG. 10) are also applicable in an analogous manner to the methods described herein (e.g., methods 700 and 800). For example, methods 700 and 800 optionally include one or more of the characteristics of the various methods described above with reference to method 1000. For example, methods 700 and 800 include features to display a message summary affordance. For example, methods 700 and 800 include features to display a message summary affordance (and/or a summary) at different locations. For example, methods 700 and 800 include features to display a message summary affordance (and/or a summary) that summarizes different sets of messages. For example, methods 700 and 800 include features to display a message summary affordance (and/or a summary) that summarizes different sets of messages based on messages being read and/or unread. For example, methods 700 and 800 include features to display a message summary affordance (and/or a summary) at a location in a message thread. For example, methods 700 and 800 include features to display a message summary affordance (and/or a summary) at a location in a message thread. For example, methods 700 and 800 include features to stop displaying a message summary affordance (and/or a summary) in response to detecting an event. For example, methods 700 and 800 include displaying multiple message summary affordances that summarize different sets of messages. For example, methods 700 and 800 include displaying an indication of how many messages were summarized. For brevity, these details are not repeated herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

Some embodiments described herein can include use of artificial intelligence and/or machine learning systems (sometimes referred to herein as the AI/ML systems). The use can include collecting, processing, labeling, organizing, analyzing, recommending and/or generating data. Entities that collect, share, and/or otherwise utilize user data should provide transparency and/or obtain user consent when collecting such data. The present disclosure recognizes that the use of the data in the AI/ML systems can be used to benefit users. For example, the data can be used to train models that can be deployed to improve performance, accuracy, and/or functionality of applications and/or services. Accordingly, the use of the data enables the AI/ML systems to adapt and/or optimize operations to provide more personalized, efficient, and/or enhanced user experiences. Such adaptation and/or optimization can include tailoring content, recommendations, and/or interactions to individual users, as well as streamlining processes, and/or enabling more intuitive interfaces. Further beneficial uses of the data in the AI/ML systems are also contemplated by the present disclosure.

The present disclosure contemplates that, in some embodiments, data used by AI/ML systems includes publicly available data. To protect user privacy, data may be anonymized, aggregated, and/or otherwise processed to remove or to the degree possible limit any individual identification. As discussed herein, entities that collect, share, and/or otherwise utilize such data should obtain user consent prior to and/or provide transparency when collecting such data. Furthermore, the present disclosure contemplates that the entities responsible for the use of data, including, but not limited to data used in association with AI/ML systems, should attempt to comply with well-established privacy policies and/or privacy practices.

For example, such entities may implement and consistently follow policies and practices recognized as meeting or exceeding industry standards and regulatory requirements for developing and/or training AI/ML systems. In doing so, attempts should be made to ensure all intellectual property rights and privacy considerations are maintained. Training should include practices safeguarding training data, such as personal information, through sufficient protections against misuse or exploitation. Such policies and practices should cover all stages of the AI/ML systems development, training, and use, including data collection, data preparation, model training, model evaluation, model deployment, and ongoing monitoring and maintenance. Transparency and accountability should be maintained throughout. Such policies should be easily accessible by users and should be updated as the collection and/or use of data changes. User data should be collected for legitimate and reasonable uses of the entity and not shared or sold outside of those legitimate uses. Further, such collection and sharing should occur through transparency with users and/or after receiving the informed consent of the users. Additionally, such entities should consider taking any needed steps for safeguarding and securing access to such data and ensuring that others with access to the data adhere to their privacy policies and procedures. Further, such entities should subject themselves to evaluation by third parties to certify, as appropriate for transparency purposes, their adherence to widely accepted privacy policies and practices. In addition, policies and/or practices should be adapted to the particular type of data being collected and/or accessed and tailored to a specific use case and applicable laws and standards, including jurisdiction-specific considerations.

In some embodiments, AI/ML systems may utilize models that may be trained (e.g., supervised learning or unsupervised learning) using various training data, including data collected using a user device. Such use of user-collected data may be limited to operations on the user device. For example, the training of the model can be done locally on the user device so no part of the data is sent to another device. In other implementations, the training of the model can be performed using one or more other devices (e.g., server(s)) in addition to the user device but done in a privacy preserving manner, e.g., via multi-party computation as may be done cryptographically by secret sharing data or other means so that the user data is not leaked to the other devices.

In some embodiments, the trained model can be centrally stored on the user device or stored on multiple devices, e.g., as in federated learning. Such decentralized storage can similarly be done in a privacy preserving manner, e.g., via cryptographic operations where each piece of data is broken into shards such that no device alone (i.e., only collectively with another device(s)) or only the user device can reassemble or use the data. In this manner, a pattern of behavior of the user or the device may not be leaked, while taking advantage of increased computational resources of the other devices to train and execute the ML model. Accordingly, user-collected data can be protected. In some implementations, data from multiple devices can be combined in a privacy-preserving manner to train an ML model.

In some embodiments, the present disclosure contemplates that data used for AI/ML systems may be kept strictly separated from platforms where the AI/ML systems are deployed and/or used to interact with users and/or process data. In such embodiments, data used for offline training of the AI/ML systems may be maintained in secured datastores with restricted access and/or not be retained beyond the duration necessary for training purposes. In some embodiments, the AI/ML systems may utilize a local memory cache to store data temporarily during a user session. The local memory cache may be used to improve performance of the AI/ML systems. However, to protect user privacy, data stored in the local memory cache may be erased after the user session is completed. Any temporary caches of data used for online learning or inference may be promptly erased after processing. All data collection, transfer, and/or storage should use industry-standard encryption and/or secure communication.

In some embodiments, as noted above, techniques such as federated learning, differential privacy, secure hardware components, homomorphic encryption, and/or multi-party computation among other techniques may be utilized to further protect personal information data during training and/or use of the AI/ML systems. The AI/ML systems should be monitored for changes in underlying data distribution such as concept drift or data skew that can degrade performance of the AI/ML systems over time.

In some embodiments, the AI/ML systems are trained using a combination of offline and online training. Offline training can use curated datasets to establish baseline model performance, while online training can allow the AI/ML systems to continually adapt and/or improve. The present disclosure recognizes the importance of maintaining strict data governance practices throughout this process to ensure user privacy is protected.

In some embodiments, the AI/ML systems may be designed with safeguards to maintain adherence to originally intended purposes, even as the AI/ML systems adapt based on new data. Any significant changes in data collection and/or applications of an AI/ML system use may (and in some cases should) be transparently communicated to affected stakeholders and/or include obtaining user consent with respect to changes in how user data is collected and/or utilized.

Despite the foregoing, the present disclosure also contemplates embodiments in which users selectively restrict and/or block the use of and/or access to data. That is, the present disclosure contemplates that hardware and/or software elements can be provided to prevent or block access to data. For example, in the case of some services, the present technology should be configured to allow users to select to "opt in" or "opt out" of participation in the collection of data during registration for services or anytime thereafter. In another example, the present technology should be configured to allow users to select not to provide certain data for training the AI/ML systems and/or for use as input during the inference stage of such systems. In yet another example, the present technology should be configured to allow users to be able to select to limit the length of time data is maintained or entirely prohibit the use of their data for use by the AI/ML systems. In addition to providing "opt in" and "opt out" options, the present disclosure contemplates providing notifications relating to the access or use of personal information. For instance, a user can be notified when their data is being input into the AI/ML systems for training or inference purposes, and/or reminded when the AI/ML systems generate outputs or make decisions based on their data.

The present disclosure recognizes AI/ML systems should incorporate explicit restrictions and/or oversight to mitigate against risks that may be present even when such systems having been designed, developed, and/or operated according to industry best practices and standards. For example, outputs may be produced that could be considered erroneous, harmful, offensive, and/or biased; such outputs may not necessarily reflect the opinions or positions of the entities developing or deploying these systems. Furthermore, in some cases, references to third-party products and/or services in the outputs should not be construed as endorsements or affiliations by the entities providing the AI/ML systems. Generated content can be filtered for potentially inappropriate or dangerous material prior to being presented to users, while human oversight and/or ability to override or correct erroneous or undesirable outputs can be maintained as a failsafe.

The present disclosure further contemplates that users of the AI/ML systems should refrain from using the services in any manner that infringes upon, misappropriates, or violates the rights of any party. Furthermore, the AI/ML systems should not be used for any unlawful or illegal activity, nor to develop any application or use case that would commit or facilitate the commission of a crime, or other tortious, unlawful, or illegal act. The AI/ML systems should not violate, misappropriate, or infringe any copyrights, trademarks, rights of privacy and publicity, trade secrets, patents, or other proprietary or legal rights of any party, and appropriately attribute content as required. Further, the AI/ML systems should not interfere with any security, digital signing, digital rights management, content protection, verification, or authentication mechanisms. The AI/ML systems should not misrepresent machine-generated outputs as being human-generated.

As described above, one aspect of the present technology is the gathering and use of data available from various sources to improve how and/or when summaries of messages are displayed. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine how and/or when summaries of messages are displayed. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying a summary based on a message, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, summaries for messages are displayed by inferring preferences based on non-personal information data or a bare minimum amount of personal information, such as the content being requested by the device associated with a user, other non-personal information available to the summary generating services, or publicly available information.

What is claimed is:

1. A computer system configured to communicate with a display generation component and one or more input devices, comprising:
   one or more processors; and
   memory storing one or more programs configured to be executed by the one or more processors, the one or more programs including instructions for:
      displaying, via the display generation component, a first graphical user interface of a communications application that includes a plurality of messages;
      receiving a first message including first content and a second message, different from the first message, including second content;
      displaying, via the display generation component and in the first graphical user interface of the communications application, a selectable object for the second message that, when selected, displays the second content of the second message in a second graphical user interface of the communications application, wherein the selectable object for the second message is concurrently displayed with a first summary that is based on the first content of the first message and the second content of the second message;
      after displaying the selectable object for the second message concurrently with the first summary, receiving a third message that is associated with the first message and the second message, wherein the third message includes third content;
      detecting, via the one or more input devices, an input to display the first graphical user interface of the communications application;
      in response to detecting an input to display the first graphical user interface and after receiving the third message, displaying, via the display generation component, the first graphical user interface of the communications application, wherein displaying the first graphical user interface of the communications application includes:
         in accordance with a determination that a first set of criteria is satisfied, displaying, via the display generation component and in the first graphical user interface of the communications application, a selectable object for the third message that, when selected, displays the third content of the of the third message in the second graphical user interface of the communications application, wherein the selectable object for the third message is concurrently displayed with a second summary that is different from the first summary, wherein the second summary is based on the third content of the third message; and in accordance with a determination that the first set of criteria is not satisfied, displaying, via the display generation component and in the first graphical user interface of the communications application, the selectable object for the third message without displaying the second summary;

while displaying the selectable object for the third message concurrently with the second summary, detecting, via one or more input devices, an input directed to the selectable object for the third message; and in response to detecting the input directed to the selectable object for the third message, displaying, via the display generation component, the third content of the third message in the second graphical user interface of the communications application.

2. The computer system of claim 1, wherein displaying the second summary includes:
   in accordance with a determination that the first message is in an unread state, the second summary is based on the first content; and
   in accordance with a determination that the first message is not in an unread state, the second summary is not based on the first content.

3. The computer system of claim 1, wherein the second summary is based on the first content after the first message has been opened.

4. The computer system of claim 1, wherein:
   the second summary is based on the first content;
   the first message is from a first sender; and
   the third message is from a second sender that is different from the first sender.

5. The computer system of claim 4, wherein the second summary includes an indication of the first sender and an indication of the second sender.

6. The computer system of claim 1, wherein the second summary is displayed independent of a state of the third message.

7. The computer system of claim 1, the one or more programs further including instructions for:
   prior to displaying the second summary, concurrently displaying, via the display generation component, the first summary with the third content.

8. The computer system of claim 1, wherein:
   the first message, the second message, and the third message are messages of the communications application; and
   the first set of criteria includes a criterion that is satisfied by the communicatiosn application having been in an inactive state after the third message is received.

9. The computer system of claim 1, wherein the first set of criteria includes a criterion that is satisfied when the second summary is generated within a threshold period-of-time of the third message being received, the one or more programs further including instructions for:
   after receiving the third message and in accordance with the determination that the first set of criteria is not satisfied, displaying at least a portion of the third content without displaying the second summary.

10. The computer system of claim 1, the one or more programs further including instructions for:
    after receiving the first message, displaying, via the display generation component, a third summary based on the first content, wherein the third summary is different from the second summary.

11. The computer system of claim 1, wherein:
    the selectable object for the third message is displayed without a first portion of the third content of the third message when the selectable object for the third message is concurrently displayed with the second summary; and
    the selectable object for the third message is displayed with the first portion of the third content of the third message when the selectable object for the third message is displayed without the second summary.

12. The computer system of claim 1, the one or more programs further including instructions for:
    detecting a change in a state of the communications application in response to detecting a set of one or more user inputs, wherein:
      the input to display the first graphical user interface of the communications application is detected after detecting the change in the state of the communications application; and
      the determination that the first set of criteria is satisfied is based on the change in the state of the communications application.

13. A non-transitory computer-readable storage medium storing one or more programs configured to be executed by one or more processors of a computer system that is in communication with a display generation component and one or more input devices, the one or more programs including instructions for:
    displaying, via the display generation component, a first graphical user interface of a communications application that includes a plurality of messages;
    receiving a first message including first content and a second message, different from the first message, including second content;
    displaying, via the display generation component and in the first graphical user interface of the communications application, a selectable object for the second message that, when selected, displays the second content of the second message in a second graphical user interface of the communications application, wherein the selectable object for the second message is concurrently displayed with a first summary that is based on the first content of the first message and the second content of the second message;
    after displaying the selectable object for the second message concurrently with the first summary, receiving a third message that is associated with the first message and the second message, wherein the third message includes third content;
    detecting, via the one or more input devices, an input to display the first graphical user interface of the communications application;
    in response to detecting an input to display the first graphical user interface and after receiving the third message, displaying, via the display generation component, the first graphical user interface of the communications application, wherein displaying the first graphical user interface of the communications application includes:
      in accordance with a determination that a first set of criteria is satisfied, displaying, via the display generation component and in the first graphical user interface of the communications application, a selectable object for the third message that, when selected, displays the third content of the of the third message in the second graphical user interface of the communications application, wherein the selectable object for the third message is concurrently displayed with a second summary that is different from the first summary, wherein the second summary is based on the third content of the third message; and in accordance with a determination that the first set of criteria is not satisfied, displaying, via the display generation component and in the first graphical user interface of the communications application, the selectable object for the third message without displaying the second summary;

while displaying the selectable object for the third message concurrently with the second summary, detecting, via one or more input devices, an input directed to the selectable object for the third message; and in response to detecting the input directed to the selectable object for the third message, displaying, via the display generation component, the third content of the third message in the second graphical user interface of the communications application.

14. The non-transitory computer-readable storage medium of claim 13, wherein displaying the second summary includes:

in accordance with a determination that the first message is in an unread state, the second summary is based on the first content; and in accordance with a determination that the first message is not in an unread state, the second summary is not based on the first content.

15. The non-transitory computer-readable storage medium of claim 13, wherein the second summary is based on the first content after the first message has been opened.

16. The non-transitory computer-readable storage medium of claim 13, wherein:

the second summary is based on the first content;
the first message is from a first sender; and
the third message is from a second sender that is different from the first sender.

17. The non-transitory computer-readable storage medium of claim 16, wherein the second summary includes an indication of the first sender and an indication of the second sender.

18. The non-transitory computer-readable storage medium of claim 13, wherein the second summary is displayed independent of a state of the third message.

19. The non-transitory computer-readable storage medium of claim 13, the one or more programs further including instructions for:

prior to displaying the second summary, concurrently displaying, via the display generation component, the first summary with the third content.

20. The non-transitory computer-readable storage medium of claim 13, wherein:

the first message, the second message, and the third message are messages of the communications application; and the first set of criteria includes a criterion that is satisfied by the communications application having been in an inactive state after the third message is received.

21. The non-transitory computer-readable storage medium of claim 13, wherein the first set of criteria includes a criterion that is satisfied when the second summary is generated within a threshold period-of-time of the third message being received, the one or more programs further including instructions for:

after receiving the third message and in accordance with the determination that the first set of criteria is not satisfied, displaying at least a portion of the third content without displaying the second summary.

22. The non-transitory computer-readable storage medium of claim 13, the one or more programs further including instructions for:

after receiving the first message, displaying, via the display generation component, a third summary based on the first content, wherein the third summary is different from the second summary.

23. The non-transitory computer-readable storage medium of claim 13, wherein:

the selectable object for the third message is displayed without a first portion of the third content of the third message when the selectable object for the third message is concurrently displayed with the second summary; and the selectable object for the third message is displayed with the first portion of the third content of the third message when the selectable object for the third message is displayed without the second summary.

24. The non-transitory computer-readable storage medium of claim 13, the one or more programs further including instructions for:

detecting a change in a state of the communications application in response to detecting a set of one or more user inputs, wherein:

the input to display the first graphical user interface of the communications application is detected after detecting the change in the state of the communications application; and the determination that the first set of criteria is satisfied is based on the change in the state of the communications application.

25. A method, comprising:

at a computer system that is in communication with a display generation component and one or more input devices:

displaying, via the display generation component, a first graphical user interface of a communications application that includes a plurality of messages;

receiving a first message including first content and a second message, different from the first message, including second content;

displaying, via the display generation component and in the first graphical user interface of the communications application, a selectable object for the second message that, when selected, displays the second content of the second message in a second graphical user interface of the communications application, wherein the selectable object for the second message is concurrently displayed with a first summary that is based on the first content of the first message and the second content of the second message;

after displaying the selectable object for the second message concurrently with the first summary, receiving a third message that is associated with the first message and the second message, wherein the third message includes third content;

detecting, via the one or more input devices, an input to display the first graphical user interface of the communications application;

in response to detecting an input to display the first graphical user interface and after receiving the third message, displaying, via the display generation component, the first graphical user interface of the communications application, wherein displaying the first graphical user interface of the communications application includes:

in accordance with a determination that a first set of criteria is satisfied, displaying, via the display generation component and in the graphical user interface of the communications application, a selectable object for the third message that, when selected, displays the third content of the of the third message in the second graphical user interface of the communications application, wherein the selectable object for the third message is concurrently displayed with a second summary that is different from the first summary, wherein the second summary is based on the third content of the third message; and in accordance with a determination that the first set of criteria is not satisfied, displaying, via the display generation component and in the first graphical user interface of the communications application, the selectable object for the third message without displaying the second summary;

while displaying the selectable object for the third message concurrently with the second summary, detecting, via one or more input devices, an input directed to the selectable object for the third message; and in response to detecting the input directed to the selectable object for the third message, displaying, via the display generation component, the third content of the message in the second graphical user interface of the communications application.

26. The method of claim 25, wherein displaying the second summary includes:

in accordance with a determination that the first message is in an unread state, the second summary is based on the first content; and in accordance with a determination that the first message is not in an unread state, the second summary is not based on the first content.

27. The method of claim 25, wherein the second summary is based on the first content after the first message has been opened.

28. The method of claim 25, wherein:
the second summary is based on the first content;
the first message is from a first sender; and
the third message is from a second sender that is different from the first sender.

29. The method of claim 28, wherein the second summary includes an indication of the first sender and an indication of the second sender.

30. The method of claim 25, wherein the second summary is displayed independent of a state of the third message.

31. The method of claim 25, further comprising:
prior to displaying the second summary, concurrently displaying, via the display generation component, the first summary with the third content.

32. The method of claim 25, wherein:
the first message, the second message, and the third message are messages of the communications application; and
the first set of criteria includes a criterion that is satisfied by the communications application having been in an inactive state after the third message is received.

33. The method of claim 25, wherein the first set of criteria includes a criterion that is satisfied when the second summary is generated within a threshold period-of-time of the third message being received, the method further comprising:

after receiving the third message and in accordance with the determination that the first set of criteria is not satisfied, displaying at least a portion of the third content without displaying the second summary.

34. The method of claim 25, further comprising:
after receiving the first message, displaying, via the display generation component, a third summary based on the first content, wherein the third summary is different from the second summary.

35. The method of claim 25, wherein:
the selectable object for the third message is displayed without a first portion of the third content of the third message when the selectable object for the third message is concurrently displayed with the second summary; and
the selectable object for the third message is displayed with the first portion of the third content of the third message when the selectable object for the third message is displayed without the second summary.

36. The method of claim 25, further comprising:
detecting a change in a state of the communications application in response to detecting a set of one or more user inputs, wherein:
the input to display the first graphical user interface of the communications application is detected after detecting the change in the state of the communications application; and
the determination that the first set of criteria is satisfied is based on the change in the state of the communications application.

\* \* \* \* \*

UNITED STATES PATENT AND TRADEMARK OFFICE
CERTIFICATE OF CORRECTION

| | | |
|---|---|---|
| PATENT NO. | : 12,438,840 B1 | Page 1 of 1 |
| APPLICATION NO. | : 19/030720 | |
| DATED | : October 7, 2025 | |
| INVENTOR(S) | : Marcel Van Os et al. | |

It is certified that error appears in the above-identified patent and that said Letters Patent is hereby corrected as shown below:

In the Claims

Column 88, Lines 60-61: In Claim 1, delete "of the of the" and insert -- of the --.

Column 89, Line 51: In Claim 8, delete "communicatiosn" and insert -- communications --.

Column 90, Line 64: In Claim 13, delete "of the of the" and insert -- of the --.

Column 93, Line 3: In Claim 25, delete "graphical" and insert -- first graphical --.

Column 93, Line 6: In Claim 25, delete "of the of the" and insert -- of the --.

Column 93, Line 29: In Claim 25, delete "message" and insert -- third message --.

Signed and Sealed this
Twenty-fifth Day of November, 2025

John A. Squires
*Director of the United States Patent and Trademark Office*